(12) United States Patent
Obernosterer et al.

(10) Patent No.: US 12,035,224 B2
(45) Date of Patent: Jul. 9, 2024

(54) CHANNEL ACCESS VIA HIERARCHICALLY ORGANIZED CHANNEL ACCESS PATTERNS

(71) Applicants: Fraunhofer-Gesellschaft zur Förderung der angewandten Forschung e.V., Munich (DE); Friedrich-Alexander-Universitaet Erlangen-Nuernberg, Erlangen (DE)

(72) Inventors: Frank Obernosterer, Nuremberg (DE); Raimund Meyer, Fuerth (DE); Gerd Kilian, Erlangen (DE); Josef Bernhard, Erlangen (DE); Johannes Wechsler, Erlangen (DE); Jakob Kneissl, Erlangen (DE); Michael Schlicht, Erlangen (DE); Joerg Robert, Uttenreuth (DE)

(73) Assignees: Fraunhofer-Gesellschaft zur Förderung der angewandten Forschung e.V., Munich (DE); Friedrich-Alexander-Universitaet Erlangen-Nuernberg, Erlangen (DE)

(*) Notice: Subject to any disclaimer, the term of this patent is extended or adjusted under 35 U.S.C. 154(b) by 648 days.

(21) Appl. No.: 17/130,132

(22) Filed: Dec. 22, 2020

(65) Prior Publication Data
US 2021/0112485 A1    Apr. 15, 2021

Related U.S. Application Data

(63) Continuation of application No. PCT/EP2019/066288, filed on Jun. 19, 2019.

(30) Foreign Application Priority Data

Jun. 22, 2018    (DE) .......................... 102018210243.0

(51) Int. Cl.
| | | |
|---|---|---|
| H04W 48/12 | (2009.01) | |
| H04W 72/0446 | (2023.01) | |
| H04W 72/0453 | (2023.01) | |

(52) U.S. Cl.
CPC ....... *H04W 48/12* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | |
|---|---|---|
| 9,354,081 B2 | 5/2016 | Bernhard et al. |
| 2007/0183338 A1 | 8/2007 | Singh et al. |

(Continued)

FOREIGN PATENT DOCUMENTS

| | | |
|---|---|---|
| CN | 101964694 A | 2/2011 |
| CN | 102769519 A | 11/2012 |

(Continued)

OTHER PUBLICATIONS

IEEE Std. 802.15.4—2015—IEEE Standard for Low-Rate Wireless Networks, 2015, 2015.

(Continued)

*Primary Examiner* — Saad Khawar
(74) *Attorney, Agent, or Firm* — Perkins Coie LLP; Michael A. Glenn

(57) ABSTRACT

Embodiments provide a controller for a participant of a communication system wirelessly communicates in a frequency band used for communication by a plurality of communication systems, wherein the controller is configured to identify a network-specific channel access pattern, wherein the network-specific channel access pattern indicates a frequency hop-based and/or time hop-based occupancy of resources of the frequency band that is usable for (Continued)

the communication of the communication system, wherein the controller is configured to identify a relative channel access pattern, wherein the relative channel access pattern indicates, from the usable frequency hop-based and/or time hop-based occupancy of resources of the network-specific channel access pattern, an occupancy of resources that is to be used for the transfer of data of the participant.

52 Claims, 30 Drawing Sheets

(56) References Cited

U.S. PATENT DOCUMENTS

| | | |
|---|---|---|
| 2009/0074033 A1 | 3/2009 | Kattwinkel |
| 2013/0208687 A1 | 8/2013 | Kwon et al. |
| 2014/0269558 A1 | 9/2014 | Sartori et al. |
| 2015/0092710 A1 | 4/2015 | Novlan et al. |
| 2015/0163814 A1* | 6/2015 | Kore ............... H04W 72/0446 370/330 |
| 2017/0231446 A1 | 8/2017 | Watanabe et al. |
| 2018/0048350 A1 | 2/2018 | Hammerschmidt et al. |
| 2018/0152264 A1 | 5/2018 | Kilian et al. |

FOREIGN PATENT DOCUMENTS

| | | |
|---|---|---|
| CN | 104507168 A | 4/2015 |
| CN | 104700589 A | 6/2015 |
| CN | 104811268 A | 7/2015 |
| CN | 108141315 A | 6/2018 |
| DE | 102011082098 B4 | 3/2013 |
| DE | 102018210245 A1 | 12/2019 |
| KR | 20110105035 A | 9/2011 |
| WO | 2011003183 A1 | 1/2011 |
| WO | 2015114456 A2 | 8/2015 |
| WO | 2017162742 A2 | 9/2017 |
| WO | 2019243466 A1 | 12/2019 |

OTHER PUBLICATIONS

R5-140008 "Latest RAN Plenary draft Report": 81 3GPP; however, according to our Chinese colleagues, this was quoted wrongly by the Examiner (cf. attached email); the right quotation is: ETSI MCC, RP-13xxxx"Draft Report of 3GPP TSG RAN meeting #62", Busan, Korea, Dec. 3-6, 2013-114 pages.

* cited by examiner

| application cases | $T_{frame}$ (ms) | A | $T_{RE}$ (ms) | F | Z | F x Z resource elements per resource frame |
|---|---|---|---|---|---|---|
| latency-critical (battery-operated) | 360 | 0.33 | 15 | 1 | 8 | 8 |
| latency-critical (power supply network) | 480 | 0.50 | 15 | 5 | 16 | 80 |
| interference-robust (battery-operated) | 9000 | 0.10 | 30 | 1 | 30 | 30 |
| interference-robust (power supply network) | 9000 | 0.33 | 30 | 10 | 100 | 1000 |

Fig. 24

Transmitting a signal, wherein the signal comprises information about a network-specific channel access pattern, wherein the network-specific channel access pattern indicates a frequency hop-based and/or time hop-based occupancy of resources of the frequency band that is usable for the communication of the communication system ~212

Transferring data by using a relative channel access pattern, wherein the relative channel access pattern indicates, from the usable frequency hop-based and/or time hop-based occupancy of resources of the network-specific channel access pattern, an occupancy of resources that is to be used for the transfer ~214

Fig. 29

CHANNEL ACCESS VIA HIERARCHICALLY ORGANIZED CHANNEL ACCESS PATTERNS

CROSS-REFERENCES TO RELATED APPLICATIONS

This application is a continuation of copending International Application No. PCT/EP2019/066288, filed Jun. 19, 2019, which is incorporated herein by reference in its entirety, and additionally claims priority from German Application No. DE 102018210243.0, filed Jun. 22, 2018, which is incorporated herein by reference in its entirety.

BACKGROUND OF THE INVENTION

Embodiments of the present invention relate to a controller for a participant of a communication system, to a base station of a communication system, to a terminal point of the communication system, and to the communication system, wherein the communication system wirelessly communicates in a frequency band used for communication by a plurality of communication systems. Some embodiments relate to a channel access via hierarchically organized channel access patterns.

In the wireless communication between participants of a communication system in a frequency band used for communication by a plurality of communication systems, the avoidance of interferences between the participants of the communication system and the avoidance of disturbance signals of other communication systems (=communication between participants of other communication systems) is needed.

General Methods for the Avoidance of Interference

Disturbances of participants within the own radio network (or communication system) are often avoided by a coordinated conflict-free allocation of radio resources (e.g. done by a base station). For example, this is done in the mobile radio standards GSM, UMTS, and LTE, where (outside of the initial network logon phase) collisions of radio participants within the same network may be fully avoided by the so-called "scheduling".

Disturbances by radio participants outside of the own network are often reduced by suitable radio network planning. In this case, a certain usable frequency range (possibly consisting of several frequency channels) from the entire available frequency band is allocated to each network. Adjacent networks use different frequency ranges, which is why there are no direct disturbances between participants of adjacent networks. In the end, this method also represents a type of coordination between networks.

If such a specified allocation of frequency ranges or radio channels to individual networks is not possible or not feasible (e.g. as is often times the case on non-licensed frequency bands), a network may determine an unused frequency range, e.g. or the least used one, from a set of specified frequency ranges by means of a utilization measurement and then occupy the same, or switch thereto.

Avoiding Interference when Using the TSMA Method

A further case is the transmission of messages (data packets) by means of the so-called Telegram Splitting Multiple Access (TSMA) method [1]. Here, the frequency range usable by a network is divided into a specified number of frequency channels, wherein a data packet is transferred divided onto a plurality of partial data packets, which are typically transmitted at different points in time and on different frequency channels. In this case, the hopping pattern (or time/frequency hopping pattern) used for transferring the partial data packets plays a particularly important role, as is shown in [2], for example. A particularly high utilization of networks can be achieved if there are as many different hopping patterns as possible, containing among themselves only as few and short overlapping sequences as possible. In order to decrease the interference of several networks among themselves, the networks may use different hopping patterns relative to each other. These network-individual hopping patterns have to be known to all participants in the respective networks. Furthermore, it is desirable that the hopping patterns—as described above—have only short overlapping sequences with respect to each other so as to avoid systematic collision between partial data packets of participants of different networks.

In mutually coordinated networks, it is possible to allocate to each network an individual hopping pattern that has as little overlap as possible with the hopping patterns of other networks in the reception range. The totality of all available hopping patterns may be tabulated as a set (of hopping patterns) from which the network-wide coordinating instance allocates one/several individual hopping pattern(s) to each network. The calculation of a set of suitable hopping patterns may be done in advance according to suitable optimization criteria.

If networks are not mutually coordinated and possibly also not synchronized temporally and in the frequency domain, the above method (tabulated, pre-calculated hopping patterns) may be applied in principle, however, there is the risk that two networks randomly use the same hopping pattern. In order to decrease to a feasible extent the probability that two (mutually influencing) networks use the same hopping pattern, an extraordinarily large number of available hopping patterns would have to exist, particularly in a scenario with many networks.

SUMMARY

An embodiment may have a terminal point of a communication system, wherein the communication system wirelessly communicates in a frequency band used for communication by a plurality of communication systems, wherein the terminal point is configured to receive a signal, wherein the signal includes information about a network-specific channel access pattern, wherein the network-specific channel access pattern indicates a frequency hop-based and time hop-based occupancy of resources of the frequency band that is usable for the communication of the communication system, wherein the terminal point is configured to transfer data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the channel access pattern, wherein the occupancy of resources of the relative channel access pattern that is to be used for the transfer is a subset of the usable frequency hop-based and time hop-based occupancy of resources of the network-specific channel access pattern.

Another embodiment may have a base station of a communication system, wherein the communication system wirelessly communicates in a frequency band used for communication by a plurality of communication systems, wherein the base station is configured to transmit a signal, wherein the signal includes information about a network-specific channel access pattern, wherein the network-specific channel access pattern indicates a frequency hop-based and time hop-based occupancy of resources of the frequency band that is usable for the communication of the communication system, wherein the base station is configured to transfer data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the channel access pattern, wherein the occupancy of resources of the relative channel access pattern that is to be used for the transfer is a subset of the usable frequency hop-based and time hop-based occupancy of resources of the network-specific channel access pattern.

Another embodiment may have a communication system, including: at least one terminal point of a communication system, wherein the communication system wirelessly communicates in a frequency band used for communication by a plurality of communication systems, wherein the terminal point is configured to receive a signal, wherein the signal includes information about a network-specific channel access pattern, wherein the network-specific channel access pattern indicates a frequency hop-based and time hop-based occupancy of resources of the frequency band that is usable for the communication of the communication system, wherein the terminal point is configured to transfer data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the channel access pattern; and a base station of a communication system, wherein the communication system wirelessly communicates in a frequency band used for communication by a plurality of communication systems, wherein the base station is configured to transmit a signal, wherein the signal includes information about a network-specific channel access pattern, wherein the network-specific channel access pattern indicates a frequency hop-based and time hop-based occupancy of resources of the frequency band that is usable for the communication of the communication system, wherein the base station is configured to transfer data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the channel access pattern.

Another embodiment may have a method for operating a terminal point of a communication system, wherein the communication system wirelessly communicates in a frequency band used for communication by a plurality of communication systems, the method having the steps of: receiving a signal, wherein the signal includes information about a network-specific channel access pattern, wherein the network-specific channel access pattern indicates a frequency hop-based and time hop-based occupancy of resources of the frequency band that is usable for the communication of the communication system, and transferring data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the channel access pattern, wherein the occupancy of resources of the relative channel access pattern that is to be used for the transfer is a subset of the usable frequency hop-based and time hop-based occupancy of resources of the network-specific channel access pattern.

Another embodiment may have a method for operating a base station of a communication system, wherein the communication system wirelessly communicates in a frequency band used for communication by a plurality of communication systems, the method having the steps of: transmitting a signal, wherein the signal includes information about a network-specific channel access pattern, wherein the network-specific channel access pattern indicates a frequency hop-based and time hop-based occupancy of resources of the frequency band that is usable for the communication of the communication system, and transferring data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the channel access pattern, wherein the occupancy of resources of the relative channel access pattern that is to be used for the transfer is a subset of the usable frequency hop-based and time hop-based occupancy of resources of the network-specific channel access pattern.

Another embodiment may have a non-transitory digital storage medium having a computer program stored thereon to perform the method for operating a terminal point of a communication system, wherein the communication system wirelessly communicates in a frequency band used for communication by a plurality of communication systems, the method having the steps of: receiving a signal, wherein the signal includes information about a network-specific channel access pattern, wherein the network-specific channel access pattern indicates a frequency hop-based and time hop-based occupancy of resources of the frequency band that is usable for the communication of the communication system, and transferring data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the channel access pattern, wherein the occupancy of resources of the relative channel access pattern that is to be used for the transfer is a subset of the usable frequency hop-based and time hop-based occupancy of resources of the network-specific channel access pattern, when said computer program is run by a computer.

Another embodiment may have a non-transitory digital storage medium having a computer program stored thereon to perform the method for operating a base station of a communication system, wherein the communication system wirelessly communicates in a frequency band used for communication by a plurality of communication systems, the method having the steps of: transmitting a signal, wherein the signal includes information about a network-specific channel access pattern, wherein the network-specific channel access pattern indicates a frequency hop-based and time hop-based occupancy of resources of the frequency band that is usable for the communication of the communication system, and transferring data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the channel access pattern, wherein the occupancy of resources of the relative channel access pattern that is to be used for the transfer is a subset of the usable frequency hop-based and time hop-based occupancy of resources of the network-specific channel access pattern, when said computer program is run by a computer.

Another embodiment may have a controller for a participant of a communication system, wherein the communication system wirelessly communicates in a frequency band used for communication by a plurality of communication systems, wherein the controller is configured to identify a network-specific channel access pattern, wherein the network-specific channel access pattern indicates a frequency hop-based and time hop-based occupancy of resources of the frequency band that is usable for the communication of the communication system, wherein the controller is configured to identify a relative channel access pattern, wherein the relative channel access pattern indicates, from the usable frequency hop-based and time hop-based occupancy of resources of the network-specific channel access pattern, an occupancy of resources that is to be used for the transfer of data of the participant, wherein the controller is configured to pseudo-randomly identify the channel access pattern as a function of a state of a numerical sequence generator for generating a numerical sequence or a number of a numerical sequence, wherein the occupancy of resources of the relative channel access pattern that is to be used for the transfer is a subset of the usable frequency hop-based and time hop-based occupancy of resources of the network-specific channel access pattern.

Embodiments provide a terminal point of a communication system, wherein the communication system wirelessly communicates in a frequency band [e.g. a license-free and/or permission-free frequency band; e.g. an ISM band] used for communication by a plurality of communication systems, wherein the terminal point is configured to receive a signal [e.g. a beacon signal], wherein the signal comprises information about a network-specific channel access pattern, wherein the network-specific channel access pattern indicates a frequency hop-based and/or time hop-based occupancy of resources of the frequency band that is usable for the communication of the communication system [e.g. a temporal sequence of frequency resources (e.g. distributed across the frequency band) usable for the communication of the communication system], wherein the terminal point is configured to transfer [e.g. to transmit or to receive] data by using a relative channel access pattern, wherein, from the usable frequency hop-based and/or time hop-based occupancy of resources of the network-specific channel access pattern, the relative channel access pattern indicates an occupancy of resources that is to be used for the transfer [e.g. the relative channel access pattern indicates which of the resources cleared or usable for the communication of the communication system by the network-specific channel access pattern is to be actually used for the transfer of data by the terminal point].

In embodiments, the occupancy of resources of the relative channel access pattern that is to be used for the transfer may be a subset of the usable frequency hop-based and/or time hop-based occupancy of resources of the network-specific channel access pattern [e.g. wherein the relative channel access pattern only comprises a subset of the resources of the network-specific channel access pattern].

In embodiments, the relative channel access pattern may differ from another relative channel access pattern based on which another participant [e.g. a terminal point and/or a base station; e.g. a base station at another participant] of the communication system transfers [e.g. transmits and/or receives] data, wherein the other relative channel access pattern indicates, from the usable frequency hop-based and/or time hop-based occupancy of resources of the network-specific channel access pattern, an occupancy of resources that is to be used for the transfer by the other participant.

In embodiments, the network-specific channel access pattern may indicate the frequency hop-based and/or time hop-based occupancy of resources of the frequency band, usable for the communication of the communication system, in frequency channels [e.g. into which the frequency band is divided] and associated time slots or in frequency channel indices and associated time slot indices.

In embodiments, the network-specific channel access pattern may indicate in the frequency direction [e.g. per time slot or time slot index] a plurality of adjacent or spaced apart resources [e.g. frequency channels or frequency channel indices] of the frequency band.

In embodiments, the relative channel access pattern may indicate in the frequency direction at the most a subset [e.g. at the most one resource, that is one or no resource] of the plurality of adjacent or spaced apart resources of the network-specific channel access pattern.

In embodiments, the relative channel access pattern may indicate for at least one time hop [e.g. for at least one time slot or time slot index] in the frequency direction a different resource of the plurality of adjacent or spaced apart resources of the network-specific channel access pattern than another relative channel access pattern based on which another participant [e.g. a terminal point and/or a base station; e.g. a base station at another participant] of the communication system transfers [e.g. transmits and/or receives] data, wherein the other relative channel access pattern indicates, from the usable frequency hop-based and/or time hop-based occupancy of resources of the network-specific channel access pattern, an occupancy of resources that is to be used for the transfer by the other participant.

In embodiments, different symbol rates and/or different numbers of symbols may be allocated in the frequency direction to at least two resources [e.g. frequency channels or frequency channel indices] of the plurality of adjacent or spaced apart resources.

In embodiments, the plurality of adjacent resources may form in the frequency direction a block [e.g. a cluster] of connected resources, wherein different symbol rates and/or different numbers of symbols are allocated to different parts of the block of connected resources.

In embodiments, the terminal point may be configured to select the relative channel access pattern from a set [e.g. a supply] of M relative channel access patterns, wherein the M relative channel access patterns indicate, from the usable frequency hop-based and/or time hop-based occupancy of resources of the network-specific channel access pattern, an occupancy of resources that is to be used for the transfer, wherein the M relative channel access patterns are different [e.g. different at least in the occupancy of one resource].

In embodiments, the terminal point may be configured to randomly select the relative channel access pattern from the set of M relative channel access patterns.

In embodiments, the terminal point may be configured to select the relative channel access pattern from the set of M relative channel access patterns on the basis of an intrinsic parameter.

In embodiments, the intrinsic parameter may be a digital signature of the telegram [e.g. a CMAC (One-key MAC)] or a code word for the detection of transfer errors [e.g. a CRC]. In embodiments, the terminal point may be configured to select, from a set of relative channel access patterns with different transfer characteristics [e.g. different latency, or different robustness against interferences], the relative channel access pattern as a function of requirements of the data to be transferred with respect to transmission characteristics [e.g. latency, or robustness against interferences].

In embodiments, the terminal point may be configured to transfer [e.g. to transmit or to receive], according to the relative channel access pattern, as data a data packet divided into a plurality of sub-data packets, wherein the plurality of sub-data packets each comprises only a part of the data packet.

In embodiments, the information may describe a state of a numerical sequence generator [e.g. a periodic numerical sequence generator or a deterministic numerical sequence generator] for generating a numerical sequence, wherein the numerical sequence determines the channel access pattern.

In embodiments, the information may describe a number [e.g. a time slot index and/or a beacon index] of a numerical sequence [e.g. a periodic time slot index sequence and/or a periodic beacon index sequence], wherein the numerical sequence determines the channel access pattern.

Further embodiments provide a base station of a communication system, wherein the communication system wirelessly communicates in a frequency band [e.g. a license-free and/or permission-free frequency band; e.g. an ISM band] used for communication by a plurality of communication systems, wherein the base station is configured to transmit a signal [e.g. a beacon signal], wherein the signal comprises information about a network-specific channel access pattern, wherein the network-specific channel access pattern indicates a frequency hop-based and/or time hop-based occupancy of resources of the frequency band that is usable for the communication of the communication system [e.g. a temporal sequence of frequency resources (e.g. distributed across the frequency band) usable for the communication of the communication system], wherein the base station is configured to transfer [e.g. to transmit or to receive] data by using a relative channel access pattern, wherein the relative channel access pattern indicates, from the usable frequency hop-based and/or time hop-based occupancy of resources of the network-specific channel access pattern, an occupancy of resources that is to be used for the transfer [e.g. the relative channel access patent indicates which of the resources cleared or usable for the communication of the communication system by the network-specific channel access pattern is to be actually used for the transfer of data by the base station].

In embodiments, the occupancy of resources of the relative channel access pattern that is to be used for the transfer may be a subset of the usable frequency hop-based and/or time hop-based occupancy of resources of the network-specific channel access pattern [e.g. wherein the relative channel access pattern only comprises a subset of the resources of the network-specific channel access pattern].

In embodiments, the base station does not know in advance which relative hopping pattern is used by a terminal point.

In embodiments, the base station may be configured to identify the relative hopping pattern used by means of detection [e.g. by a correlation and a threshold value decision].

In embodiments, the relative channel access pattern may differ from another relative channel access pattern based on which the base station transfers [e.g. transmits and/or receives, e.g. transmits to another participant or receives from another participant] other data, wherein the other relative channel access pattern indicates, from the usable frequency hop-based and/or time hop-based occupancy of resources of the network-specific channel access pattern, an occupancy of resources that is to be used for the transfer.

In embodiments, the network-specific channel access pattern may indicate the frequency hop-based and/or time hop-based occupancy of resources of the frequency band to be used for the communication of the communication system in frequency channels [e.g. into which the frequency band is divided] and associated time slots or in frequency channel indices and associated time slot indices.

In embodiments, the network-specific channel access pattern may indicate in the frequency direction [e.g. per time slot or time slot index] a plurality of adjacent or spaced apart resources [e.g. frequency channels or frequency channel indices] of the frequency band.

In embodiments, the relative channel access pattern may indicate in the frequency direction at the most a subset [e.g. at the most one resource, that is one or no resource] of the plurality of adjacent or spaced apart resources of the network-specific channel access pattern.

In embodiments, the relative channel access pattern may indicate for at least one time hop [e.g. for at least one time slot or time slot index] in the frequency direction a different resource of the plurality of adjacent or spaced apart resources of the network-specific channel access pattern than another relative channel access pattern based on which the base station transfers [e.g. transmits and/or receives, e.g. transmits to another participant or receives from another participant] other data, wherein the other relative channel access pattern indicates, from the usable frequency hop-based and/or time hop-based occupancy of resources of the network-specific channel access pattern, an occupancy of resources that is to be used for the transfer.

In embodiments, different symbol rates and/or a different number of symbols may be allocated in the frequency direction to at least two resources [e.g. frequency channels or frequency channel indices] of the plurality of adjacent or spaced apart resources.

In embodiments, the plurality of adjacent resources may form in the frequency direction a block [e.g. a cluster] of connected resources, wherein different symbol rates and/or different numbers of symbols are allocated to different parts of the block of connected resources.

In embodiments, the base station may be configured to select the relative channel access pattern from a set [e.g. a supply] of M relative channel access patterns, wherein the M relative channel access patterns indicate, from the usable frequency hop-based and/or time hop-based occupancy of resources of the network-specific channel access pattern, an occupancy of resources that is to be used for the transfer, wherein the M relative channel access patterns are different [e.g. different at least in the occupancy of one resource].

In embodiments, the base station may be configured to randomly select the relative channel access pattern from the set of M relative channel access patterns.

In embodiments, the base station may be configured to select the relative channel access pattern from the set of M relative channel access patterns on the basis of an intrinsic parameter.

In embodiments, the intrinsic parameter may be a digital signature of the telegram [e.g. a CMAC (One-key MAC)] or a code word for the detection of transfer errors [e.g. a CRC].

In embodiments, the base station may be configured to generate the relative channel access pattern as a function of requirements of the data to be transferred with respect to transfer characteristics [e.g. latency, or robustness against interferences].

In embodiments, the base station may be configured to select, from a set of relative channel access patterns with different transfer characteristics [e.g. a different latency, or a different robustness against interferences], the relative channel access pattern as a function of requirements of the data to be transferred with respect to transmission characteristics [e.g. latency, or robustness against interferences].

In embodiments, the base station may be configured to transfer [e.g. to transmit or to receive], according to the relative channel access pattern, as data a data packet divided into a plurality of sub-data packets, wherein the plurality of sub-data packets each comprises only a part of the data packet.

In embodiments, the information may describe a state of a numerical sequence generator [e.g. a periodic numerical sequence generator or a deterministic numerical sequence generator] for generating a numerical sequence, wherein the numerical sequence determines the channel access pattern.

In embodiments, the information may describe a number [e.g. a time slot index and/or a beacon index] of a numerical sequence [e.g. a periodic time slot index sequence and/or a periodic beacon index sequence], wherein the numerical sequence determines the channel access pattern.

Further embodiments provide a communication system with at least one of the above-described terminal points and one of the above-described base stations.

Further embodiments provide a method for operating a terminal point of a communication system, wherein the communication system wirelessly communicates in a frequency band [e.g. a license-free and/or permission-free frequency band; e.g. an ISM band] used for communication by a plurality of communication systems. The method includes a step of receiving a signal [e.g. a beacon signal], wherein the signal comprises information about a network-specific channel access pattern, wherein the network-specific channel access pattern indicates a frequency hop-based and/or time hop-based occupancy of resources of the frequency band that is usable for the communication of the communication system [e.g. a temporal sequence of frequency resources (e.g. distributed across the frequency band) usable for the communication of the communication system]. The method further includes a step of transferring data by using a relative channel access pattern, wherein the relative channel access pattern indicates, from the usable frequency hop-based and/or time hop-based occupancy of resources of the network-specific channel access pattern, an occupancy of resources that is to be used for the transfer [e.g. the relative channel access patent indicates which of the resources cleared or usable for the communication of the communication system by the network-specific channel access pattern is to be actually used for the transfer of data by the terminal point].

Further embodiments provide a method for operating a base station of a communication system, wherein the communication system wirelessly communicates in a frequency band [e.g. a license-free and/or permission-free frequency band; e.g. an ISM band] used for communication by a plurality of communication systems. The method includes a step of transmitting a signal [e.g. a beacon signal], wherein the signal comprises information about a network-specific channel access pattern, wherein the network-specific channel access pattern indicates a frequency hop-based and/or time hop-based occupancy of resources of the frequency band that is usable for the communication of the communication system [e.g. a temporal sequence of frequency resources (e.g. distributed across the frequency band) usable for the communication of the communication system]. The method further includes a step of transferring data by using a relative channel access pattern, wherein the relative channel access pattern indicates, from the usable frequency hop-based and/or time hop-based occupancy of resources of the network-specific channel access pattern, an occupancy of resources that is to be used for the transfer [e.g. the relative channel access patent indicates which of the resources cleared or usable for the communication of the communication system by the network-specific channel access pattern is to be actually used for the transfer of data by the base station].

Further embodiments provide a controller for a participant of a communication system, wherein the communication system wirelessly communicates in a frequency band used for communication by a plurality of communication systems, wherein the controller is configured to identify a network-specific channel access pattern, wherein the network-specific channel access pattern indicates a frequency hop-based and/or time hop-based occupancy of resources of the frequency band that is usable for the communication of the communication system, wherein the controller is configured to identify a relative channel access pattern, wherein the relative channel access pattern indicates, from the usable frequency hop-based and/or time hop-based occupancy of resources of the network-specific channel access pattern, an occupancy of resources that is to be used for the transfer of data of the participant.

In embodiments, the occupancy of resources of the relative channel access pattern that is to be used for the transfer may be a subset of the usable frequency hop-based and/or time hop-based occupancy of resources of the network-specific channel access pattern [e.g. wherein the relative channel access pattern only comprises a subset of the resources of the network-specific channel access pattern].

In embodiments, the relative channel access pattern may differ from another relative channel access pattern based on which the participant transfers [e.g. transmits and/or receives] other data or based on which another participant

[e.g. an end point and/or a base station] of the communication system transfers [e.g. transmits and/or receives] data, wherein the other relative channel access pattern indicates, from the usable frequency hop-based and/or time hop-based occupancy of resources of the network-specific channel access pattern, an occupancy of resources that is to be used for the transfer.

In embodiments, the network-specific channel access pattern may indicate the frequency hop-based and/or time hop-based occupancy of resources of the frequency band to be used for the communication of the communication system in frequency channels [e.g. into which the frequency band is divided] and associated time slots or in frequency channel indices and associated time slot indices.

In embodiments, the network-specific channel access pattern may indicate in the frequency direction [e.g. per time slot or time slot index] a plurality of adjacent or spaced apart resources [e.g. frequency channels or frequency channel indices] of the frequency band.

In embodiments, the relative channel access pattern may indicate in the frequency direction at the most a subset [e.g. at the most one resource, that is one or no resource] of the plurality of adjacent or spaced apart resources of the network-specific channel access pattern.

In embodiments, the relative channel access pattern may indicate in the frequency direction a different resource of the plurality of adjacent or spaced apart resources of the network-specific channel access pattern than another relative channel access pattern based on which the participant transfers [e.g. transmits and/or receives] other data or based on which another participant [e.g. an end point and/or a base station] of the communication system transfers [e.g. transmits and/or receives] data, wherein the other relative channel access pattern indicates, from the usable frequency hop-based and/or time hop-based occupancy of resources of the network-specific channel access pattern, an occupancy of resources that is to be used for the transfer.

In embodiments, different symbol rates and/or a different number of symbols may be allocated in the frequency direction to at least two resources [e.g. frequency channels or frequency channel indices] of the plurality of adjacent or spaced apart resources.

In embodiments, the plurality of adjacent resources may form in the frequency direction a block [e.g. a cluster] of connected resources, wherein different symbol rates and/or different numbers of symbols are allocated to different parts of the block of connected resources.

In embodiments, the controller may be configured to select the relative channel access pattern as a function of requirements of the data to be transferred with respect to transfer characteristics [e.g. latency, or robustness against interferences] from a set of relative channel access patterns with different transfer characteristics [e.g. different latency, or different robustness against interferences]

In embodiments, the controller may be configured to generate the relative channel access pattern as a function of requirements of the data to be transferred with respect to transfer characteristics [e.g. latency, or robustness against interferences].

In embodiments, the controller may be configured to pseudo-randomly identify the channel access pattern as a function of a state of a numerical sequence generator for generating a numerical sequence or a number of a numerical sequence.

In embodiments, the controller may be configured to identify the channel access pattern as a function of the state of the numerical sequence generator or a number of the numerical sequence derived from the state of the numerical sequence generator.

In embodiments, states of the numerical sequence generator [e.g. immediately] following the state of the numerical sequence generator are identifiable on the basis of the state of the numerical sequence generator, wherein the controller may be configured to identify the channel access pattern as a function of the following states of the numerical sequence generator or following numbers of the numerical sequence derived therefrom.

In embodiments, the controller may be configured to identify the channel access pattern as a function of individual information of the communication system [e.g. intrinsic information of the communication system such as a network-specific identifier].

In embodiments, the controller may be configured to map, by using a mapping function:
    the state of the numerical sequence generator, or a number of the numerical sequence derived from the state of the numerical sequence generator, or the number of the numerical sequence, and
    the individual information of the communication system onto time information and frequency information, wherein the time information and the frequency information describe a resource of the channel access pattern.

In embodiments, the controller may be configured to identify a pseudo random number R as a function of:
    the state of the numerical sequence generator, or a number of the numerical sequence derived from the state of the numerical sequence generator, or the number of the numerical sequence, and
    individual information of the communication system,
wherein the pseudo random number R determines the channel access pattern.

In embodiments, the controller may be configured to identify a resource [e.g. a frequency channel and/or a time slot, or a frequency channel index and/or a time slot index] of the channel access pattern on the basis of the pseudo random number R.

Further embodiments provide a method for operating a participant of a communication system, wherein the communication system wirelessly communicates in a frequency band used for communication by a plurality of communication systems. The method includes a step of determining a network-specific channel access pattern, wherein the network-specific channel access pattern indicates a frequency hop-based and/or time hop-based occupancy of resources of the frequency band that is usable for the communication of the communication system. The method further includes a step of determining a relative channel access pattern, wherein the relative channel access pattern indicates, from the usable frequency hop-based and/or time hop-based occupancy of resources of the network-specific channel access pattern, an occupancy of resources that is to be used for the transfer of data of the participant.

Embodiments increase the performance of a digital radio transfer system by reducing the reciprocal disturbance between different participants within a radio network (intra-network interference) and between mutually uncoordinated radio networks (inter-network interference). According to embodiments, this effect is achieved by using within a network relative channel access patterns that are arranged hierarchically below the network-specific channel access pattern and, in combination with the same, lead to the fact that in a packet data transfer according to the TSMA method there are as few radio resources that may be simultaneously used by several participants (within or outside of the own network) as possible. This leads to a reduction of the collisions of partial data packets. The benefit of the invention is increased within a rising number of available relative channel access patterns, since the probability that at least two participants simultaneously use the same channel access pattern (complete collision of the partial data packets) is decreased accordingly.

The increased performance results either (with a given load) in a reduced packet error rate or (with a given packet error rate) in a higher utilization of the networks.

BRIEF DESCRIPTION OF THE DRAWINGS

Embodiments of the present invention will be detailed subsequently referring to the appended drawings, in which:

FIG. 24 shows, in a table, a resource calculation for different exemplary application cases, FIG. 29 shows a flow diagram of a method for operating a base station of a communication system, wherein the communication system wirelessly communicates in a frequency band used for communication by a plurality of communication systems, according to an embodiment.

DETAILED DESCRIPTION OF THE INVENTION

Figure 1:
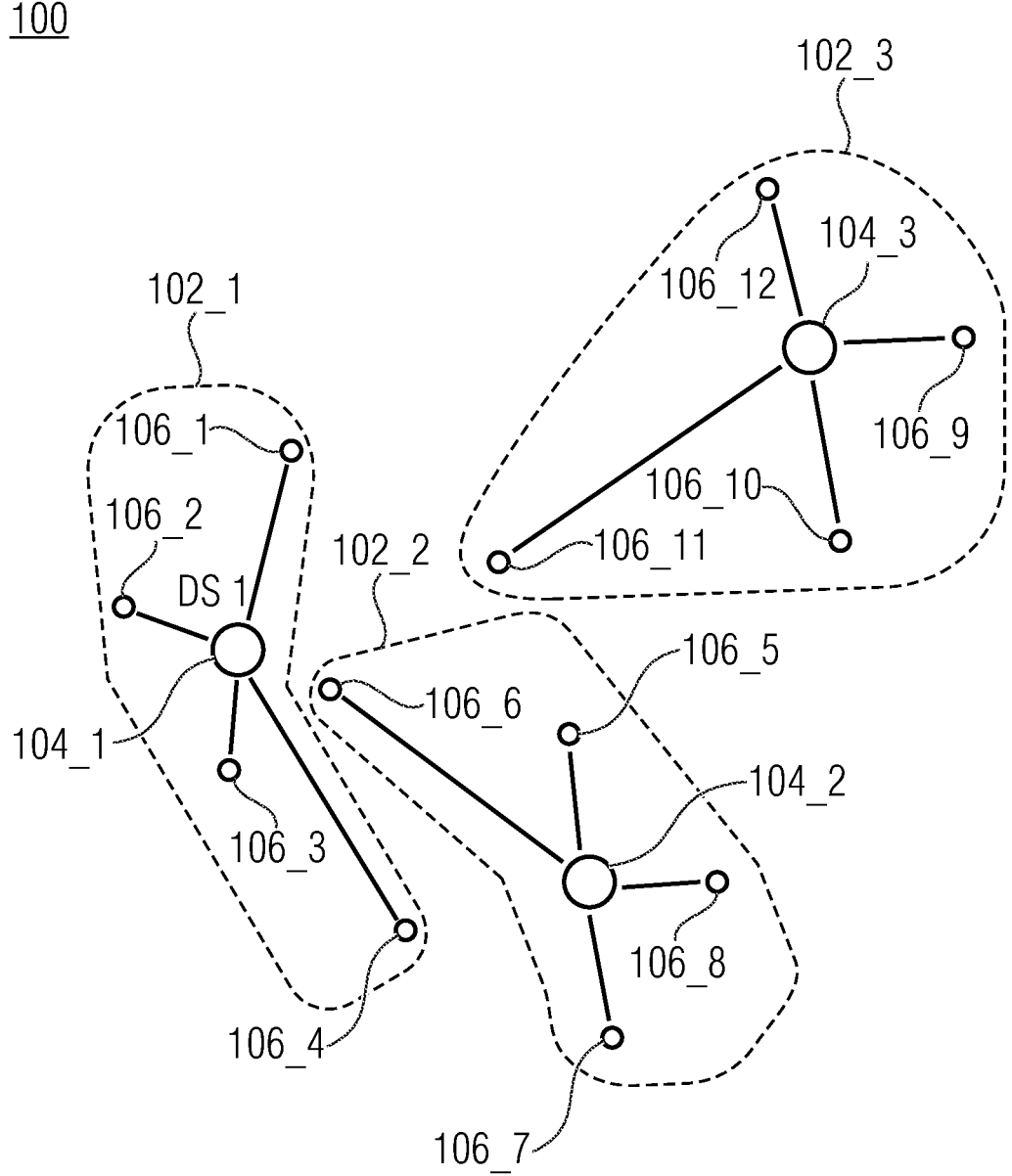
FIG. 1 shows a schematic block circuit diagram of a communication arrangement with a first communication system, according to an embodiment of the present invention.

In the subsequent description of the embodiments of the present invention, the same elements or elements having the same effect are provided with the same reference numerals in the drawings so that their description is mutually interchangeable.

What is first explained is how communication systems that communicate in the same frequency band possibly used for communication by a plurality of communication systems may be separated from one another by different channel access patterns, before it is subsequently explained how one or several participants of a communication system may access, by using a relative channel access pattern, a selection of the resources cleared for the communication system by the network-specific channel access pattern.

A. Network-Specific Channel Access Patterns

FIG. 1 shows a schematic block circuit diagram of a communication arrangement 100 with a first communication system 102_1, according to an embodiment of the present invention.

The first communication system 102_1 may comprise a base station 104_1 and one or several terminal points 106_1-106_n, wherein n is a natural number larger than or equal to one. In the embodiment shown in FIG. 1, for illustrative purposes, the first communication system 102_1 comprises four terminal points 106_1-106_4, however, the first communication system 102_1 may also comprise 1, 10, 100, 1.000, 10.000, or even 100,000 terminal points.

The first communication system 102_1 may be configured to wirelessly communicate in a frequency band (e.g. a license-free and/or permission-free frequency band such as the ISM bands) used for communication by a plurality of communication systems. In this case, the frequency band may comprise a significantly larger (e.g. at least larger by a factor of two) bandwidth than reception filters of the participants of the first communication system 102_1.

As is indicated in FIG. 1, a second communication system 102_2 and a third communication system 1023 may be in the range of the first communication system 102_1, for example, wherein these three communication systems 102_1, 1022, and 102_3 may use the same frequency band to wirelessly communicate.

In embodiments, the first communication system 102_1 may be configured to use for the communication different frequencies or frequency channels of the frequency band (e.g. into which the frequency band is divided) in portions (e.g. in time slots) on the basis of a channel access pattern, regardless of whether these are used by another communication system (e.g. the second communication system 102_2 and/or the third communication system 102_3), wherein the channel access pattern differs from another channel access pattern based on which at least one other communication system of the plurality of other communication systems (e.g. the second communication system 102_2) accesses the frequency band.

In such a communication arrangement 100 shown in FIG. 1, the signals of mutually uncoordinated communication systems (e.g. the first communication system 102_1 and the second communication system 102_2) may therefore be separated from one another by different channel access patterns so that a reciprocal disturbance by interferences is avoided or minimized.

For example, participants of the first communication system 102_1, e.g. a base station 104_1 and several terminal points 106_1-106_4, may wirelessly communicate among themselves on the basis of a first channel access pattern (e.g. which indicates a frequency hop-based occupancy (e.g. of resources) of the frequency band, usable for the communication of the first communication system 102_1), whereas participants of the second communication system 102_2, e.g. a base station 104_2 and several terminal points 106_5-106_8, may wirelessly communicate among themselves on the basis of a second channel access pattern (e.g. which indicates a frequency hop-based occupancy (e.g. of resources) of the frequency band, usable for the communication of the second communication system 102_2), wherein the first channel access pattern and the second channel access pattern are different (e.g. comprise an overlap of less than 20% in the resources used, in the ideal case there is no overlap).

As mentioned above, the communication systems (e.g. the first communication system 102_1 and the second communication system 102_2) are mutually uncoordinated.

The communication systems 102_1, 102_2, 102_3 being mutually uncoordinated refers to the fact that the communication systems mutually (=among the communication systems) do not exchange any information about the respectively used channel access pattern, or, in other words, a communication system does not have any knowledge about the channel access pattern used by another communication system. Thus, the first communication system 102_1 does not know which channel access pattern is used by another communication system (e.g. the second communication system 102_2).

Thus, embodiments refer to a communication arrangement 100 of mutually uncoordinated and, possibly, mutually unsynchronized radio networks (or communication systems) 102_1, 102_2 for the transfer of data which access a mutually used frequency band. In other words, there are at least two radio networks 102_1, 102_2 that operate independently of one another. Both networks 102_1, 102_2 use the same frequency band.

In embodiments, it is assumed that in each individual data transfer only a (small) part of the frequency band is used, e.g. a frequency channel or a partial frequency channel. For example, the frequency band may be split into (partial) frequency channels, wherein a frequency channel is a real subset of the total frequency band. The totality of all available frequency channels constitutes the frequency band used. For example, in the telegram-splitting method, the transfer of a message (data packet) may be carried out consecutively via a sequence of different frequency channels. In this case, embodiments are particularly useful.

Oftentimes, networks (or communication systems) 102_1, 102_2 are arranged such that transmission signals of participants of a network (e.g. the communication system 102_2) can also be received by participants of other nearby networks (e.g. the communication system 102_1). There, they act as disturbance signals (interferences) that, in principal, may significantly decrease the performance of a radio transfer system, as is shown in FIG. 2.

Figure 2:
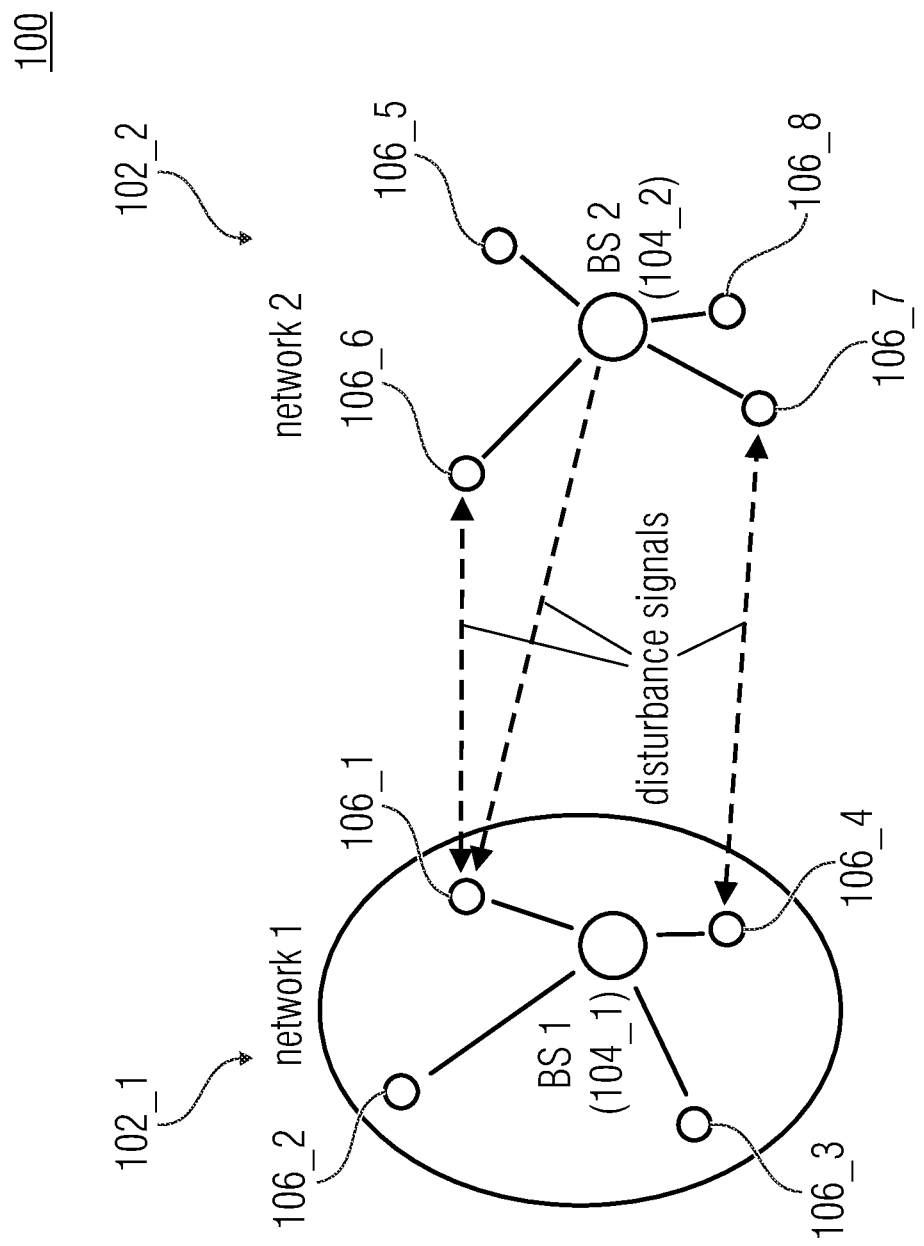
FIG. 2 shows a schematic block circuit diagram of a communication arrangement of two mutually uncoordinated networks having one base station and four associated terminal devices each, according to an embodiment of the present invention.

In detail, FIG. 2 shows a schematic view of two mutually uncoordinated networks 102_1, 102_2 with a base station (BS 1) 1041, (BS 2) 104_2, respectively, and four associated terminal devices 106_1-106_4, 106_5-106_8, respectively. In other words, FIG. 2 shows an example network topology for two networks 102_1, 102_2 with base stations (BS 1) 1041, (BS 2) 104_2 and four terminal devices 106_1-106_4, 106_5-106_8 each. The dashed arrows 108 exemplarily symbolize potential disturbance signals, i.e. the radio participants may receive the transmission signals of the receivers from the respectively other network as disturbance signals. Depending on the circumstances, a multitude of networks may be in a mutual reception range so that the participants (base stations or terminal devices) may be possibly exposed to a significant number of disturbers from other networks.

If (as mentioned above) the frequency band as a commonly used resource is divided into individual non-overlapping frequency channels, the effect of the disturbance signals may be significantly reduced. In mutually coordinated networks, a part of the frequency band (a set of frequency channels) may be exclusively allocated to each network so that the reciprocal disturbance (interference) may be minimized. In fully uncoordinated networks, this is not possible.

Thus, in embodiments, accessing the physical transform medium (i.e. the physical radio channel) is implemented in each network such that at least one of the following is fulfilled:
    a) the channel access, i.e. the frequency occupancy and time occupancy of the radio channel, in a network has as little overlap as possible in time and frequency with the channel access in another network of the same standard (high degree of "orthogonality"),
    b) the channel access has a (pseudo) random character within desired specifications (e.g. mean access frequency per time) ("randomness"),
    c) as far as this is avoidable according to the specifications, there are not any longer sequences of an identical (in time and frequency) channel access between networks ("avoidance of systematic overlaps"),
    d) all frequency channels within the frequency band are used as regularly as possible in order to achieve as high a frequency diversity as possible and, possibly, the adherence to official regulatory specifications ("uniform distribution of the frequency channel used"),
    e) the information about the frequency occupancy and time occupancy of the radio channels, e.g. for new participants joining a network, may be transmitted with as little signaling effort as possible ("reduction of signaling information").

Simply put, in embodiments, a mutual disturbance between several networks (intern-network interference) is reduced by carrying out the channel access to the mutually used frequency band differently in frequency and time, advantageously as "orthogonal" as possible and with a (pseudo) random character.

In the following, for illustrative purposes, beside the division of the frequency band into discrete frequency channels (indices c0, c1, c2, . . . ), what is assumed to be also carried out is a temporal discretization of the accesses within a respective network. The associated temporal resources are referred to as time slots and are provided in FIG. 3 with the indices t0, t1, t2, . . . . However, both requirements (discretization in frequency and time) are not necessary prerequisites for the application of embodiments.

Figure 3:
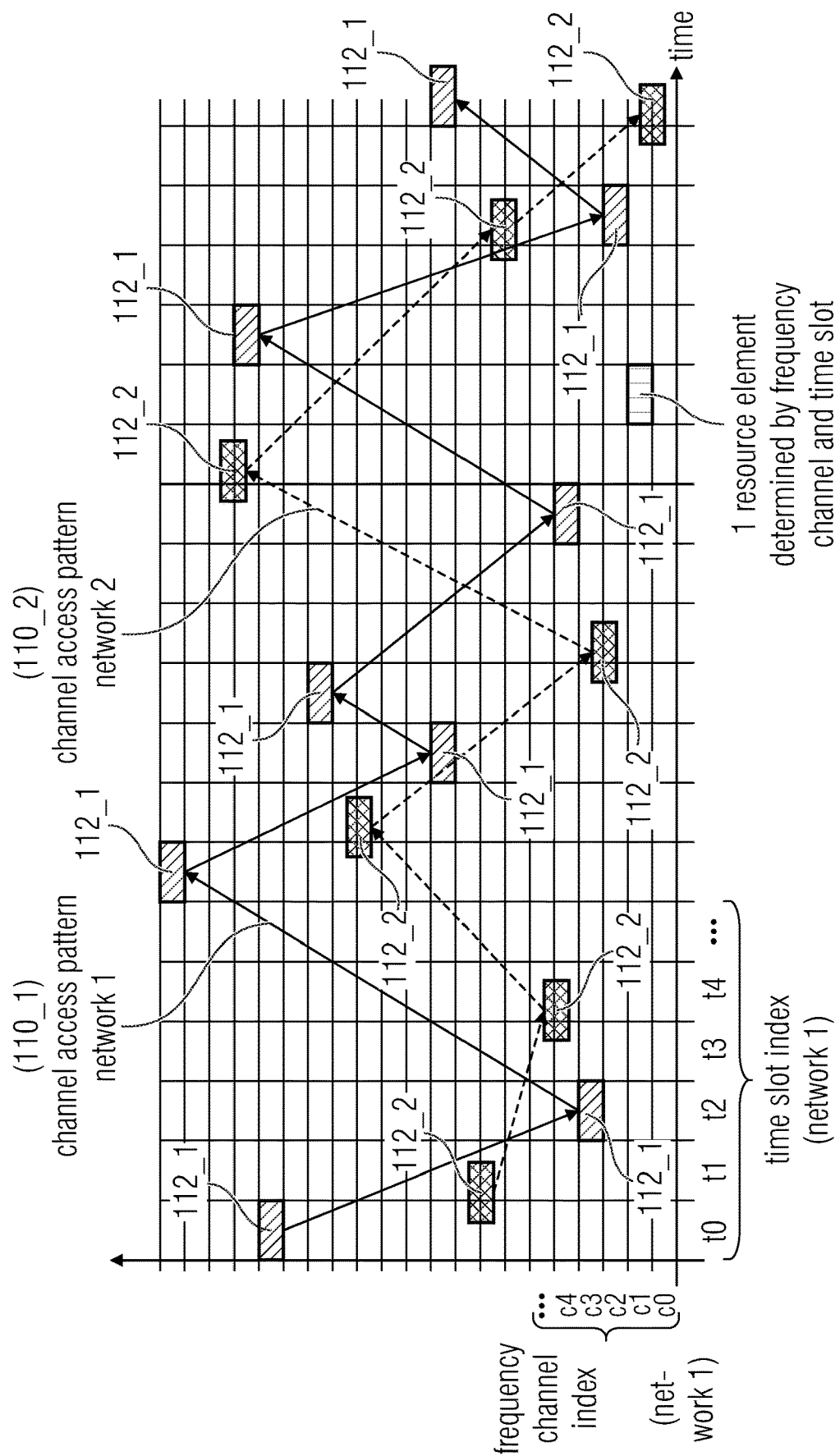
FIG. 3 shows, in a diagram, a division of the frequency band into resources and a frequency hop-based and time hop-based occupancy of the resources of the frequency band defined by two different channel access patterns, according to an embodiment of the present invention.

In detail, FIG. 3 shows, in a diagram, a division of the frequency band into resources and a frequency hop-based and time hop-based occupancy of the resources of the frequency band defined by two different channel access patterns. Here, the ordinate describes the frequency channel indices and the abscissa describes the time slot indices.

For example, the participants of the first communication system 102_1 may wirelessly communicate among themselves on the basis of the first channel access pattern 110_1, which indicates a frequency hop-based occupancy of resources of the frequency band to be used for the communication of the first communication system 102_1, whereas participants of the second communication system 102_2 wirelessly communicate among themselves on the basis of the second channel access pattern 110_2, which indicates a frequency hop-based occupancy of resources of the frequency band, usable for the communication of the second communication system 102_2, wherein the first channel access pattern and the second channel access pattern are different (e.g. comprise an overlap of less than 20%, not comprising any overlap in the ideal case).

In other words, FIG. 3 shows in grid form an overview of all fundamentally available resources in frequency and time (schematic illustration of the frequency channels and time slots and exemplary channel access patterns), wherein an individual resource element in the first communication network 102_1 is determined by allocation of a frequency channel index and a time slot index. As an example, the resources that can be occupied by the first communication network 102_1 are the resource elements indicated with the reference numeral 112_1. The set of all resources that can be occupied within a communication network represent a channel access pattern 110_1. For the first communication network 102_1, these are all resource elements indicated by the reference numeral 112_1 and connected via arrows. Equivalently, the channel access pattern of a further communication network (e.g. the second communication network 102_2) is exemplarily drawn in FIG. 3 (all resource elements indicated by reference numeral 112_2 and connected via arrows), which is not anchored in the same frequency grid and time grid as the first communication network 102_1 (resource elements are shifted in frequency and time from the base grid of the first communication system 102_1).

It is important to differentiate between
- all fundamentally (maximum) available resource elements, i.e. the total quantity of all resource elements from which the channel access pattern selects an appropriate subset (e.g. all elements of the grid in FIG. 3),
- all resource elements (in FIG. 3, all resource elements provided with the reference numeral 112_1) actually included into the channel access pattern, and
- the quantity of resource elements (of the channel access pattern) that can actually be occupied in the network for a data transfer (e.g., with a low amount of data, only every third resource element available in the channel access pattern could actually be used).

The design of the channel access pattern therefore also means a determination of the actively usable resource supply for this communication network (or communication system).

Embodiments of base stations, terminal points, and/or communication systems using channel access patterns that fulfil at least one of the above-mentioned criteria a) to e) for communication are described in the following. In addition, embodiments of the generation of such channel access patterns are described in the following.

A.1. Base Station, Terminal Point and Communication System

Figure 4:
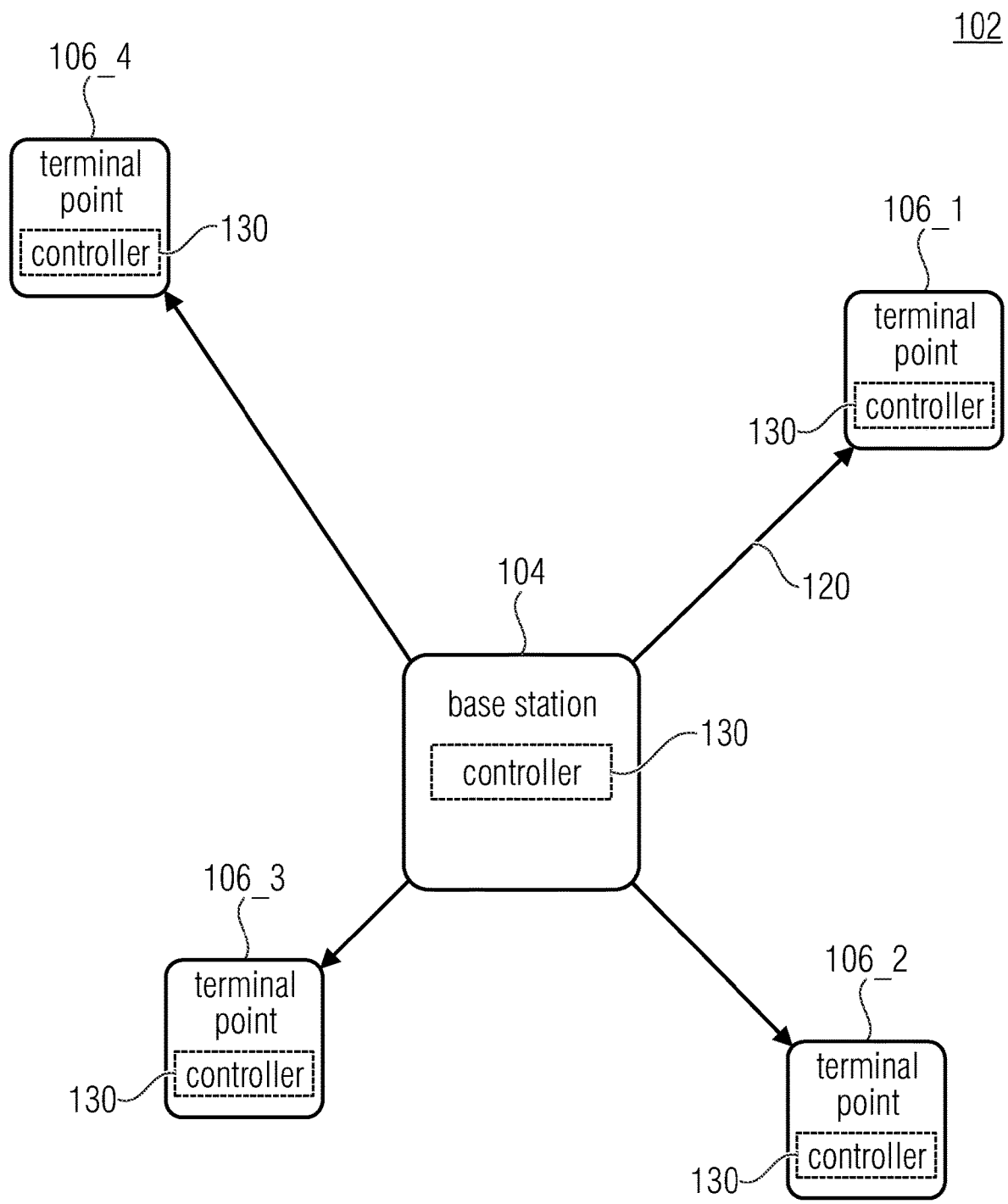
FIG. 4 shows a schematic block circuit diagram of a communication system with one base station and a plurality of terminal points, according to an embodiment of the present invention.

FIG. 4 shows a schematic block circuit diagram of a communication system 102 with one base station 104 and a plurality of terminal points 106_1-106_4, according to an embodiment.

As shown in FIG. 4 according to an embodiment, the communication system 102 may comprise one base station and four terminal points 106_1-106_4. However, the present invention is not limited to such embodiments, rather, the communication system may comprise one or several terminal points 106_1-106_n, wherein n is a natural number larger than or equal to one. For example, the communication system may comprise 1, 10, 100, 1000, 10,000, or even 100,000 terminal points.

The participants (=the base station 104 and terminal points 106_1-106_4) of the communication system shown in FIG. 4 use for mutual communication a frequency band (e.g. a license-free and/or permission-free frequency band such as the ISM bands) used for communication by a plurality of communication systems, as described above with reference to FIGS. 1 to 3. In this case, the communication system 102 operates in an uncoordinated manner with respect to the other communication systems that use the same frequency band.

In embodiments, the base station 104 may be configured to transmit a signal 120, wherein the signal 120 comprises information about a channel access pattern 110, wherein the channel access pattern indicates a frequency hop-based and/or time hop-based occupancy (e.g. of resources) of the frequency band, usable for the communication of the communication system 102 (e.g. a temporal sequence of frequency resources (e.g. distributed across the frequency band) usable for the communication of the communication system), wherein the information describes a state of a numerical sequence generator for generating a numerical sequence, wherein the numerical sequence determines the channel access pattern.

For example, the state of the numerical sequence generator may be an internal state of the numerical sequence generator, wherein a number of the numerical sequence may be derived from the internal state of the numerical sequence generator. On the basis of the internal state of the numerical sequence generator, internal states of the numerical sequence generator following the internal state of the numerical sequence generator may be identified, from which following numbers of the numerical sequence may also be derived. For example, the number of the numerical sequence may be directly derived from the internal state of the numerical sequence generator (e.g. state=number), e.g. in the implementation of the numerical sequence generator as a counter, or via a mapping function, e.g. in the implementation of the numerical sequence generator as a shift register, possibly with feedback.

In embodiments, at least one of the terminal points 106_1, 106_4 may be configured to receive the signal 120 with the information about the channel access pattern 110, and to identify the channel access pattern 110 on the basis of the information about the channel access pattern, wherein the information describes a state of a numerical sequence generator for generating a numerical sequence, wherein the numerical sequence determines the channel access pattern.

For example, the base station 104 and/or at least one of the terminal points 106_1-106_4 may be configured to pseudo-randomly identify the channel access pattern as a function of the state of the numerical sequence generator, e.g. by using a pseudo-random mapping function.

In addition, the base station 104 and/or at least one of the terminal points 106_1-106_4 may be configured to pseudo-randomly identify the channel access pattern as a function of individual information of the communication system (e.g. intrinsic information of the communication system such as a network-specific identifier).

Embodiments of the generation of channel access patterns are described in the following. In this case, the channel access patterns are generated by the base station 104 and may be identified by one (or all) of the terminal points 106_1-106_4 shown in FIG. 4 on the basis of the signal with the information 120 via the channel access pattern, e.g. by a controller (controlling device, controlling unit) 130 each, implemented into the base station 104 and/or into the terminal points 106_1-106_4. In this case, the specification of the channel access patterns is done (exclusively) by the base station 104, whereas the terminal points 106_1-106_4 only "know" the channel access pattern, i.e. they generate the same according to the same method as the base station 104.

The following description assumes a radio transfer system (or a communication arrangement) with several independent, mutually uncoordinated communication networks whose participants are in a mutual reception range so the transmission signals from participants of one network may potentially be considered as disturbance signals for participants of other networks. For the application of embodiments, it is not required to exchange information (data or signalization information) between different networks. Likewise, it is irrelevant whether the networks are synchronized in time and/or frequency with respect to each other.

In addition, what is assumed is that, within each network, there is a coordinating instance (in the following referred to as "base station") which may transmit to the non-coordinating participants of the network (in the following referred to as "terminal devices" or "terminal points") information about the channel access pattern applied within the network. For example, this information may be transmitted via regularly emitted beacon signals, however, it may also be transferred in irregular intervals or, possibly, in a dedicated manner to individual terminal devices or groups of terminal devises.

In addition, what is assumed is that the entire frequency band available for the transfer is divided into a multitude of individual frequency channels that may each be accessed individually or in subsets (groups of frequency channels).

Without limiting the generality and for a better illustration, the following assumes that there is a fixed, discrete time pattern within each network with which channel accesses may be carried out (cf. FIG. 3). A channel access in the form of the emission of a signal may be carried out by terminal devices as well as by the base station. However, a channel access does not necessarily have to be carried out in a resource provided to this end in the channel access pattern, e.g., if there is no data or other information to be transferred.

Figure 5:
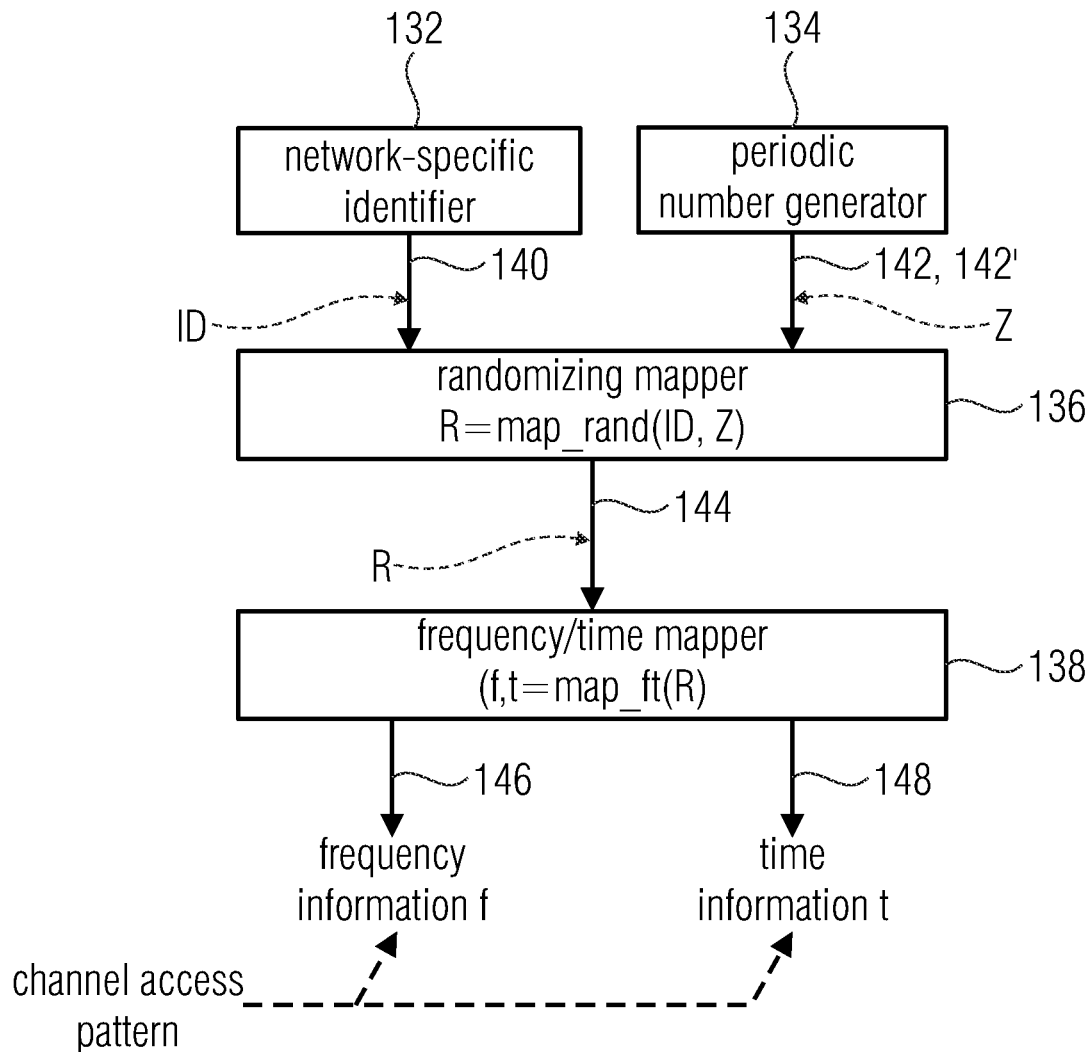
FIG. 5 shows a schematic block circuit diagram of a controller for generating a channel access pattern, according to an embodiment of the present invention.

FIG. 5 shows a schematic block circuit diagram of a controller 130 for generating a channel access pattern, according to an embodiment of the present invention.

As can be seen in FIG. 5, the controller 130 may comprise a memory 132, a periodic number generator 134 for generating a periodic numerical sequence Z, a randomizing mapper 136 and a frequency/time mapper 138.

The memory (e.g. a register) 132 may be configured to store a network-specific identifier ID 140, e.g. a (individual) bit sequence that does not change. The periodic number generator 134 may be configured to provide its state 142 or a number 142' of the periodic numerical sequence derived from its state. The randomizing mapper 136 may be configured to identify a pseudo random number R 144 as a function of the state 142 of the numerical sequence generator 134 or the number 142' of the periodic numerical sequence derived therefrom and the network-specific identifier ID 140. The frequency/time mapper 138 may be configured to identify frequency information f 146 and time information t 148 on the basis of the pseudo random number R 144. For example, the frequency information f 146 and the time information t 148 may describe, or define, a frequency channel and a time slot (or a frequency channel index and a time slot index) and therefore a resource of the channel access pattern.

For example—as is indicated in FIG. 4—the controller 130 may be implemented in the base station 104 and/or in the one or several terminal point(s) 106_1-106_4 so as to calculate the individual (or network-individual) channel access pattern used by the communication system 102.

In other words, FIG. 5 shows the base structure for the generation of channel access patterns according to an embodiment of the present invention.

The generation of the channel access patterns is done iteratively, i.e. the blocks illustrated in FIG. 5 are called up once per generation of a single piece of channel access information. By a call-up of N-times, a channel access pattern with N channel accesses is generated.

The function of the partial blocks is described in detail in the following. The term "number" is used. This is generally discrete information that may be present in different forms (e.g. in decimal form, as a binary sequence, or the like).

Network-Specific Identifier "ID"

The network-specific identifier is a fixed number that is determined by an external instance (e.g. when configuring the network, or the coordinating base station). Ideally, it differs from network to network. For example, it may be an unambiguous, sufficiently long base station ID, unambiguous network ID, or a sufficiently long hash about them, respectively. This variable is fixed and is the only one that does not vary from call-up to call-up in the arrangement shown.

Periodic Number Generator "Z"

The periodic number generator 134 generates a sequence of numbers Z that periodically repeats with the periodicity P. It has an internal state $S_n$ from which the next generated number and the next internal state $S_{n+1}$ can be unambiguously determined. The significant feature is that the entire periodic sequence for each time step may be derived from a single internal state (which is present in an arbitrary time step) already. For example, a simple embodiment is a modulo P counter that periodically delivers the numerical sequence 0, 1, 2 . . . (P–1). A further embodiment is a deterministic random number generator (pseudo random number generator), e.g. implemented in the form of a feedback shift register (LFSR). A third embodiment is a finite body (Galois field) with P elements.

Randomizing Mapper

The randomizing mapper 136 generates from the two input numbers ID and Z an output number R, i.e. R=map_rand(ID, Z) wherein map_rand represents the mapping function. In this case, the mapping has as random a character as possible, i.e. a mathematically correlated input sequence (consisting of ID, Z) generates an output sequence R that is as uncorrelated in itself as possible.

Embodiments for a randomizing mapping are:
linking the two input numbers
applying a cyclic redundancy check (CRC) on the input qualities ID, Z, which leads to the number R and has a randomizing character,
applying a hash function
applying an encryption, e.g. AES encryption, wherein the associated key is known to all authorized participants, and which therefore also represents a method for embedding a "transport layer security" (TLS).

According to the above, the sequence of the elements of the number R is of a pseudo-random nature. It should be different from network to network so as to avoid overlaps of the channel access patterns.

Frequency/Time Mapper

The frequency/time mapper 138 maps, by means of a mapping, to each input number R a 2-tupal of frequency information (radio frequency f) and time information (access time t), i.e. (f,t)=map_ft(R), wherein "map_ft" represents the mapping function. While, in principle, the sequence of the frequencies may be arbitrary within the specified frequency band, the points in time may be present in a monotonously increasing form from call-up to call-up, since "returns" in time are not admissible.

As an embodiment, what is a of particular importance is the case in which the channel access is discretized in time/frequency direction (as described above), i.e. is done in the form of discrete frequency channels and discrete time slots. In this case, the frequency/time mapper allocates to each input numer R a 2-tuple of frequency channel index fi and time slot index ti, i.e. (fi,ti)=map_ft(R). The time slots are indexed in a temporally ascending order, since "returns" in time are not admissible. Further discussions as to the occupancy of the time slots can be found in section 3.

The sequence of the 2-tupel (f,t), or (fi, ti), is based on the sequence of the elements of R and defines the channel access pattern.

The exact implementation of the frequency/time mapper, together with the probability function of the number R, determines the access statistic with respect to the channel.

State Signaling and Predictability

The arrangement shown in FIG. 5 generates a channel access pattern that depends both on a temporally invariable network-specific identifier and on a state-dependent (and therefore temporally variable) periodic number generator (periodicity P). By means of the network-specific identifier, it can be ensured that networks with different network-specific identifiers generate different sequences of R, even if their number generator were to be in the same state. This can ensure that different networks do not generate any identical channel access patterns and therefore, in the worst case, get into a "continuous collision" of the channel accesses.

In order to identify the channel access pattern used in the network, a terminal device needs the network-specific identifier and the respective state of the periodic number generator.

The network-specific identifier is obtained by the terminal device already at the initial log-on at the network. Advantageously, the same is transferred by means of beacon signals regularly emitted by the base station, and is made available to all authorized terminal devices. Alternatively, the network-specific identifier may also be made known to the terminal device in the course of the initial configuration (with delivery), i.e. before the first operation in the network.

The state of the periodic number generator may either be transferred in a regular beacon signal and/or in distinct dedicated state-signaling resources. A number generator with a periodicity P has P internal states so that $\lfloor \log_2(P) \rfloor$ bits are transferred for the transmission of the respective state. The amount of information (number of bits) transferred per state signaling may therefore be controlled by the selected periodicity of the number generator according to the requirements.

The information transferred for the state signaling may be transferred in the form of several pieces of partial information, wherein the transfer may be carried out with different frequencies. Thus, as an embodiment for the case that the periodic number generator (Z) is a counter, the higher-valued bits (most significant bits (MSBs)) of the counter could be transferred separated from the lower-valued bits (least significant bits (LSBs)), and also with different frequencies (e.g. more infrequently). Even if it is not a counter, the entire state information could be transferred in the form of several pieces of partial state information with different transfer frequencies.

Through the periodicity of the number generator, a terminal device that knows the state of the number generator at least at one point in time may determine the entire channel access pattern for any points in time/time slots in the future. This enables the terminal device in an energy-saving idle state to deactivate, e.g., the transmission/reception unit and to predetermine the then valid portion of the channel access pattern from the last previously known state when the transmission/reception unit is subsequently activated. An emission of the state information by the base station may therefore be done in comparatively large temporal intervals.

In summary, the method described herein has the advantage that a comparatively large state space for the (pseudo-random) number R is covered through the combination of a network-specific identifier and a periodic numeric generator. This prevents the channel access patterns of networks to be identical with different network-specified identifiers, which may minimize a systematic collision of the channel accesses of different mutually uncoordinated networks. This proves to be particularly advantageous for the telegram splitting multiple access (TSMA) method.

Advantageous features of the frequency/time mapper are discussed in more detail in the following sections.

Further Embodiment of the Controller

According to FIG. 5 and the above description, a periodic number generator 134 is required. In the following embodiment, it is replaced as follows.

Real radio networks are often operated with a beacon signal that is emitted regularly. In this case, each beacon emission may be provided with a counter that corresponds to a beacon sequence index. Here, this beacon sequence index is referred to as "beacon index".

It is also common practice for the time slots in a time slot-based system to be provided with a time slot index counter (that increases in the time direction) (cf. FIG. 3). Here, this is referred to as "time slot index". The beacon index is reset to zero in certain intervals specified in the system so that it has a periodicity. The same applies to the time slot index (e.g. which restarts at zero after a beacon emission).

Figure 6:
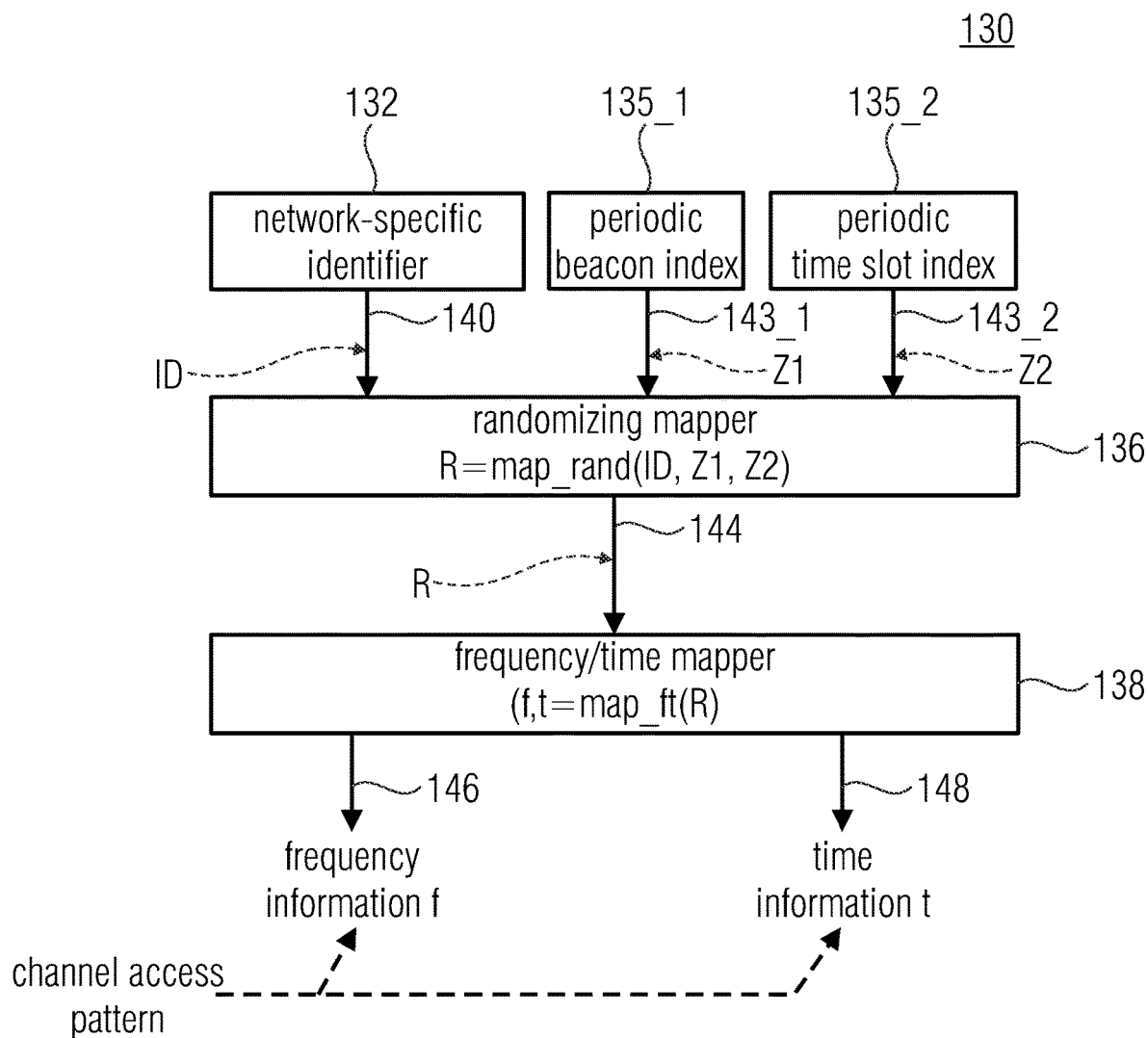
FIG. 6 shows a schematic block circuit diagram of a controller for generating a channel access pattern, according to a further embodiment of the present invention.

FIG. 6 shows a schematic block circuit diagram of a controller 130 for generating a channel access pattern, according to an embodiment of the present invention.

The controller 130 may comprise a memory 132, a first buffer 135_1, a second buffer 135_2, a randomizing mapper 136 and a frequency/time mapper 138.

The memory (e.g. a register) 132 may be configured to store a network-specific identifier ID 140, e.g. a (individual) bit sequence that is invariable. The first buffer (e.g. a register) 135_1 may be configured to store a periodic beacon index Z1 143_1. The second buffer (e.g. a register) 135_2 may be configured to store a periodic time slot index Z2 143_2. The randomizing mapper 136 may be configured to identify a pseudo-random number R 144 as a function of the periodic beacon index Z1 143_1, the periodic time slot index Z2 143_2 and the network-specific identifier ID 140. The frequency/time mapper 138 may be configured to identify frequency information f 146 and time information t 148 on the basis of the pseudo-random number R 144. For example, the frequency information f 146 and the time information t 148 may describe, or define, a frequency channel and a time slot (or a frequency channel index and a time slot index) and therefore a resource of the channel access pattern.

In other words, FIG. 6 shows a modified base structure for generating channel access patterns with a beacon index and a time slot index. FIG. 6 illustrates an embodiment in which, compared to the embodiment shown in FIG. 5, the periodic number generator (output Z) 134 is replaced by the two blocks "periodic beacon index" (output Z1) 135_1 and "periodic time slot index" (output Z2) 135_2. All further blocks are unchanged in function (the randomizing mapper now has three inputs).

The controllers 130 shown in FIGS. 5 and 6 enable the generation of network-individual channel access patterns, comprising at least one of the following characteristics:
- the channel access patterns contain amongst themselves as few overlapping partial sequences as possible,
- there is a large supply of channel access patterns (e.g. in areas with a high network density),
- the channel access patterns are designed such that they have a very high periodicity,
- the channel access patterns lead (if there are corresponding requirements) to an use of the available frequency channels that is uniform on average, signaling of the applied pattern is done by the coordinating instance with as little signaling information as possible, and terminal devices may already determine the content of the access pattern at any future time when the signaling of the channel access is received once and completely (this enables terminal devices, e.g. for energy saving reasons, to introduce longer reception pauses and to determine the valid channel access pattern on the basis of information received before the reception pause, when being switched on again.

A.2. Control of the Channel Access in the Frequency Domain

To simplify the following illustration, what is assumed is that the frequency range (or the frequency band) is divided into discrete frequency channels and that a transfer is carried out according to the TSMA method.

Mobile radio channels usually comprise signal attenuation that varies across the frequency. If a data packet is transferred in the form of several partial data packets according to the TSMA method and if the underlying mobile radio channel is not known in the transmitter, the error rate of the transfer may be reduced or even minimized on average by transferring the individual partial data packets as distributed across the entire frequency domain as possible (using the frequency diversity).

For this reason, it may be advantageous (in particular if a data packet consists of only a few partial data packets) to ensure that the frequency channels on which the partial data packets are transferred have a certain (minimum) distance relative to each other in the frequency domain.

Since the channel access pattern significantly determines the frequency hopping behavior in TSMA within a network, a suitable method may be used to ensure that there is a minimum distance between two consecutive frequency channels of the channel access pattern.

Thus, in embodiments, the frequency/time mapper 138 (cf. FIG. 5 or 6) may be configured to determine frequency information f and time information t on the basis of the pseudo-random number R, wherein the frequency information f indicates a distance between two consecutive frequency channels.

Thus, the frequency/time mapper 138 in FIG. 5 or 6, which determines absolute frequency channels independently from access to access on the basis of the pseudo-random number R, may alternatively also determine distances between two consecutive frequency channels.

Figure 7:
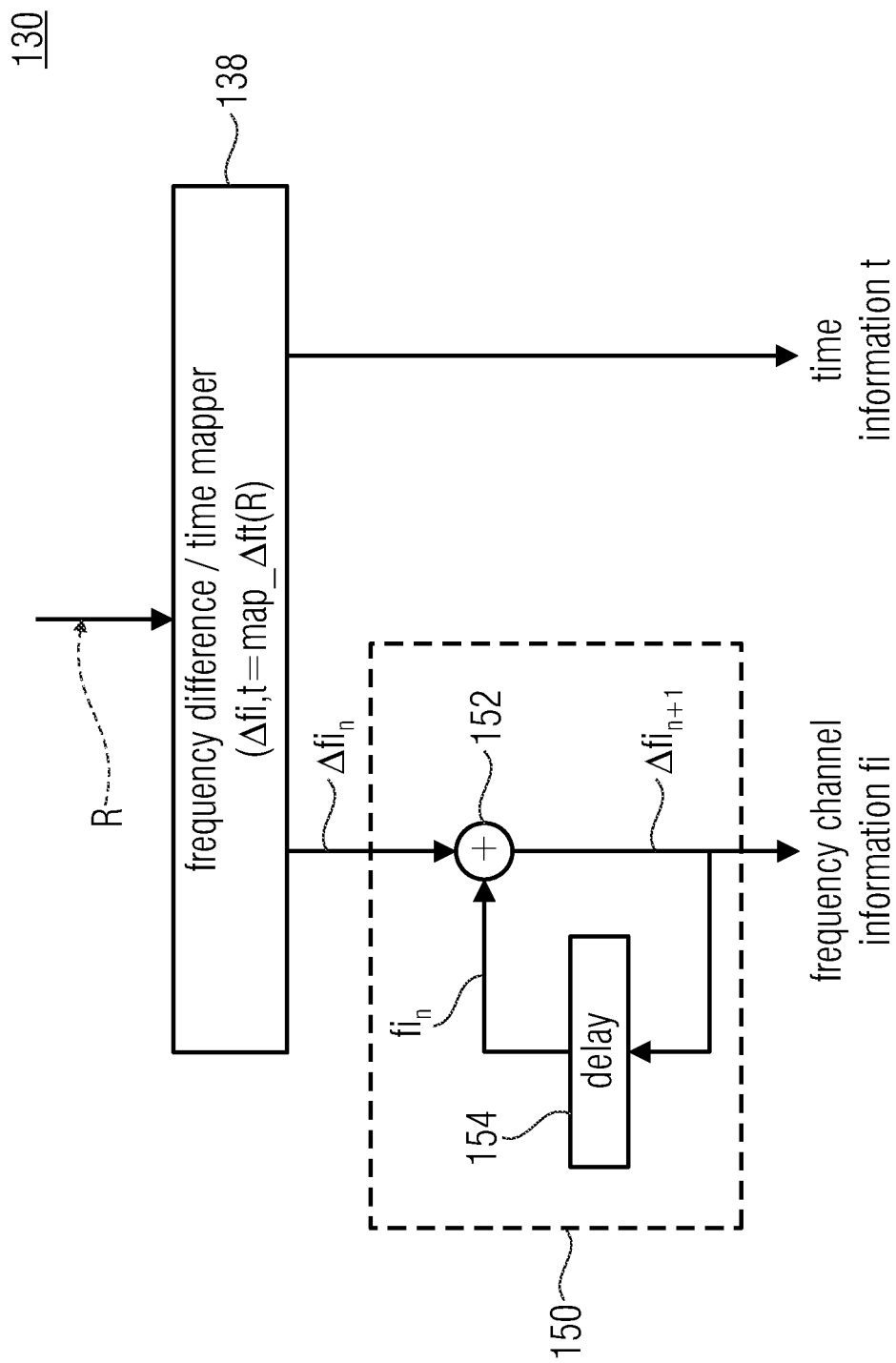
FIG. 7 shows a schematic block circuit diagram of a section of the controller, according to an embodiment of the present invention.

FIG. 7 shows a schematic block circuit diagram of a section of the controller 130, according to an embodiment. As can be seen in FIG. 7, the frequency/time mapper 138 (cf. FIG. 5 or 6) may be configured to determine frequency information and time information on the basis of the pseudo-random number R, wherein the frequency information indicates a distance $\Delta fi_n$ between two consecutive frequency channels.

As can further be seen in FIG. 7, the controller 130 may comprise a mapper 150 configured to map the distance $\Delta fi_n$ between two consecutive frequency channels onto a frequency channel index fi, e.g. by means of a combiner (e.g. adder) 152 and a delay element 154.

In other words, FIG. 7 shows the generation of frequency hops with minimum and/or maximum hop widths. FIG. 7 illustrates that the frequency/time mapper 138 of FIG. 5 or 6 is now replaced by a frequency difference/time mapper 138 that no longer provides absolute frequency channel indices at its immediate output, but frequency channel index differences.

By means of a suitable mapping function $(\Delta fi,t)=map\_\Delta ft(R)$ in the frequency difference/time mapper, it may be ensured that only frequency channel index hops $\Delta fi_n = fi_{n+1} - fi_n$ (from channel access n to channel access n+1) are carried out, e.g., that are within a desired range, e.g. $\Delta fi_{max} \geq \Delta fi \geq \Delta fi_{min}$ for $\Delta fi > 0$ and $\Delta fi_{max} \geq (-\Delta fi) \geq \Delta fi_{min}$ for $\Delta fi < 0$. There are numerous methods for the implementation of such a limitation, which are not subject of the invention.

An exemplary implementation in the form of a corresponding program code for MATLAB (which was used to generate FIG. 8) can be found in the appendix.

Figure 8:
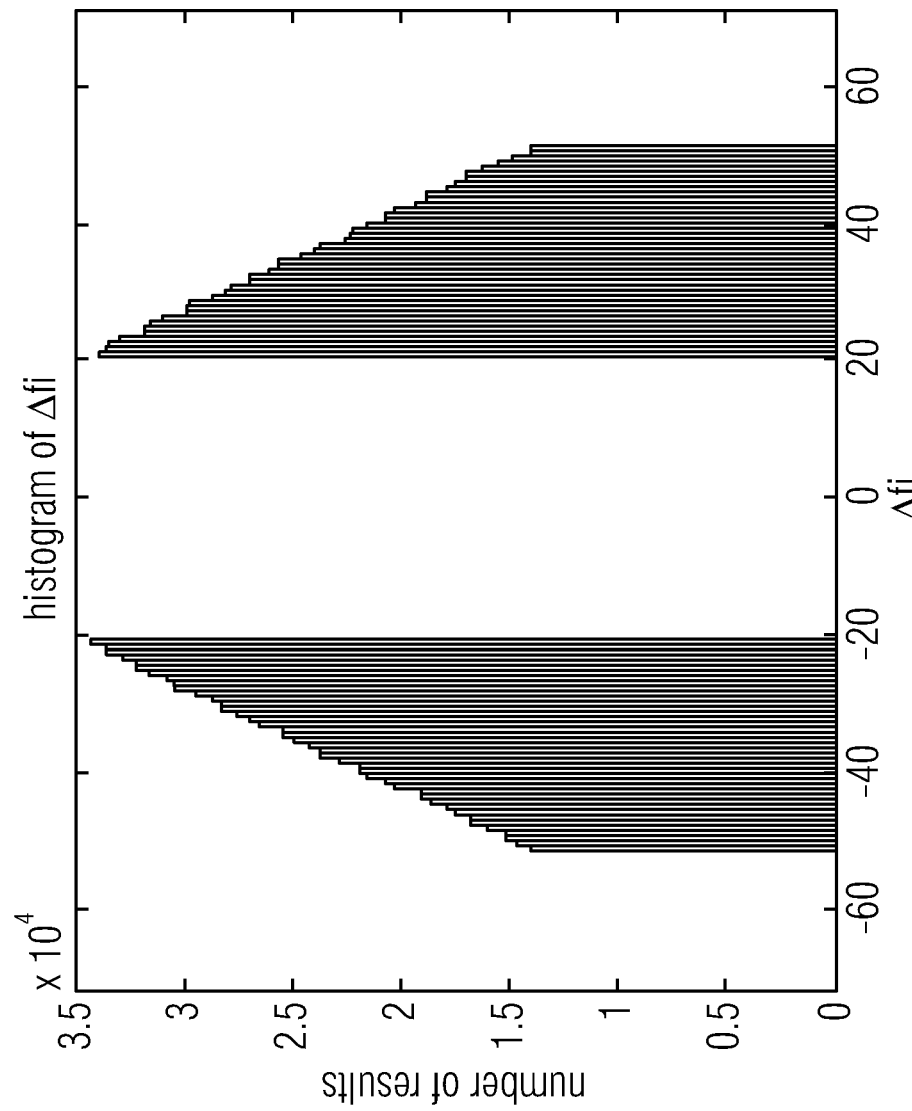
FIG. 8 shows, in a diagram, a Monte Carlo simulation-based histogram about the variable $\Delta f_i$.

FIG. 8 shows, in a diagram, a Monte Carlo simulation-based histogram about the variable $\Delta fi$ (the difference of the frequency channel index $\Delta fi$ between temporally adjacent channel accesses).

72 frequency channels are available in the illustrated example. The parameters associated with the simulation results are $\Delta fi_{min}=21$, $\Delta fi_{max}=51$, i.e. the size of the distance between two accesses that are consecutive in the channel access pattern is between 21 and 51 frequency channels.

By suitable modifications of the exemplary program code, which are easily accessible to the person skilled in the art, other distribution forms than those shown in FIG. 8 can be generated for $\Delta fi$ (e.g. equal distribution in the range from $-\Delta fi_{min}$ to $-\Delta fi_{max}$, or $+\Delta fi_{min}$ to $+\Delta fi_{max}$).

A.3. Specification of the Temporal Channel Access Activity

In a highly utilized system, all available time slots may be included in the channel access pattern. In less utilized systems, not every time slot needs to be available for the channel access. This is illustrated in the following illustration.

Figure 9:
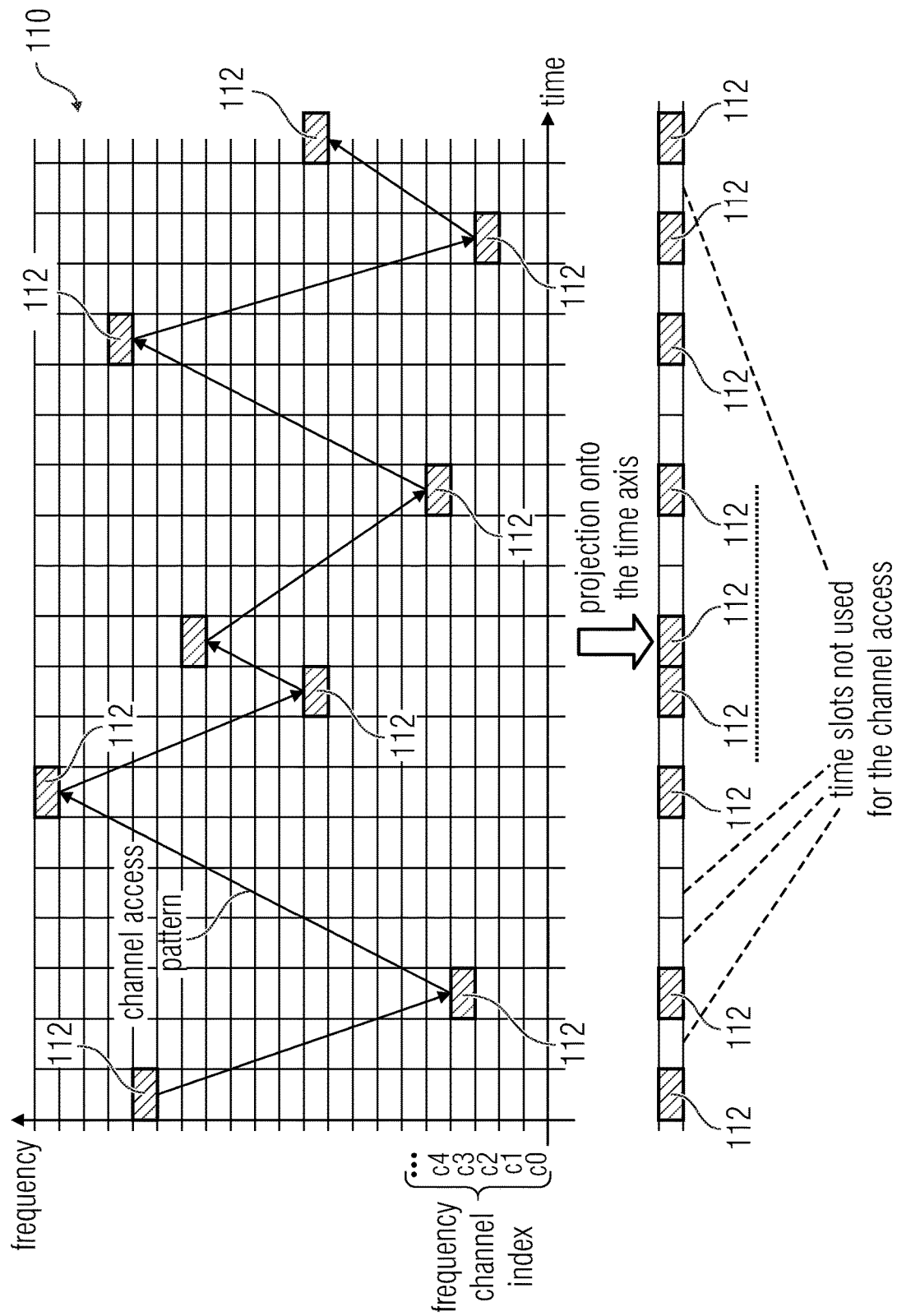
FIG. 9 shows, in a diagram, a frequency hop-based and time hop-based occupancy of the resources of the frequency band defined by a channel access pattern and a projection of the channel access pattern onto a time axis, according to an embodiment of the present invention.

FIG. 9 shows, in a diagram, a frequency hop-based and time hop-based occupancy of the resources 112 of the frequency band defined by a channel access pattern 110 and a projection of the channel access pattern 110 onto a time axis, according to an embodiment of the present invention. Here, the ordinate describes the frequency channel indices and the abscissa describes the time slot indices.

In other words, FIG. 9 exemplarily shows at its top a channel access pattern 110 in the dimensions frequency and time (resource elements 112), and shows at its bottom its projection onto the time dimension. What can be is seen is that not every time slot is part of the channel access pattern 110.

Thus, to generate a pseudo-random channel access pattern 110, the dimension time (in the form of the time slot index) is available in addition to the dimension frequency (in the form of the frequency channel index. Thus, when generating a channel access pattern, a mean activity rate A may be specified. Here, this activity rate is defined as a mean ratio of time slots used for the channel access to maximum available time slots. Thus, the activity rate A is 1 (100%) when using every time slot. However, if only every third time slot is included in the channel access pattern on average, the mean activity rate $A=\frac{1}{3}$.

Thus, the activity rate determines the (temporal) density of the resources 112 offered in the channel access pattern 110.

In embodiments, the time slots selected for the channel access at a specified activity rate may be determined in a pseudo-random manner from a suitable part of the pseudo-random number R (cf. FIG. 5 or 6).

Embodiment 1

In each step n, an integer number $r_n$ may be derived from the associated pseudo random number $R_n$, which may adopt the values between $r_{min}$ and $r_{max}$, i.e., $r_{min} \leq r_n \leq r_{max}$. After every time slot that is active in the channel access pattern 110, a number of $r_n$ time slots may be skipped, thus, they are not used for the channel access. This process is exemplarily illustrated in FIG. 10.

Figure 10:
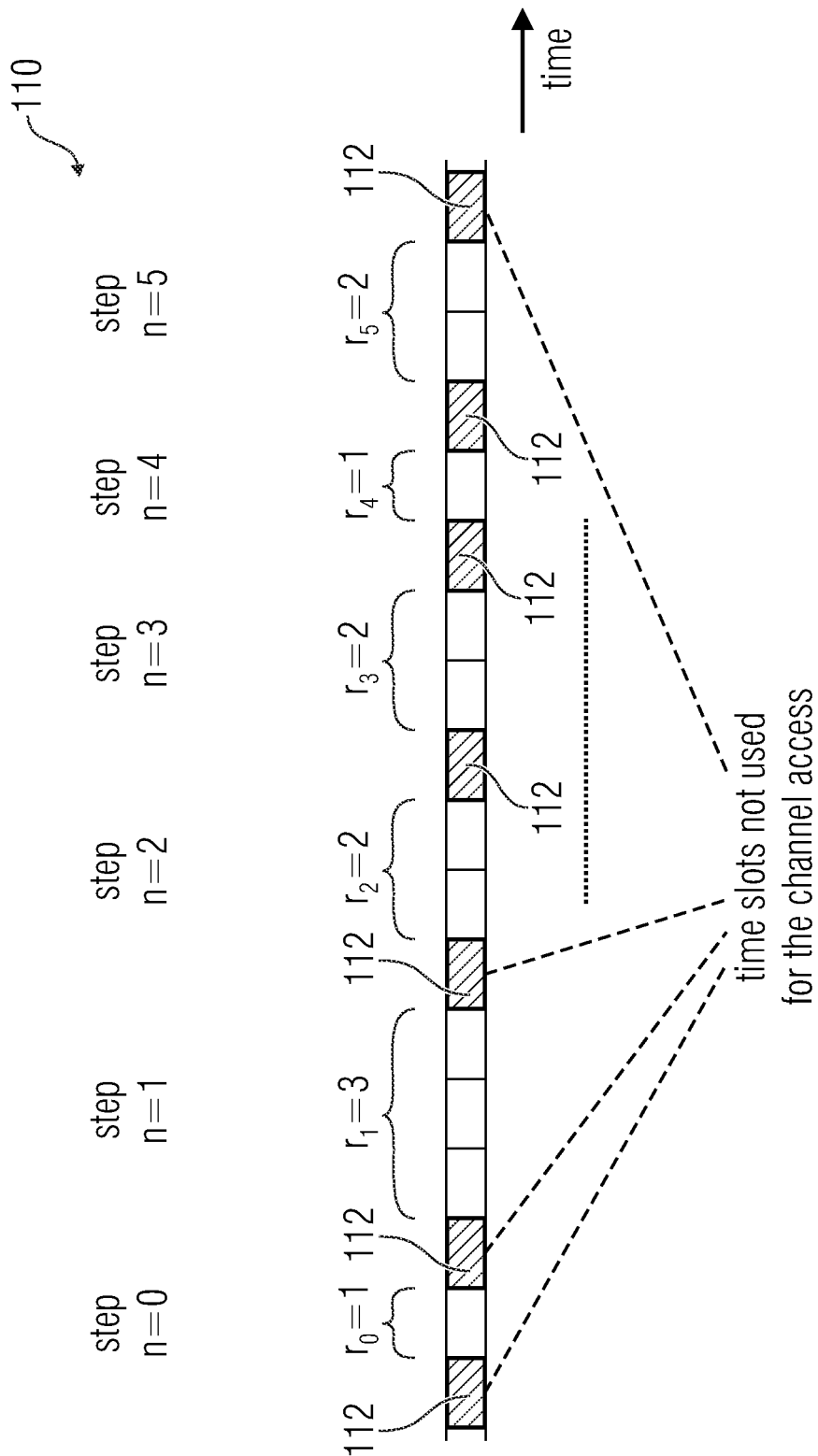
FIG. 10 shows, in a diagram, resource elements of a channel access pattern projected onto a time axis, resulting in unused time slots, according to an embodiment of the present invention.

In detail, FIG. 10 shows, in a diagram, resource elements 112 of a channel access pattern 110 projected onto a time access, resulting in unused time slots, according to an embodiment.

In other words, FIG. 10 shows an exemplary sequence of used and unused time slots, according to an embodiment.

If the number r is derived from the number R such that the elements of r occur with the same frequency between $r_{min}$ and $r_{max}$ (equal distribution), the following activity rate results:

$$A=2/(2+r_{min}+r_{max}).$$

The method presented in the above embodiment has the advantage that minimum and maximum distances between the time slots active in the channel access pattern 110 may be specified. Specifying minimum distances may be particularly advantageous for battery-powered devices, where transmission pauses of a certain minimum length between two consecutive emissions (recovery phase) increase the battery life.

A comparable approach, what can be specified is that a minimum number of active time slots directly follow each other.

Embodiment 2

In an implementation according to embodiment 1, what may occur are longer regions having locally significantly higher or lower activity rates than desired. This effect is avoided in the following embodiment.

Figure 11:
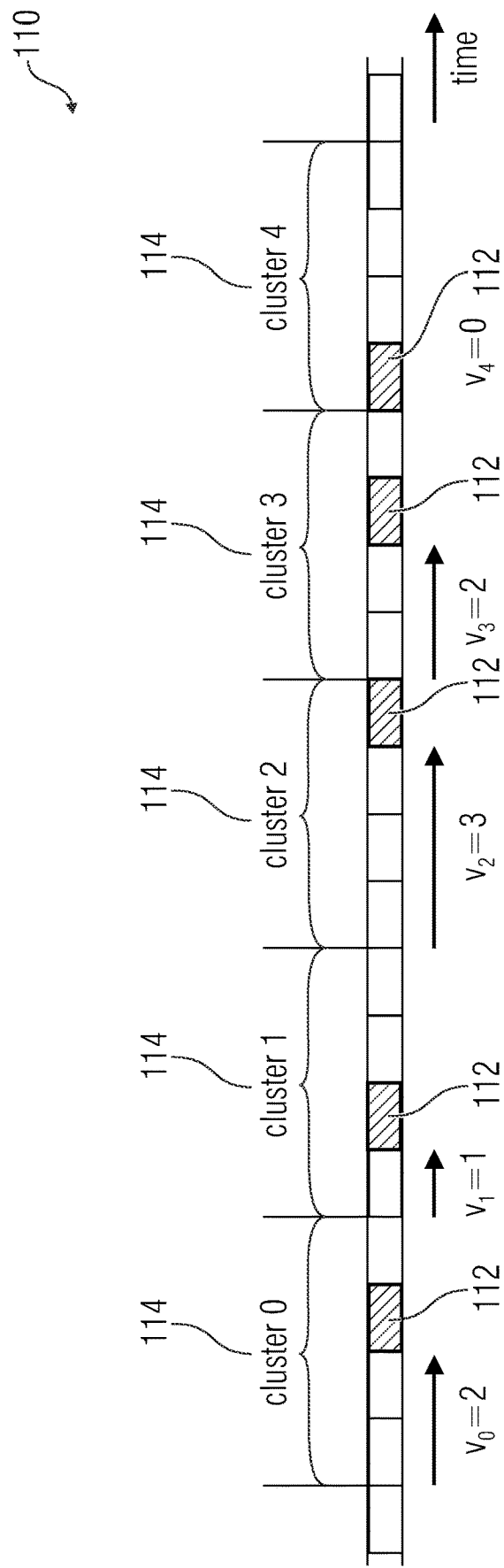
FIG. 11 shows, in a diagram, resource elements of a channel access pattern projected onto a time axis, with an activity rate $A=\frac{1}{4}$, according to an embodiment of the present invention.

Here, groups of consecutive time slots in which one active time slot of the channel access pattern each is placed are periodically specified. In FIG. 11, this is exemplarily illustrated for an activity rate of ¼ (25%).

In detail, FIG. 11 shows, in a diagram, resource elements 112 of a channel access pattern 110 projected onto a time access, with an activity rate A=¼, according to an embodiment.

In other words, FIG. 11 shows an exemplary sequence of used and unused time slots, according to an embodiment.

As can be seen in FIG. 11, the time slots may be grouped into clusters 114 (having the length of 4 in the example of FIG. 11). Exactly one time slot of the channel access pattern 110 is placed into each cluster 114. The position of the time slots included in the channel access pattern 110 within the cluster 114 may be determined by a displacement $v_n$ that may be derived from the pseudo random number $R_n$ and may adopt integer numbers between 0 and (cluster length−1).

If a minimum distance between two consecutive time slots of the channel access pattern 110 is to be ensured, non-occupiable regions may be introduced between the clusters 114. They may consist of one or several time slots, as is illustrated in FIG. 12.

Figure 12:
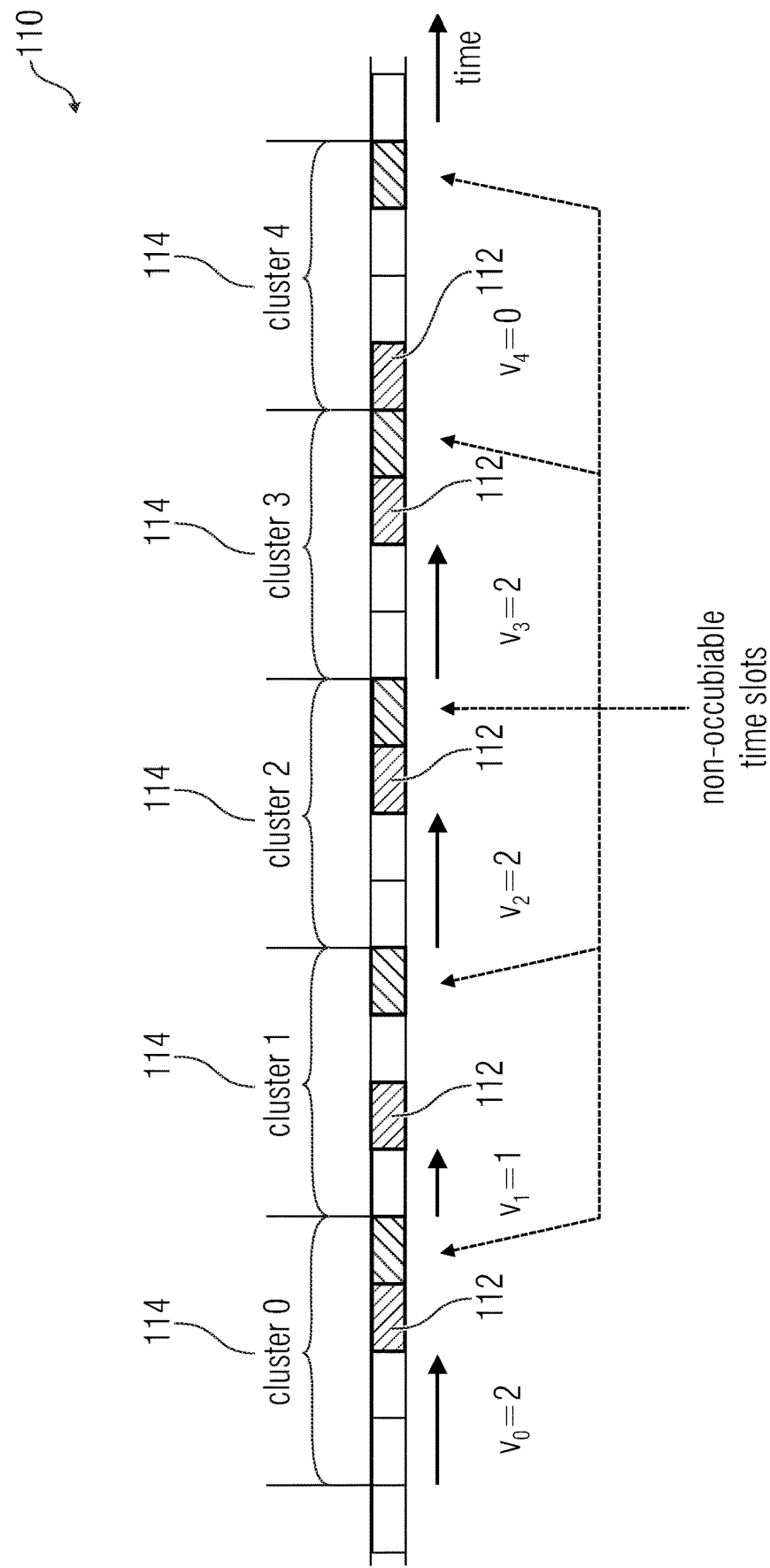
FIG. 12 shows, in a diagram, resource elements of a channel access pattern projected onto a time axis, with an activity rate $A=\frac{1}{4}$ and a specified minimum distance between consecutive time slots of the channel access pattern, according to the embodiment of the present invention.

In detail, FIG. 12 shows, in a diagram, resource elements 112 projected onto a time access of a channel access pattern 110, with an activity rate A=¼ and a specified minimum distance between consecutive time slots of the channel access pattern 110, according to an embodiment.

In other words, FIG. 12 shows an exemplary sequence of used and unused time slots with non-occupiable time slots, according to an embodiment.

As can be seen in FIG. 12, due to the non-occupiable time slots, the admissible range of the displacement variable $v_n$ is decreased to the value range of 0 to (cluster length−1−length of the non-occupiable region).

Depending on the selected activity rate, the clusters 114 may have to comprise different lengths in order to achieve the desired activity rate. In this case, the value range of $v_n$ varies according to the respective cluster length. For example, in order to set an activity rate of 40%, clusters of the length of two and the length of three may alternate.

A.4. Channel Access Pattern with Regions of Different Activity Rates

Data packets that are to reach the receiver as quickly as possible (short latency time) need channel accesses that follow each other as closely as possible during transfer, i.e. a comparatively high activity rate in the channel access pattern.

On the other hand, for data packets where a transmission reliability (e.g. high robustness against external disturbance) is of primary importance, a distribution of the emission over a longer period of time can be advantageous, i.e. a comparatively low activity rate in the channel access pattern can be favorable. The same applies to devices where a temporally equalized energy extraction from the battery (temporally stretched transmission activity) is desired.

As illustrated above, the activity rate, i.e. the frequency of the channel access, may be specified by suitable measures. In order to satisfy the different requirements in a network, if any, a channel access pattern may be designed such that it comprises regions with different activity rates. This is exemplarily illustrated in FIG. 13. Depending on the individual requirement, terminal devices may then transmit in the region suitable for them, for example.

Figure 13:
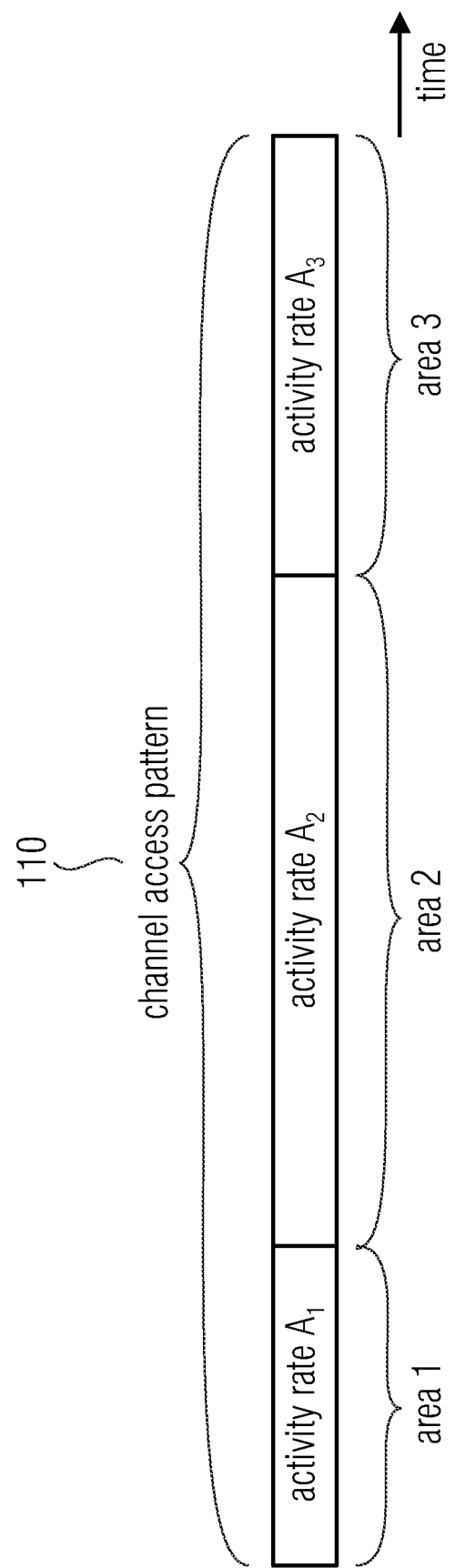
FIG. 13 shows a temporal distribution of a channel access pattern 110 into regions of different activity rates A1, A2, and A3, according to an embodiment of the present invention.

In detail, FIG. 13 shows a temporal distribution of a channel access pattern 110 into regions of different activity rates $A_1$, $A_2$, and $A_3$, according to an embodiment.

In other words, FIG. 13 shows an example of a channel access pattern with three regions of different activity rates within the channel access pattern 110.

A.5. Demand-Dependent (Dynamic) Adaption of the Activity Rate of the Channel Access Pattern In networks (or communication systems) 102, different utilization situations may exist at different times. As explained above, the actively usable resource supply for this network may be determined by the design of the channel access pattern 110 (i.e. its activity rate or mean temporal density).

Providing a large resource supply (high activity rate) at a low actual utilization may be disadvantageous especially for battery-powered devices. An example for this is a battery-operated base station (e.g. of a PAN network, possibly in the so-called repeater operation) which operates the receiver during all active resources of the channel access pattern and therefore uses energy.

Thus, it can be useful to adapt the mean activity rate dynamically, i.e. the temporal density of the resources offered by the channel access pattern 110, with respect to the existing utilization conditions. If the activity rate of the channel access pattern 110 is changed, this is accordingly signaled to the participants in the network, to which end the beacon signal (or also dedicated signaling resources) may be used, for example.

If a terminal device 106 is in an extended idle state (energy-saving mode), it may not receive the emitted signaling information of the base station 104 about a possibly changed channel access pattern during the idle state. In such a scenario, it may be useful for a channel access pattern 110 to provide a minimum supply of (basic) resources that is available at any time and without special signaling, and an additional supply of resources that may be added depending on the utilization and that is subject to appropriate signaling.

Figure 14:
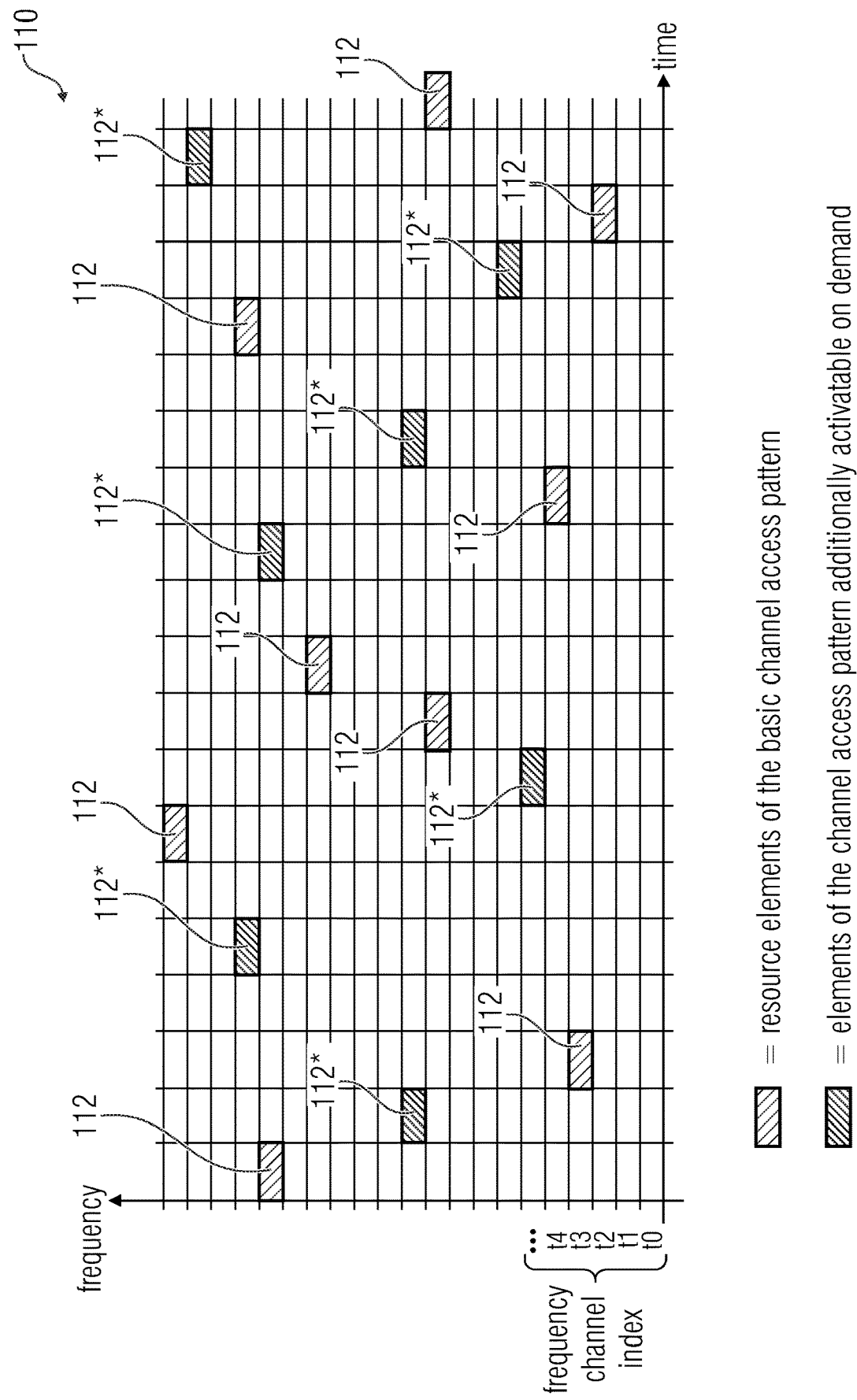
FIG. 14 shows, in a diagram, a frequency hop-based and time hop-based occupancy of the resources of the frequency band defined by a channel access pattern, wherein the channel access pattern additionally comprises resources activatable on demand, according to an embodiment of the present invention.

In the above sense, e.g., resources additionally added to the channel access pattern may be arranged temporally after the basic resources, or may be arranged interleaved with them in the time/frequency grid, as is shown in FIG. 14.

In detail, FIG. 14 shows, in a diagram, a frequency hop-based and time hop-based occupancy of the resources 112 of the frequency band defined by a channel access pattern 110, wherein the channel access pattern 110 additionally comprises resources 112* activatable on demand, according to an embodiment of the present invention. Here, the ordinate describes the frequency channel indices and the abscissa describes the time slot indices.

In other words, FIG. 14 shows an example for interleaved basic and additional resources.

A.6. Adaptive Frequency Domain Occupancy

In certain unlicensed frequency bands, users may possibly decide themselves without regulatory restrictions which frequency ranges they use within the frequency band. This may lead to the fact that certain areas of the available frequency band are occupied more heavily by external users than others and are therefore exposed to stronger disturbances.

If a base station 104 determines such a medium- or long term asymmetric utilization of the frequency band (e.g. through signal-to-interference power estimations per frequency channel based on received signals), the above-average occupied range of the frequency band may be avoided for the use by the own network by not including the associated frequency channels into the channel access pattern. This is to be considered in the frequency/time mapper (cf. FIG. 5 or 6) and is appropriately signaled to all network participants.

For example, the group of the excluded frequency channels may be described by corresponding start and end frequency channel indices or by a start frequency channel index and a following channel quantity.

Figure 15:
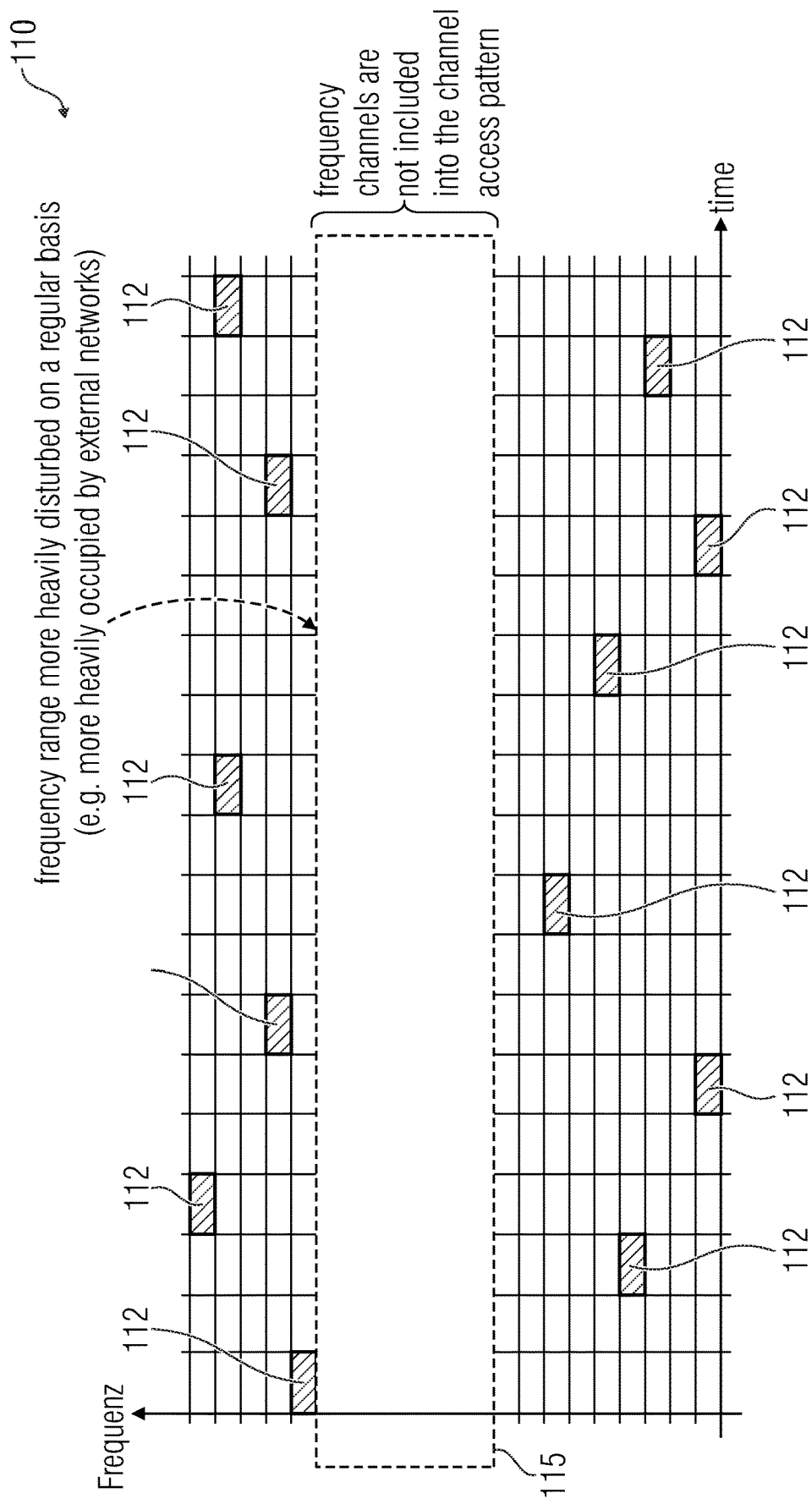
FIG. 15 shows, in a diagram, a frequency hop-based and time hop-based occupancy of the resources of the frequency band defined by a channel access pattern, wherein a frequency range of the frequency band that is regularly disturbed more heavily is not occupied by the channel access pattern, according to an embodiment of the present invention.

FIG. 15 shows, in a diagram, a frequency hop-based and time hop-based occupancy of the resources 112 of the frequency band defined by a channel access pattern 110, wherein a frequency domain 115 of the frequency band that is regularly disturbed more heavily is not occupied by the channel access pattern 110, according to an embodiment of the present invention. Here, the ordinate describes the frequency channel indices and the abscissa describes the time slot indices.

As can be seen in FIG. 15, a frequency domain 115 that is regularly disturbed more heavily (e.g. heavily occupied by external networks) may be considered when generating the channel access pattern 110. Thus, frequency channels of this frequency domain 115 are not included into the channel access pattern 110.

In other words, FIG. 15 shows an example of the exclusion of heavily disturbed frequency channels from the channel access pattern.

With avoiding disturbance-prone frequency domains for the data transfer in the own network, there is a certain utilization balancing across the frequency band by other networks not experiencing any additional disturbances in the already heavily utilized frequency domains.

A.7. Bundling Resource Elements in the Frequency Domain (Frequency Channel Bundling)

Depending on the hardware and software used, it is possible for a base station 104 to receive on several frequency channels simultaneously (frequency channel bundling). In this case, it is advantageous, especially with more heavily utilized systems, to accordingly increase the number of the resource elements offered within the network in the frequency dimension and to include several frequency channels within a time slot into the channel access pattern, as is shown in FIG. 16.

Figure 16:
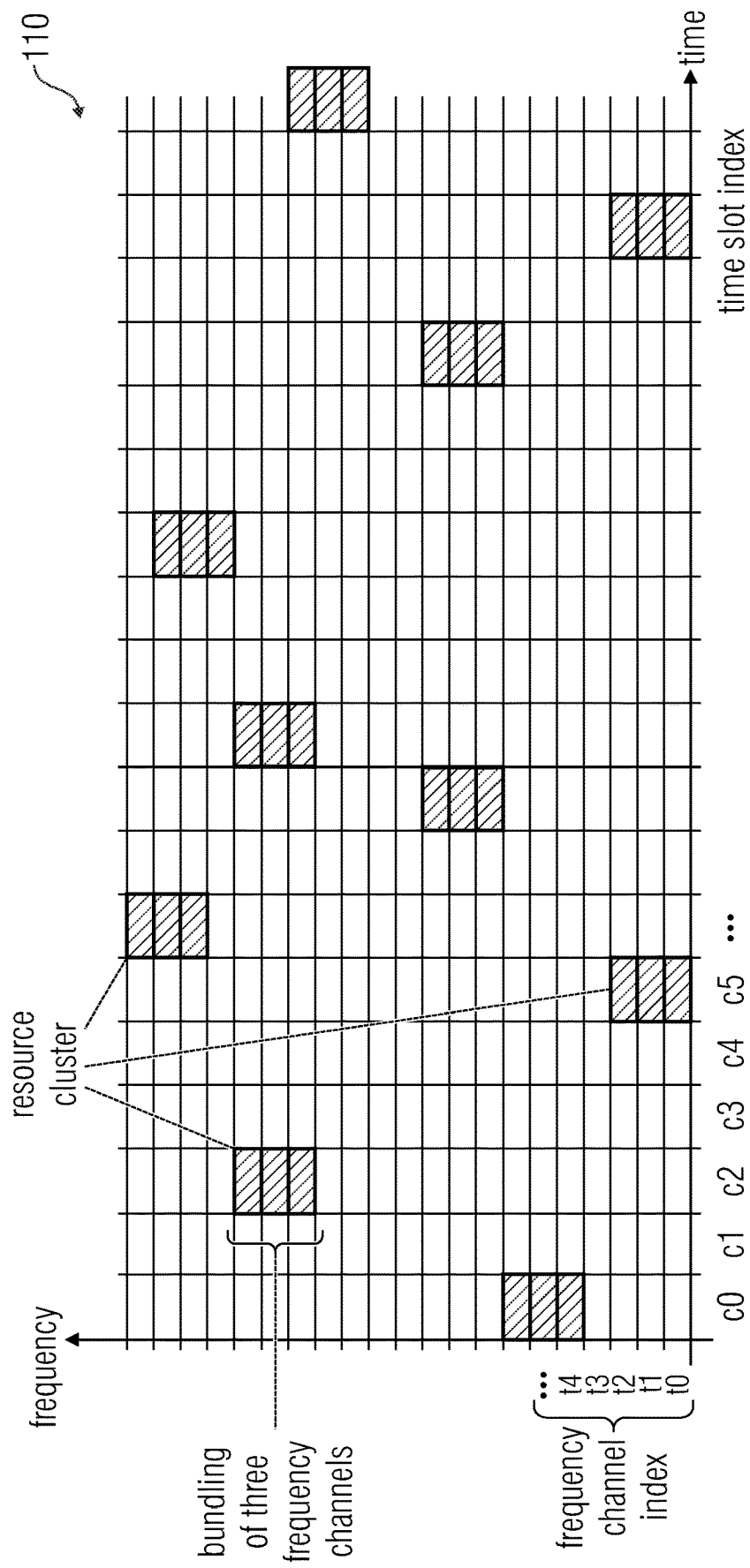
FIG. 16 shows, in a diagram, a frequency hop-based and time hop-based occupancy of the resources of the frequency band defined by a channel access pattern, wherein resources in the frequency domain are bundled, according to an embodiment of the present invention.

In detail, FIG. 16 shows, in a diagram, a frequency hop-based and time hop-based occupancy of the resources 112 of the frequency band defined by a channel access pattern 110, wherein resources 112 are bundled in the frequency domain, according to an embodiment. Here, the ordinate describes the frequency channel indices and the abscissa describes the time slot indices.

In other words, FIG. 16 shows an exemplary illustration of the channel access pattern 110 with the bundling of three adjacent frequency channels into resource clusters, respectively. In this case, FIG. 16 exemplarily illustrates the bundling of three frequency channels, respectively. Each group of resource elements of a time slot may be referred to as a "resource cluster". The channel access pattern 110 may be extended by the information about the number of the frequency channels constituting a resource cluster.

In a further embodiment, the frequency channels grouped into resource clusters do not necessarily have to be immediately adjacent.

The following shows how one or several participants of a communication system 102 are able to access, by using a relative channel access pattern, a selection of the resources cleared for the communication system 102 by the network-specific channel access pattern 110.

B. Channel Access Via Relative Channel Access Patterns

Figure 17:
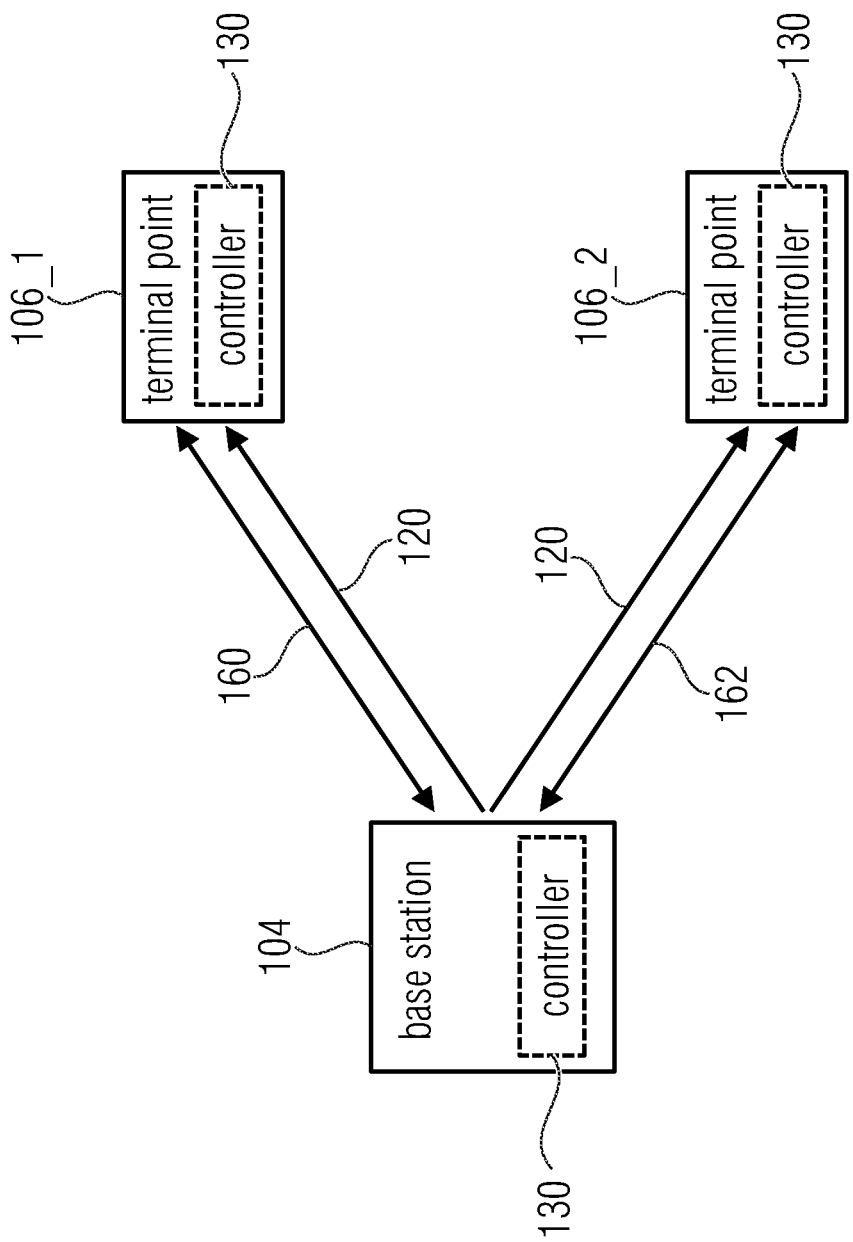
FIG. 17 shows a schematic block circuit diagram of a communication system with one base station and two terminal points, according to an embodiment of the present invention.

FIG. 17 shows a schematic block circuit diagram of a communication system 102 with one base station 104 and two terminal points 106_1-106_2, according to an embodiment of the present invention.

The communication system 102 shown in FIG. 17 comprises one base station 104 and two terminal points 106_1-106_2. However, the present invention is not limited to such embodiments, rather, the communication system 102 may comprise one or several terminal points 106_1-106_n, wherein n is a natural number larger than or equal to one. For example, the communication system may comprise 1, 10, 100, 1.000, 10.000, or even 100.000 terminal points.

As already explained in detail above (cf. FIG. 4, for example), the participants (=base station 104 and terminal points 106_1-106_2) of the communication system use for the mutual communication a frequency band (e.g. a license-free and/or permission-free frequency band, e.g. the ISM bands) used for communication by a plurality of communication systems. In this case, the communication system 102 operates uncoordinatedly with respect to the other communication systems that use the same frequency band.

As also explained in detail above, the base station 104 is configured to transmit a signal 120, wherein the signal 120 comprises information about a network-specific channel access pattern 110, wherein the network-specific channel access pattern 110 indicates a frequency hop-based and/or time hop-based occupancy of resources of the frequency band, usable for the communication of the communication 102, while the terminal points 106_1-106_2 are configured to receive the signal 120, and to determine the network-specific channel access pattern 110 on the basis of the information about the network-specific channel access pattern (cf. FIGS. 5 and 6, for example).

For the mutual communication, i.e. for the mutual transfer of data, the participants (e.g. the base station 104 and terminal point 106_1) of the communication system 102 may use a relative channel access pattern that indicates which ones of the resources cleared or usable by the network-specific channel access pattern 110 for the communication of the communication system 102 are actually to be used for the transfer of the data.

In detail, in embodiments, the base station 104 may be configured to transfer (e.g. to transmit to the terminal point 106_1 and/or to receive from the terminal point 106_1) data 160 (e.g. a signal with the data 160) by using a relative channel access pattern, wherein the relative channel access pattern indicates, from the usable frequency hop-based and/or time hop-based occupancy of resources of the network-specific channel access pattern 110, an occupancy of resources that is to be used for the transfer.

In embodiments, the terminal point 106_1 may be configured to transfer (e.g. to receive from the base station and/or to transmit to the base station 104) data 160 (e.g. a signal with the data 160) by using the relative channel access pattern, wherein the relative channel access pattern indicates, from the usable frequency hop-based and/or time hop-based occupancy of resources of the network-specific channel access pattern, an occupancy of resources that is to be used for the transfer.

In embodiments, what may be used for the mutual communication between other participants (e.g. the base station 104 and the terminal point 106_2) of the communication system 102 is another relative channel access pattern that indicates which ones of the resources cleared or usable by the network-specific channel access pattern 110 for the communication of the communication system 102 are actually to be used for the transfer of the data, wherein the relative channel access pattern (e.g. of the terminal point 106_1) and the other relative channel access pattern (e.g. of the terminal point 106_2) are different.

For example, in embodiments, the base station 104 may further be configured to transfer (e.g. to transmit to the other terminal point 106_2 and/or to receive from the other terminal point 106_2) data 162 (e.g. a signal with the data 162) by using another relative channel access pattern, wherein the other relative channel access pattern indicates, from the usable frequency hop-based and/or time hop-based occupancy of resources of the network-specific channel access pattern, an occupancy of resources that is to be used for the transfer, wherein the relative channel access pattern and the other relative channel access pattern are different.

The other terminal point 106_2 may be configured to transfer (e.g. to receive from the base station 104 and/or to transmit to the base station 104) data 162 (e.g. a signal with the data 162) by using the other relative channel access pattern, wherein the other relative channel access pattern indicates, from the usable frequency hop-based and/or time hop-based occupancy of resources of the network-specific channel access pattern, an occupancy of resources that is to be used for the transfer wherein the relative channel access pattern and the other relative channel access pattern are different.

Embodiments of the application and generation of relative channel access patterns are described in the following. Here, the relative channel access pattern may be determined by the participants (e.g. the base station 104 and at least one of the terminal points 106_1-106_2), e.g. by the controller 130 that is implemented in the participants.

The following embodiments refer to the embodiments described in section A, which, in the case of a coexistence of several mutually uncoordinated radio networks (e.g. LPWAN, PAN) in a mutual reception range, design the access to a mutually used frequency band such that the network-wide reciprocal disturbances of the participants, or their disadvantageous effects on the transmission reliability, are reduced or even minimized.

The following description assumes a communication arrangement of mutually uncoordinated radio networks for the data transfer, said networks accessing a mutually used frequency band. Some embodiment need the so-called telegram splitting multiple access (TSMA) method to be used in the data transfer, as described in [1], for example. In this case, a data packet protected by means of channel coding is split into several partial data packets that are transferred in several different time and/or frequency resources.

Furthermore, some embodiments need within each network there is a coordinating instance (in the following referred to as "base station", in the context of the IEEE standard [2] referred to as "PAN coordinator") that may transfer information about the channel access pattern used within the network to the non-coordinating participants of the network (in the following referred to as "terminal devices" or "terminal points"). The above-described channel access patterns (cf. section A) define a supply of radio resources (resource elements) fundamentally available for transfer for a certain period of time within a network. Thus, they define the base station-specified supply of resources (valid for the considered period of time) that the terminal devices can access.

In the case of channel access methods, a fundamental distinction is made between a "contention-free access" and a "contention-based access". In the contention-free access, the coordinating instance (base station) assigns unambiguously specified radio resources to a terminal device for the exclusive use. In the contention-based access—which embodiments refer to—the terminal device has available a supply of radio resources from which the terminal device serves itself on demand and on its own initiative, i.e. without individual resource allocation. What is characteristic here is that other terminal devices may also use the same supply so that there may be contentions in the access to the mutually used radio resources. The aim is to reduce or even avoid these contentions as far as possible.

Thus, embodiments deal with techniques that make the distribution of the available resources (determined by the base station) as effective as possible so that the disturbances between the participants within the network are reduced or even minimized.

Embodiments of the present invention relate to a hierarchical division of the channel access with the use of the TSMA method:

The specification of a supply of available radio resources by the base station in the form of the network-specific channel access pattern (cf. section A). Here, the channel access patterns have the task to arrange the access of several mutually uncoordinated networks to a mutually used frequency band such that the participants of different networks impair each other as little as possible (goal: mutual separation of the networks).

The selection and use of radio resources from the above-mentioned network-specific channel access pattern ("supply") by terminal devices in the form of a relative channel access pattern. The relative channel access pattern is hierarchically located below the network-specific channel access pattern and cannot use resources that are outside of the network-specific channel access pattern. Therefore, indexing of the resources may be advantageously carried out relative to the network-specific channel access pattern. It is the task of the different relative channel access patterns to provide, in the context of a contention-based access, to several participants within a network (possibly in the same period of time) access to the mutual resource supply, wherein the participants within the network are to mutually impair each other as little as possible (goal: separation of the participants within a network).

According to embodiments, there is a supply of relative channel access patterns that is known to the base station and to the terminal devices of the network and from which the terminal device uses, e.g., one for each transfer. The selection of a relative channel access pattern from the available supply may be done according to different criteria and is described in more detail below.

B.1. Channel Access Via Hierarchically Organized Channel Access Patterns

As explained above, embodiments of the present invention relate to the hierarchical structure of the channel access pattern of network participants of two components:

a network-specific channel access pattern determining the supply of radio resources in the respective network at the given point in time (cf. section A), and a relative channel access pattern. This determines which of the available resources are actually occupied/used during a data transfer.

Thus, the actively used relative channel access pattern of a network participant consists of a subset of the network-specific channel access pattern.

Applying the described embodiment is particularly advantageous in the data transfer according to the TSMA method, where a data packet is transferred divided onto a plurality of partial data packets. For the purpose of illustration and without limiting the generality, the following description assumes that the frequency band is divided into a number of discrete frequency channels and that a temporal discretization of the accesses within a network in the form of time slots is also carried out.

Figure 18:
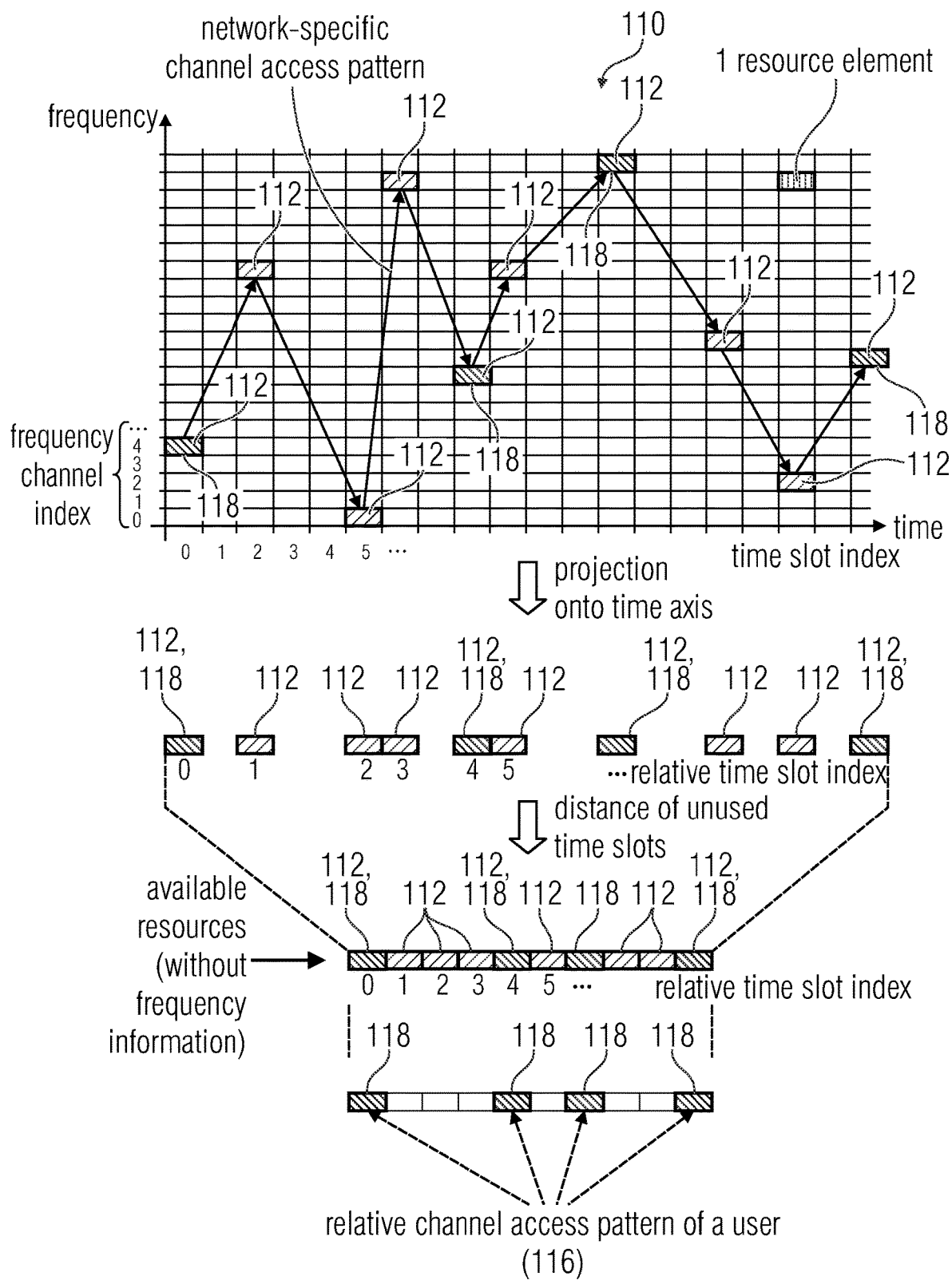
FIG. 18 shows, in a diagram, a frequency hop-based and time hop-based usable occupancy of resources of the frequency band, indicated by a network-specific channel access pattern, an occupancy of resources that is to be used for the transfer and is indicated by a relative channel access pattern from the usable occupancy of resources of the network-specific channel access pattern, and projections of the channel access patterns onto time axes before and after the removal of unused resources (e.g. time slots), according to an embodiment.

FIG. 18 shows, in a diagram, a frequency hop-based and/or time hop-based usable occupancy of resources 112 of the frequency band, indicated by a network-specific channel access pattern 110, an occupancy of resources 118 that is to be used for the transfer and is indicated by a relative channel access pattern 116 from the usable occupancy of resources 112 of the network-specific channel access pattern 110, and projections of the channel access patterns 110, 116 onto time axes before and after the removal of unused resources (e.g. time slots), according to an embodiment. Here, the ordinate describes the frequency channel indices and the abscissa describes the time slot indices.

As can be seen in FIG. 18, the network-specific channel access pattern 110 defines the distribution of the resources 112 of the frequency band (e.g. each defined by a time slot and a frequency channel, or a time slot index and a frequency channel index) that may be used by the communication system 102 and therefore by the participants (base station 104 and terminal points 106_1-106_2) of the communication system 102 for the mutual communication, while the relative channel access pattern 116 indicates the resources 118 from the usable resources 112 that may actually be used for the mutual communication by a subset of the participants (e.g. a limited group of participants, e.g. of two participants, such as the base station 104 and the terminal point 106) of the communication system 102.

In other words, FIG. 18 shows a schematic exemplary illustration of the network-specific and relative channel access pattern (hierarchical structure of the channel access). FIG. 18 exemplarily shows at its top the division of the radio resources into a multitude of resource elements in a discrete time/frequency grid. Here, a resource element is described by a frequency channel index and a time slot index. FIG. 18 illustrates at its top a network-specific channel access pattern 110 highlighted by the resource elements 112 symbolically connected through arrows. This network-specific channel access pattern 110 represents the supply of resource elements 122 that is made available by a network (or communication system) 102. In this example, signal emission is possible in a time slot only on one frequency channel.

If the two-dimensional illustration is projected onto the time axis and if all time slots that are not occupied in the network-specific channel access pattern 110 are removed, what results according to the above illustration are the "available resources" 112. Temporal indexing may be advantageously done by a relative time slot index that is relative to the network-specific channel access pattern.

FIG. 18 exemplarily illustrates at its bottom a relative channel access pattern 116 that determines a subset from the available resources (possibly all of them). The channel access pattern that effectively results in the selected example (i.e. the hierarchical combination of a network-specific and a relative channel access pattern) is indicated in all regions of FIG. 18 by means of resource elements 118. Here, the relative channel access pattern with its relative time slot index may be calculated back to the original discrete time grid by means of the average activity rate A defined in section A. This average activity rate is defined as the average ratio of time slots used for the channel access to the total maximum available time slots. When using each time slot, the activity rate A is therefore 1 (100%). If, on the other hand, as is shown at the top of FIG. 18, only every second time slot is included in the channel access pattern on average (i.e. 10 of 20), the average activity rate $A=\frac{1}{2}$.

B.2. Bundling of Resource Elements in the Frequency Domain (Frequency Channel Bundling)

Depending on the hardware and software used, it is possible for a base station 102 to receive simultaneously on several frequency channels (frequency channel bundling). In this case, it is advantageous especially in more heavily utilized systems, to increase the number of the resource elements offered within the network in the frequency dimension accordingly and to include several frequency channels within a time slot into the network-specific channel access pattern 110. This is illustrated in FIG. 19.

Figure 19:
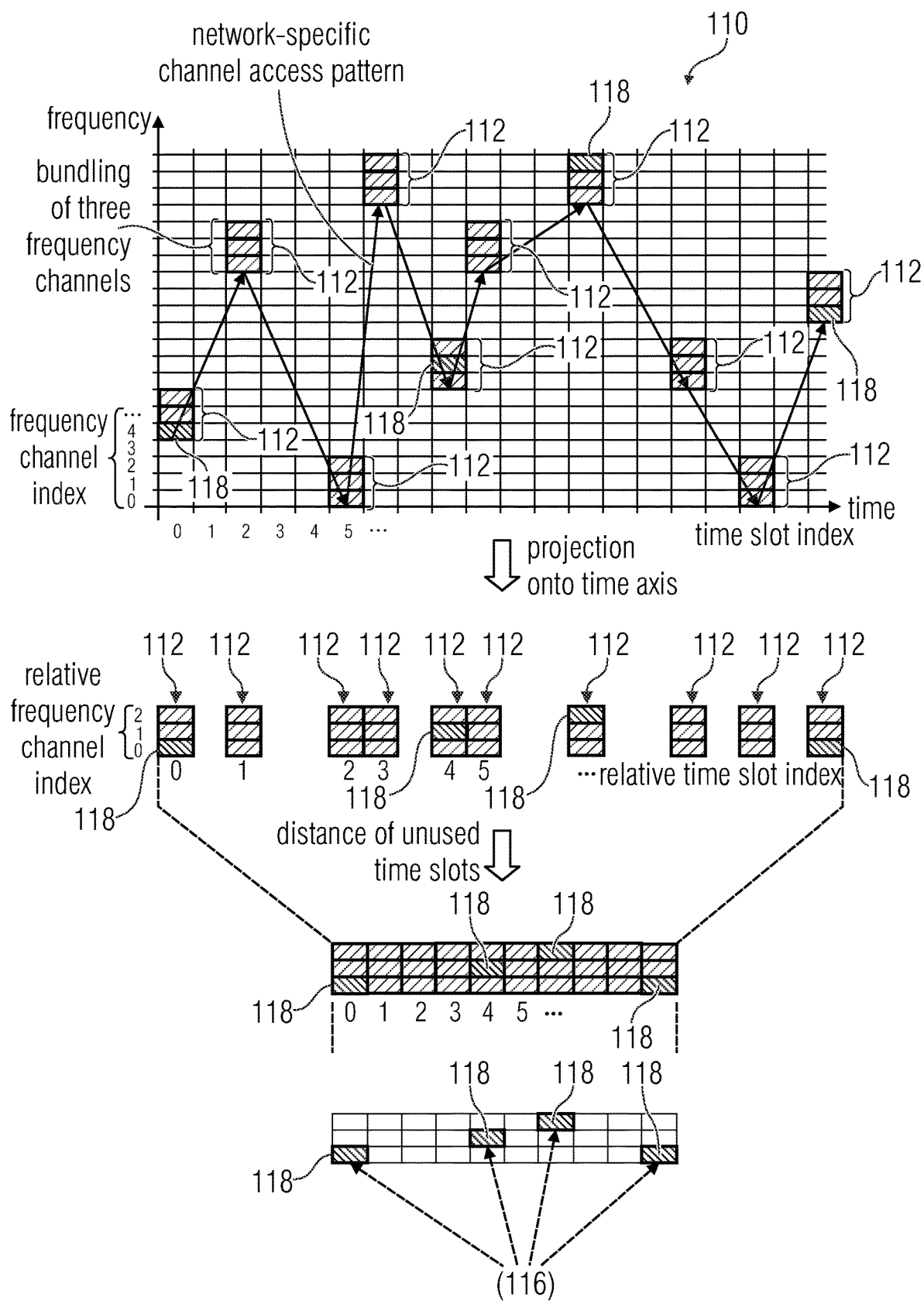
FIG. 19 shows, in a diagram, a frequency hop-based and time hop-based usable occupancy of frequency domain-bundled resources of the frequency band, indicated by a network-specific channel access pattern, an occupancy of resources that is to be used for the transfer and is indicated by a relative channel access pattern from the usable occupancy of resources of the network-specific channel access pattern, and projections of the channel access pattern onto time axes before and after the removal of unused resources (e.g. time slots), according to an embodiment.

In detail, FIG. 19 shows, in a diagram, a frequency hop-based and/or time hop-based usable occupancy of frequency domain-bundled resources 112 of the frequency band, indicated by a network-specific channel access pattern 110, an occupancy of resources 118 that is to be used for the transfer and is indicated by a relative channel access pattern 116 from the usable occupancy of resources 112 of the network-specific channel access pattern 110, and projections of the channel access patterns 110, 116 onto time axes before and after the removal of unused resources (e.g. time slots). Here, the ordinate describes the frequency channel indices and the abscissa describes the time slot indices.

As can be seen in FIG. 19, the network-specific channel access pattern 110 indicates in the frequency direction (e.g. per time slot or time slot index) a bundling of resources 112, i.e. a plurality of adjacent resources 112 (e.g. frequency channels or frequency channel indices), of the frequency band, wherein the relative channel access pattern 116 in the frequency direction indicates at most a subset (e.g. up to one resource, i.e. one or no resource) of the plurality of adjacent resources 112 of the network-specific channel access pattern 110.

In other words, FIG. 19 shows a schematic exemplary illustration of the network-specific channel access pattern 110 and the relative channel access pattern 116 in the case of gap-less frequency channel bundling.

FIG. 19 exemplarily shows a bundling of three respectively connected frequency channels per occupied time slot. Accordingly, with the relative channel access pattern 116, it is not only the time dimension but also the occupancy of the (in the example: three) frequency channels that is provided as a degree of freedom.

Figure 20:
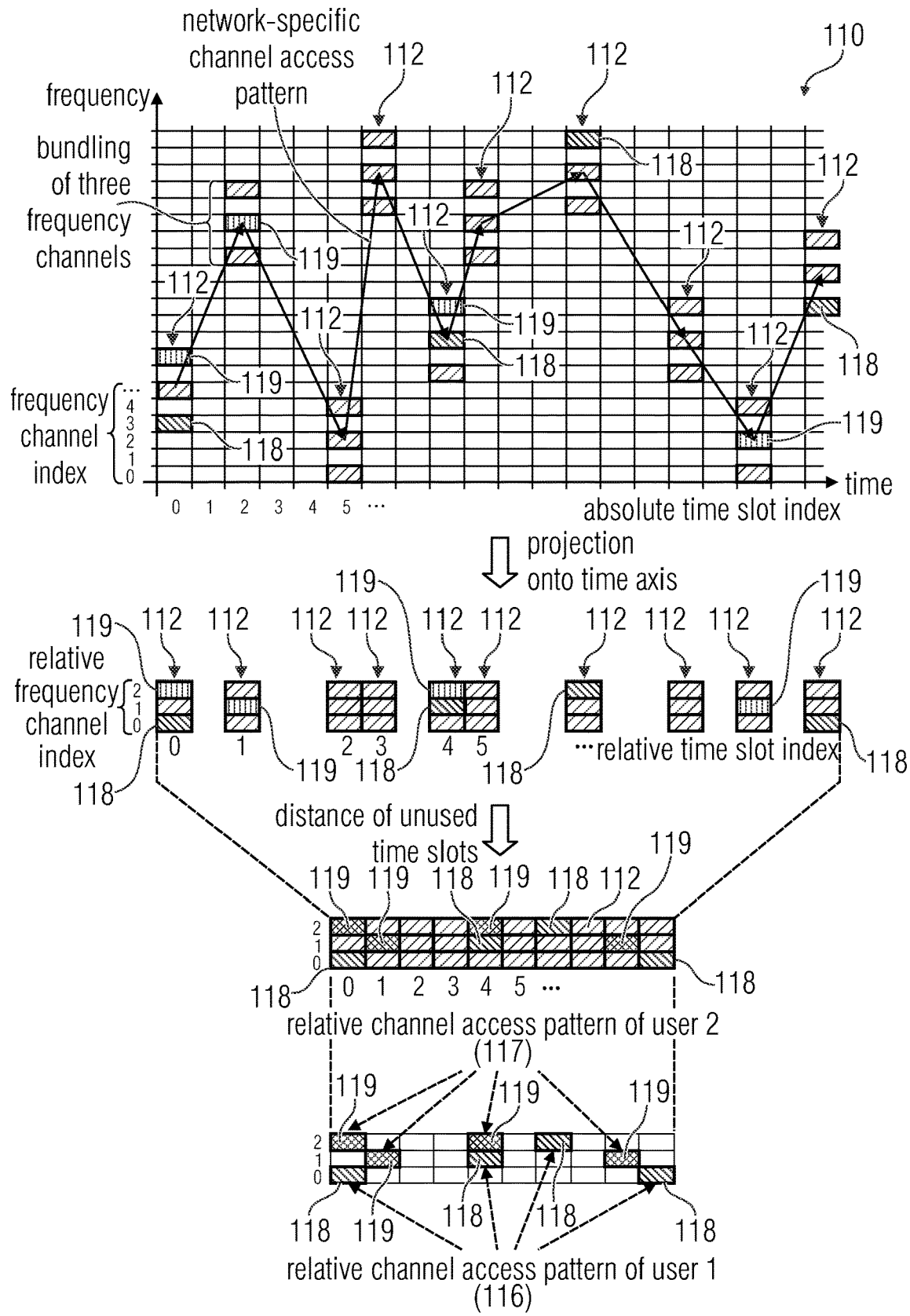
FIG. 20 shows, in a diagram, a frequency hop-based and time hop-based usable occupancy of frequency domain-bundled resources of the frequency band, indicated by a network-specific channel access pattern, an occupancy of resources that is to be used for the transfer and is indicated by a relative channel access pattern from the usable occupancy of resources of the network-specific channel access pattern, an occupancy of resources that is to be used for the transfer and is indicated by another relative channel access pattern from the usable occupancy of resources of the network-specific channel access pattern, and projections of the channel access patterns onto time axes before and after the removal of unused resources (e.g. time slots), according to an embodiment.

Correspondingly, it is also possible to proceed as described above if the several frequency channels available within a time slot are not available as a (gap-less) connected area, but are distributed in any other way across the available frequency channels, as is shown in FIG. 20.

FIG. 20 shows, in a diagram, a frequency hop-based and/or time hop-based usable occupancy of resources 112 of the frequency band that are spaced apart in the frequency domain, indicated by a network-specific channel access pattern 110, an occupancy of resources 118 that is to be used for the transfer and is indicated by a relative channel access pattern 116 from the usable occupancy of resources 112 of the network-specific channel access pattern 110, and an occupancy of resources 119 that is to be used for the transfer and is indicated by another relative channel access pattern 117 from the usable occupancy of resources 112 of the network-specific channel access pattern 110, and projections of the channel access patterns 110, 116, 117 onto time axes before and after the removal of unused time slots, or frequency channels, according to an embodiment. Here, the ordinance describes the frequency channel indices and the abscissa describes the time slot indices.

As can be seen in FIG. 20, the network-specific channel access pattern 110 indicates in the frequency direction (e.g. per time slot or time slot index) a bundling of resources 112, i.e. a plurality of spaced apart resources 112 (e.g. frequency channels or frequency channel indices) of the frequency band, wherein the relative channel access pattern 116 indicates in the frequency direction at most a subset (e.g. up to one resource, i.e. one or no resource) of the plurality of spaced apart resources 112 of the network-specific channel access pattern 110, and wherein the other relative channel access pattern 117 indicates in the frequency direction at most a subset (e.g. up to one resource, i.e. one or no resource) of the plurality of spaced apart resources 112 of the network-specific channel access pattern 110, wherein the relative channel access pattern 116 and the other relative channel access pattern 117 are different.

In other words, FIG. 20 shows a schematic exemplary illustration of the network-specific channel access pattern 110 and the relative channel access pattern 116 with a frequency channel bundling having gaps.

The advantage of this frequency channel bundling is that, as based on the relative channel access pattern 117 of a second participant (e.g. user) additionally shown in FIG. 20, there is significantly less adjacent channel disturbance (the channel separation of two directly adjacent channels is problematic due to the limited filtering effect, in particular if the one channel is received with significantly stronger reception power than the adjacent channel) than in FIG. 19.

The advantage of the bundling described in FIGS. 19 and 20 is to allow more terminal devices within the network and within a given period of time to access the radio resources (greater utilization). Alternatively, for a given utilization, channel bundling may reduce the probability for channel access collisions since a given access traffic is distributed to more potential resource elements (reduced reciprocal disturbances of the participants within the network). In contrast to the use of more time slots, the advantage of frequency channel bundling consists in a greater energy efficiency since the receiver is being switched on for fewer time slots for the same amount of resource elements.

If a terminal device has the capability to transmit simultaneously on multiple frequency channels, this can be provided for in the relative channel access pattern. This is illustrated in the following illustration, which is limited to the relative channel access pattern only (corresponding to bottoms of FIGS. 19 and 20).

Figure 21:
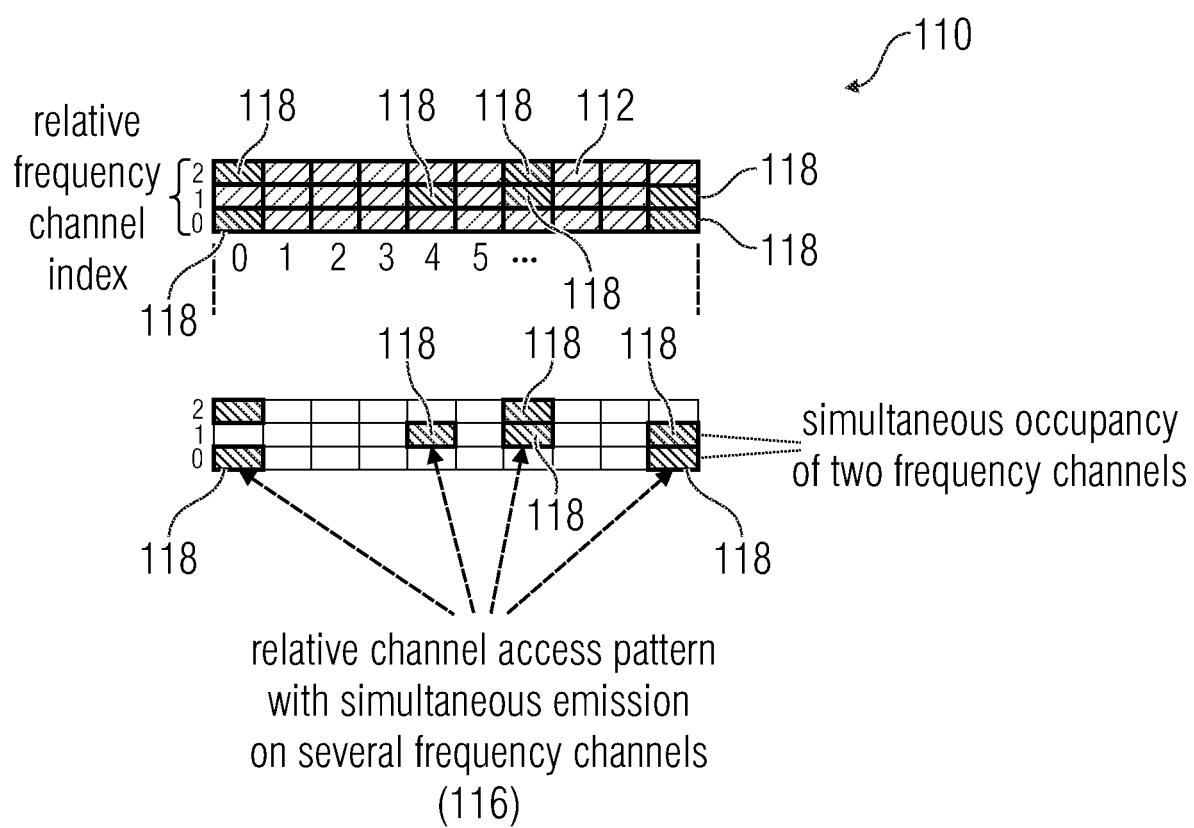
FIG. 21 shows, in a diagram, a projection of a network-specific channel access pattern and a relative channel access pattern onto the time axis after the removal of unused resources (e.g. frequency channels and time slots), wherein the relative channel access pattern occupies in the frequency direction for at least a part of the time hops several of the resources available in the frequency direction, according to an embodiment.

FIG. 21 shows, in a diagram, a projection of a network-specific channel access pattern 110 and a relative channel access pattern 116 onto the time axis after the removal of unused frequency channels and time slots, wherein the relative channel access pattern 116 occupies in the frequency direction for at least a part of the time hops several of the resources 112 available in the frequency direction. Here, the ordinate describes the relative frequency channel indices, and the abscissa describes the relative time slot indices. In other words, FIG. 21 shows in a diagram a relative channel access pattern 116 in the case of frequency channel bundling with simultaneous transfer (e.g. emission) on several frequency channels.

B.3. Occupancy of the Resources with Channel Accesses in Different Symbol Rates

The above discussions exemplarily assumed that the signal is generated on each frequency channel with an identical symbol rate. However, as described above, if a range of several immediately adjacent frequency channels should be available, this range, which is referred to in the following as "resource cluster" may be divided into several partial resources. Different symbol rates and/or a different number of symbols may be allocated to these partial resources, as is illustrated in FIG. 22.

Figure 22:
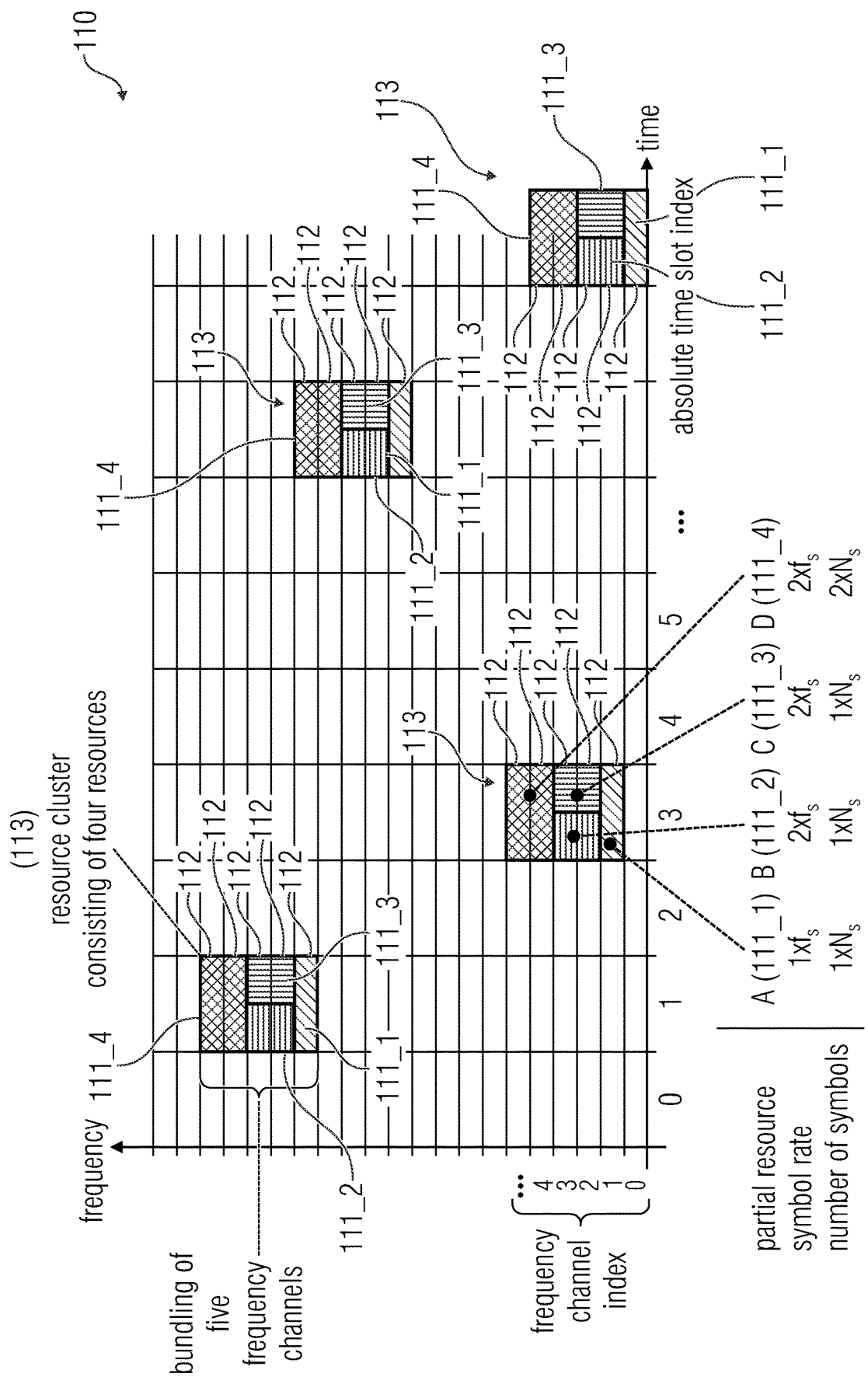
FIG. 22 shows, in a diagram, a frequency hop-based and time hop-based usable occupancy of resources of the frequency band that are bundled into blocks (or clusters) in the frequency domain, indicated by a network-specific channel access pattern, wherein different symbol rates and/or different numbers of symbols are allocated to different parts of the blocks of connected resources, according to an embodiment.

FIG. 22 shows, in a diagram, a frequency hop-based and time hop-based usable occupancy of resources 112 of the frequency band that are bundled into blocks (or clusters) 113 in the frequency domain, indicated by a network-specific channel access pattern 110, wherein different symbol rates and/or different numbers of symbols are allocated to different parts 111_1-111_4 of the block 113 of connected resources 112, according to an embodiment. Here, the ordinate describes the frequency channel indices and the abscissa describes the time slot indices.

In other words, FIG. 22 shows a formation of resource clusters 113 with partial resources 111_1-111_4 of different symbol rates and symbol numbers per time slot (example).

FIG. 22 exemplarily shows a section of a channel access pattern with a sequence of resource clusters 113 that are constituted by the bundling of five frequency channels each. As an example, each resource cluster 113 is divided into four independent partial resources "A" (111_1), "B" (111_2), "C" (111_3), "D" (111_4) in which different multiples of the symbol rate $f_s$ and the number of the symbols Ns are used. With twice the symbol rate and a given number of symbols, two consecutive accesses may be carried out by two different participants in one time slot, e.g. due to the shortened symbol duration. This is the case in FIG. 22 for the temporally consecutive partial resources "B" (111_2) and "C" (111_3).

The advantage of this approach is that, within the network-specific channel access pattern 110, resources may be occupied on demand with different symbol rates and therefore transfer bandwidths.

It is clearly obvious to the person skilled in the art that the division of resources clusters 113 formed by frequency channel bundling into individual partial resources may be carried out in many ways. The symbol rates used do not necessarily have to be integer multiples of a base symbol rate (as is the case in the selected example). The same applies to the number of the symbols in the partial resources.

B.4. Criteria for Generating Relative Channel Access Patterns

Different transfer scenarios may result in different requirements for the relative channel access pattern 116.

Data packets that are to reach the receiver as quickly as possible (short latency time) need channel accesses that follow each other as closely as possible, i.e. a comparably high activity rate A in the network-specific channel access pattern, as described in section A. On the other hand, for data packets where a transmission reliability (e.g. high robustness against external disturbance) is of primary importance, a distribution of the emission over a longer period of time can be advantageous, i.e. a comparatively low activity rate in the network-specific channel access pattern can be favorable. The same applies to devices where a temporally equalized energy extraction from the battery (temporally stretched transmission activity) is desired.

Thus, it is advantageous to design the set of available relative channel access patterns such that demand-oriented channel access patterns with desired characteristics are available for different scenarios.

The decisive design parameters for a set of K relative channel access patterns are the following:

- in the frequency direction, the number of the F specific frequency channels within a time slot,
- in the time direction, the number of the Z available time slots with a specified time duration $T_{RE}$, wherein only one resource element enters into Z per time index element,
- the mean activity rate A specified from section A, with the help of which an absolute time slot length Z/A results from the relative time slot length. From this, with a given time duration $T_{RE}$ of a resource element, the total frame duration $T_{Frame}=T_{RE} \cdot (Z/A)$ may be indicated in seconds,
- the number of the D partial data packets into which a data packet is split, and the error correction code used for the data packet, which may be a block or convolutional code with a specified code rate R, for example. Typically, the number of the partial data packets is significantly smaller than the number of the resource elements available in the time direction, i.e. D<<Z.

Figure 23:
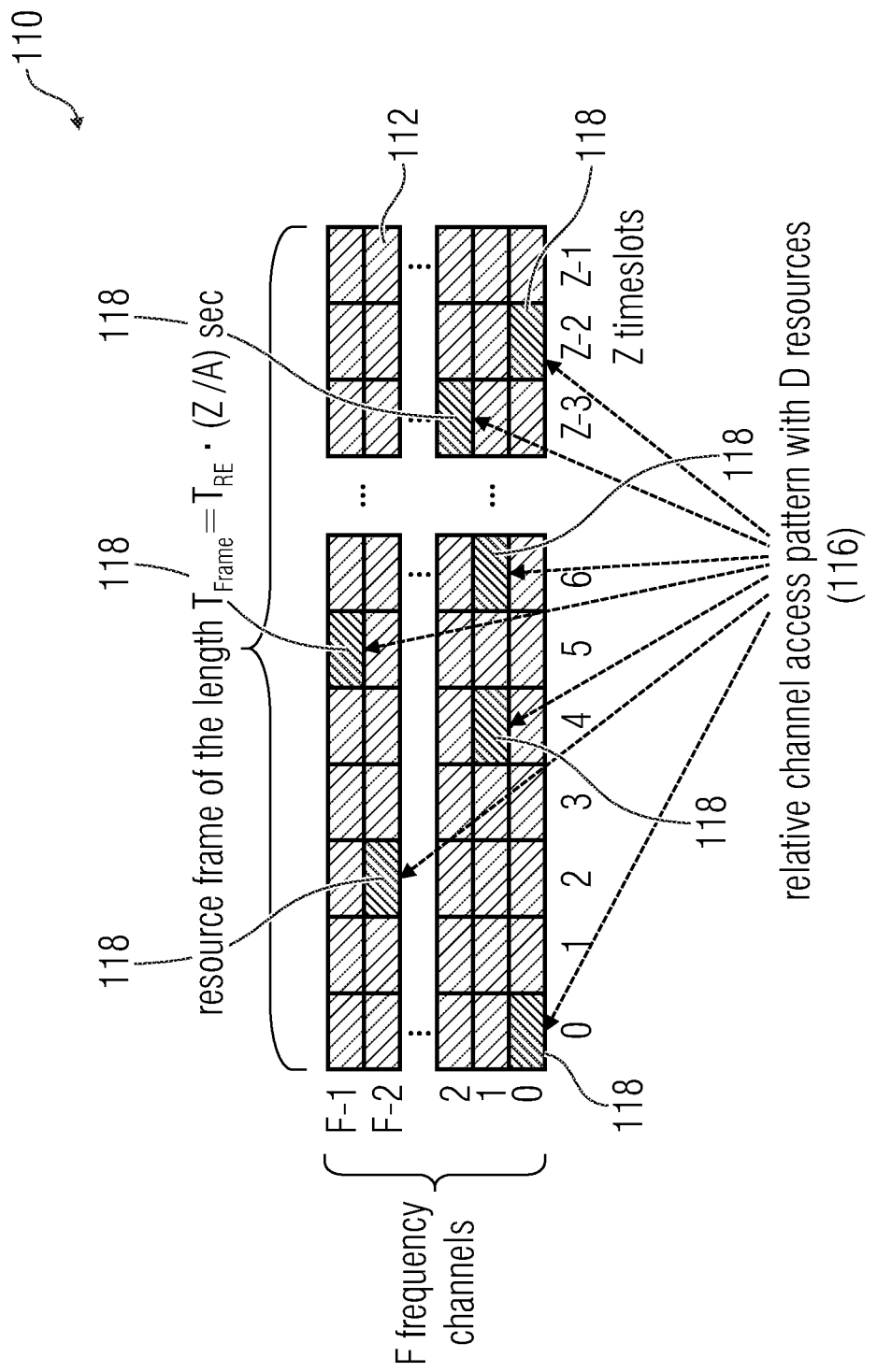
FIG. 23 shows, in a diagram, a projection of a network-specific channel access pattern and a relative channel access pattern with D resources onto the time axis after the removal of unused resources (frequency channels and time slots), according to an embodiment.

FIG. 23 shows, in a diagram, a projection of a network-specific channel access pattern 110 and a relative channel access pattern 116 with D resources 112 onto the time axis after the removal of unused resources (frequency channels and time slots), according to an embodiment. Here, the ordinate describes the relative frequency channel indices, and the abscissa describes the relative time slot indices.

In this case, FIG. 23 shows an illustration of a resource frame with F×Z resources and an absolute total length of $T_{RE} \cdot (Z/A)$ seconds.

In a first design step, the number of the available resources elements has to be determined on the basis of the total frame duration $T_{Frame}$ and the network-specific activity rate A of section A and the time duration $T_{RE}$ for a resource element.

Specifying the total frame duration $T_{Frame}=T_{RE} \cdot (Z/A)$ depends on the application case. For an application with the requirement of a short latency time, e.g. a wireless light switch, doorbell or door opener, $T_{Frame}$ should not be larger than 500 ms. For latency-uncritical applications where robustness against external disturbers is most important, the time duration of a resource frame can easily reach values of 5 to 10 seconds.

The network-specific activity rate A from section A is also influenced by the application case. For latency-critical applications, the activity rate should be relatively high, i.e. between A=0.33 and 1. For a value of 0.33, only every third time slot is included into the network-specific channel access pattern 110 on average, whereas the 2 other time slots are not used in this network. For latency-uncritical application cases, in particular for battery-operated terminal devices, the values for the activity rate may drop to A=0.1.

Finally, the time duration $T_{RE}$ of a partial data packet, or resource element, is to be specified. A symbol rate $f_S$ of about 2500 sym/s and a number of 30 to 80 symbols per partial data packet, for example, result in values of 12 to 32 ms for $T_{RE}$.

The number Z of the resources available in the time direction may be determined from the application-specific requirements for $T_{Frame}$, $T_{RE}$ and A. Together with the F specified frequency channels, what results are the overall available resources per resource frame.

As is illustrated in the table shown in FIG. 24, these values may significantly differ depending on the application case.

In detail, FIG. 24 shows in a table a resource calculation for different exemplary application cases.

While, on the basis of the first design step, the number of the F×Z resource elements available in the resource frame has been identified, in the second design step, the number M of the different channel access patterns is to be identified on the basis of the length D of each channel access pattern and the available F×Z resource elements.

Depending on the F×Z available resource elements, there are $$M_{max}=(Z! \cdot F^D)/((Z-D)! \cdot D!) \quad (1)$$

different channel access patterns of the length D that differ in at least one resource element. Equation (1) assumes that one pattern per time slot index is allowed to use only one resource element from all F frequency channels, cf. FIG. 20. According to Equation (1), what results for the first example of the table shown in FIG. 24 and D=4 is $M_{max}=70$, and what results for the last case with an assumed D=24 is $M_{max}=8 \times 10^{46}$. If a simultaneous emission of several partial data packets on several frequency channels would be allowed, as is shown in FIG. 21, $M_{max}$ would increase massively.

Advantageously, the number D of the partial packets should be selected to be as large as possible, since the robustness against disturbances for other participants, regardless of whether they originate from the own or from foreign networks, is the largest in this case. Usually, in an IOT-based TSM transfer, a data packet is divided into 10 to 30 partial data packets. If a transfer time corresponding to this number of partial data packets is not available, e.g. as is the case in some latency-critical applications, the value of D may also be smaller.

In general, the larger the number M of the available channel access patterns is selected, the lower the probability of a full collision. A full collision is said to occur if two terminal devices randomly select the same channel access pattern for their transfer. For example, if M=128 different patterns are available, the probability of a full collision is 0.78125% (1/128), if one assumes that each terminal device randomly selects its channel access pattern from the M available patterns. For M=1024, this collision probability is reduced to 0.0977%. In the case of a full collision, it may be assumed that, depending on the reception level ratio, at least the data packet content of the terminal device received more weakly cannot be faultlessly decoded, for similar, or equal, reception levels, the data packets of both users may lost. The advantage of the telegram splitting method described in [1] is that, through the different channels access patterns, only a few partial data packets collide, however, which can be reconstructed by the error correction code used.

Figure 25:
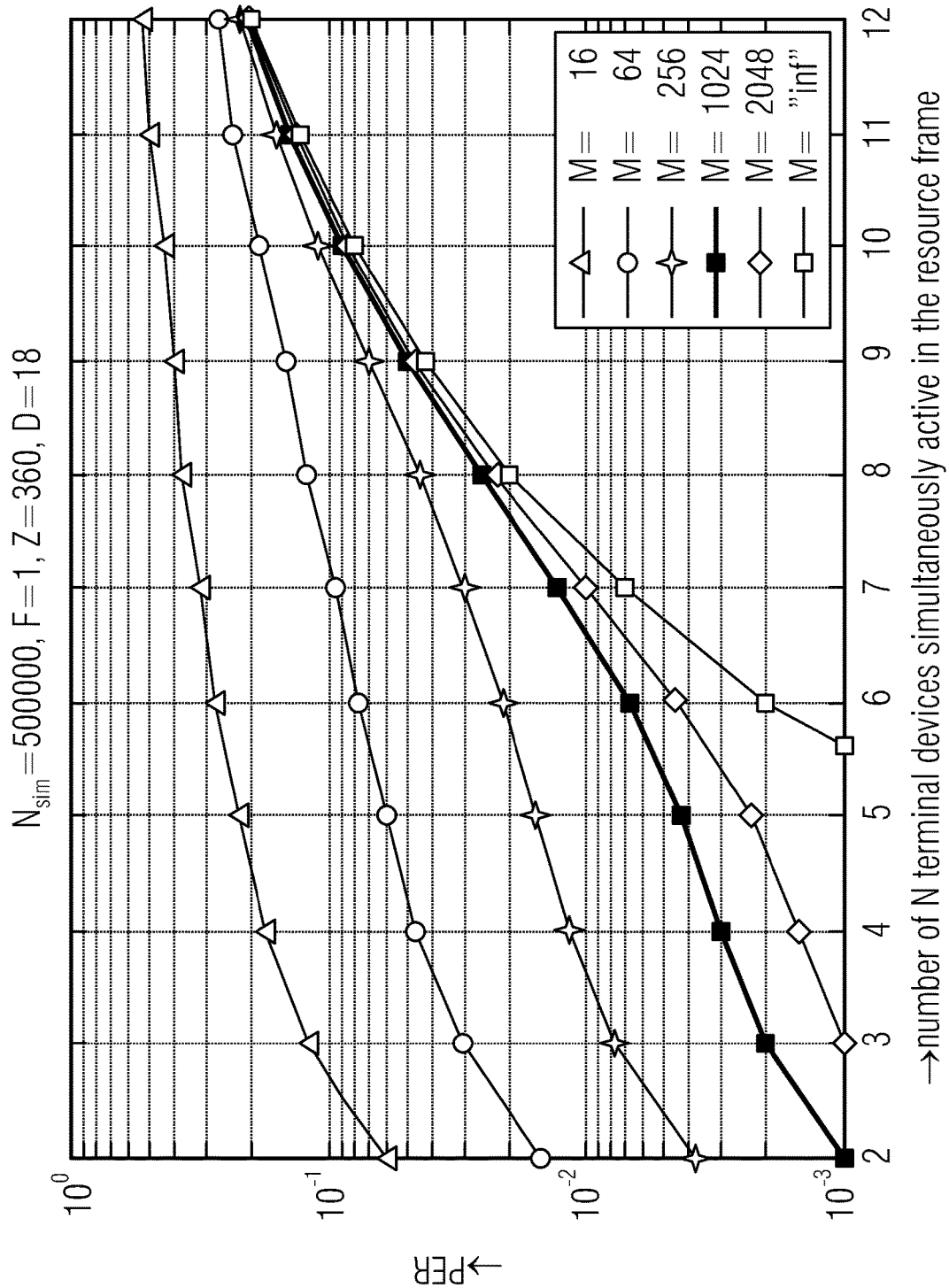
FIG. 25 shows, in a diagram, simulation results of the packet error rate for different channel access pattern lengths M as a function of the number of simultaneously active terminal devices in the case of 360 available resource elements.

FIG. 25 shows, in a diagram, simulation results of the packet error array for different channel access pattern lengths M as a function of the number of simultaneously active terminal devices for 360 resource elements. In this case, the ordinate describes the packet error array PER and the abscissa describes the number N of terminal devices simultaneously active in the resource frame (e.g. terminal points).

In detail, the simulation results of FIG. 25 show the course of the packet error rate PER for different lengths M of channel access patterns across the number N of the terminal devices simultaneously active in the resource frame, wherein a convolutional code with a rate of R=⅓ has been used as an error protection. In addition, F=1 and Z=360 were assumed and the channel access pattern lengths resulted to D=18.

With N=2 terminal devices, the different probabilities for a full collision may be detected as a function of M. The larger the specified M, the lower the failure probabilities of the PER curves of the different channel access pattern lengths. With M=1024, 1024 different channel access patterns are randomly selected from the $M_{max}$ possible ones, and the N terminal devices (e.g. terminal points) randomly select their (relative) channel access pattern used for the 500,000 transfer attempts. With M="inf", new channel access patterns are selected per throw of the dice for each individual terminal device (e.g. end point) for each transmission attempt. In this case, the probability of a full collision with N=2 is 0%, since, according to Equation (1), almost an infinite number of channel access patterns is possible. If the number N of simultaneously active end devices increases, the collision probability of the individual partial data packets increases and the packet error rate increases. For N=10 terminal devices, the packet error rate for all curves from M=256 to M="inf" is approximately 10%.

As can be seen in FIG. 25, the selection of M="inf" provides the best performance. However, on the side of the base station, detecting the different channel access patterns is almost impossible for M="inf" Thus, M has to be reduced to a realistic level. For $M_{max}>10^{1}$, a specification of M=1024 should be useful. This selection is also influenced by the performance power available on the receiver side. What can be seen is that, with the selection of M=1024, the performance loss is not very large compared to the version with M="inf".

Figure 26:
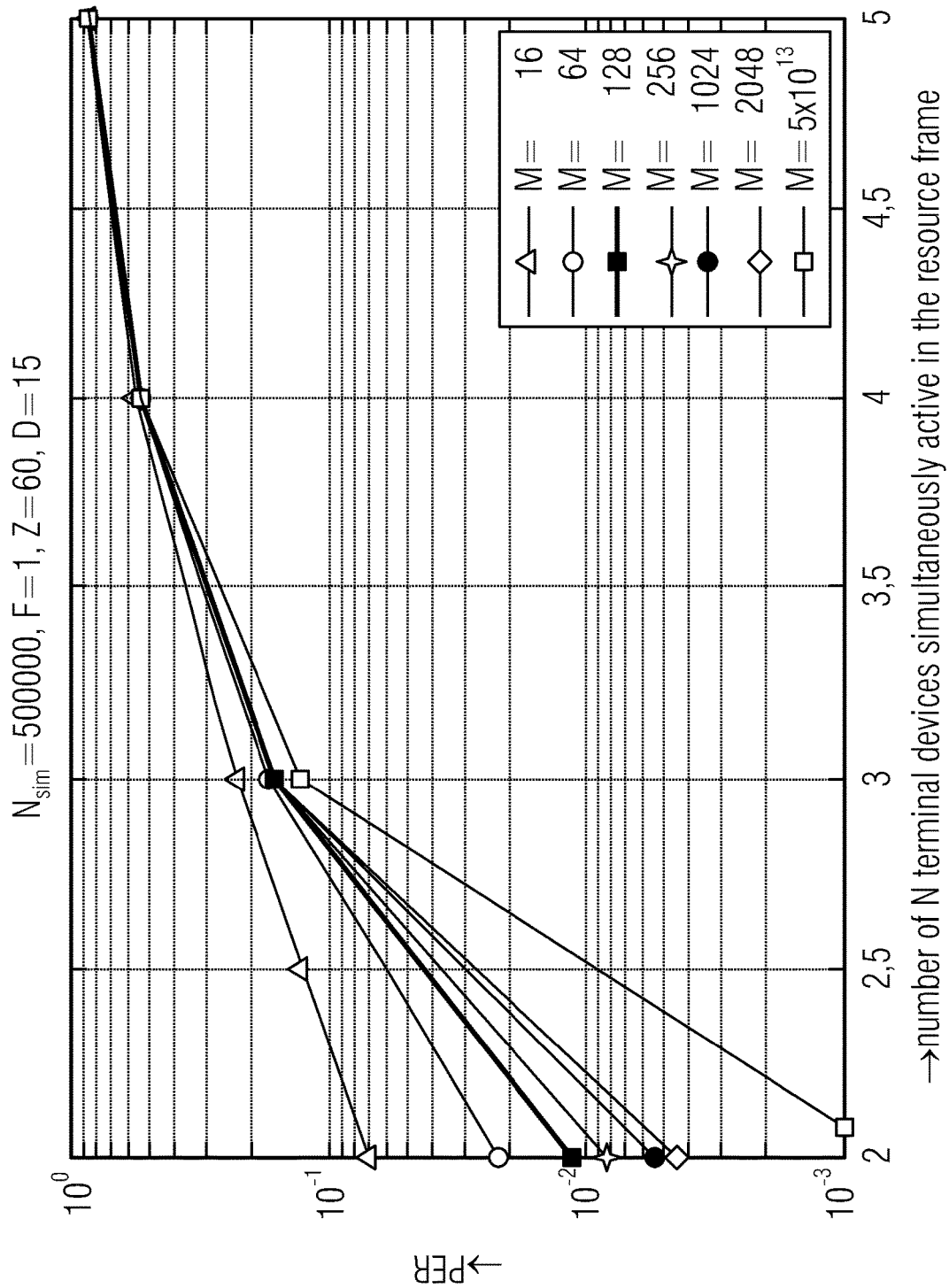
FIG. 26 shows, in a diagram, simulation results of the packet error rate for different channel access pattern lengths M as a function of the number of simultaneously active terminal devices in the case of 60 available resource elements.

At lower values of $M_{max}$, the lengths of the channel access patterns may decrease without having to accept significant performance losses in the PER. This is illustrated in FIG. 26 for Z=60 and D=15. The performance curves for the lengths M=128 to M=2048 only differ slightly at N=2.

FIG. 26 shows, in a diagram simulation, results of the packet error array for different channel access pattern lengths M as a function of the number of simultaneously active terminal devices in the case of 60 resource elements. Here, the ordinate describes the packet error rate PER and the abscissa describes the number of the N terminal devices simultaneously active in the resource frame (e.g. terminal points).

In summary, the determination of the number M of different channel access patterns depends on $M_{max}$ and is therefore a function of F, Z and D. For example, M=1024 seems to be useful for $M_{max}>10^{14}$. If the value of $M_{max}$ falls below the threshold of $10^{14}$, M may be decreased accordingly, wherein simulations are used to verify to what extent the PER performance still meets the requirements. For very large values of $M_{max}$, M may well assume values even larger than 1024. This may be determined by appropriate simulations.

In the second design step, the number M of the different channel access pattern and their length D has been specified. Ideally, the individual channel access patterns are determined by means of a random generator, which is why there is as little connection or similarity as possible between the M individual patterns. On the receiver side, this usually means a very large detection effort. In order to reduce this detection effort, the third design step tries to give the channel access patterns structural properties such as clustering or repeated patterns so as to significantly reduce the computational complexity on the receiver side. The PER performance, as for example shown in FIGS. 25 and 26, should not deteriorate as a result, if possible.

Figure 27:
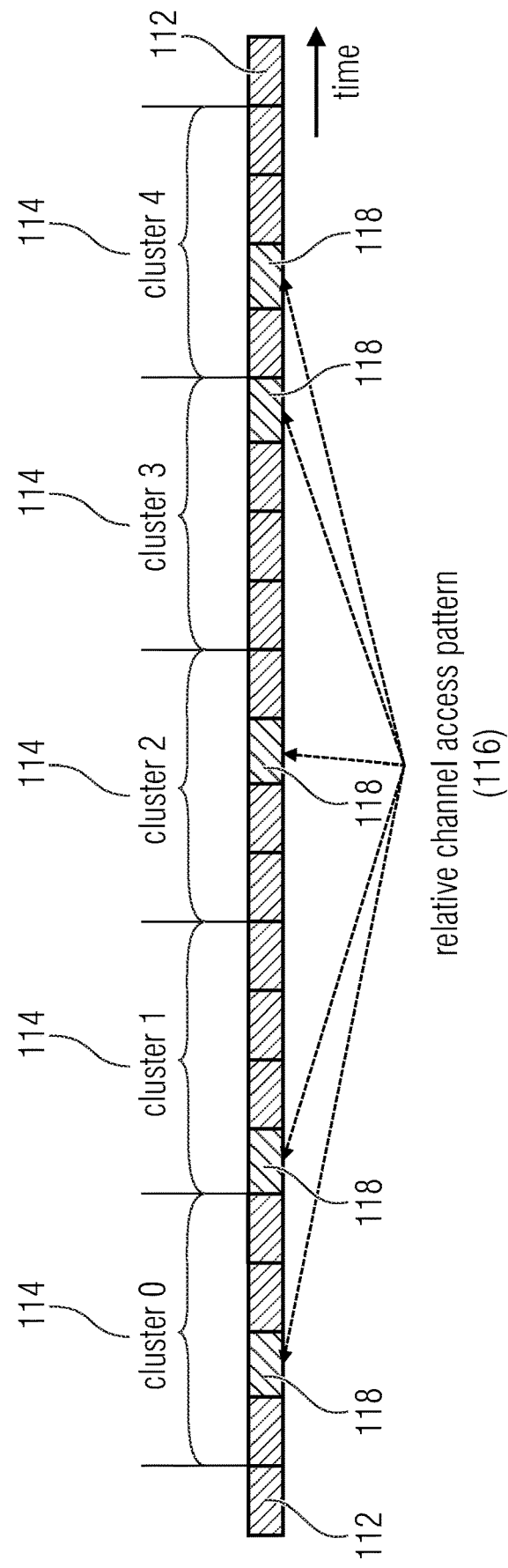
FIG. 27 shows, in a diagram, resources of a channel access pattern projected onto a time axis, wherein resources of the channel access pattern are grouped into clusters of the same lengths L (e.g. L=4), wherein the relative channel access pattern indicates an occupancy of one resource per cluster, according to an embodiment.

One possibility is to divide the resource frames into clusters 114 of the same length L, as is shown in FIG. 27.

In detail, FIG. 27 shows, in a diagram, resources 112 of a channel access pattern 110 projected onto a time access, wherein the resources 112 of the channel access pattern 110 are grouped into clusters 114 of the same length L (e.g. L=4), wherein the relative channel access pattern indicates an occupancy of one resource 118 per cluster 114, according to an embodiment. In other words, FIG. 27 shows a channel access pattern with one element per cluster of the length L=4 each.

A cluster variation would be to divide the length Z of the resource frame by the number D of partial data packets. This results in a maximum cluster length of L=floor(R/D). In the example of FIG. 25, what would result is a cluster length of L=20 (360/18) resource elements.

The cluster length may also be selected to be smaller than L=floor(R/D), and the remaining resources elements could be used to subsequently shift the basic pattern generated from the smaller cluster by one time index step each, i.e. by one resource element, so as to generate further patterns that all have the same basic shape.

In the example of FIG. 26, e.g. L=10 may be specified. Then, a single channel access pattern is selected via throw of the dice from the L×D (=180) resource elements, which may then be further used R−L×D times, i.e. 180 times, shifted by one time index each step. What is obtained by this are 181 different channel access patterns that all have the same basic pattern. For example, the channel access pattern length M=1024 from FIG. 25 may be generated with only 7 different basic patterns, wherein each of these basic patterns is shifted on average 145 on the time axis. In this case, the performance gets only insignificantly worse.

Overall, the above approach reduces the receiver-side detection effort significantly. However, it is important to check again and again that the performance does not suffer compared to the performance obtained with purely random sequences.

C. Further Embodiments

Figure 28:
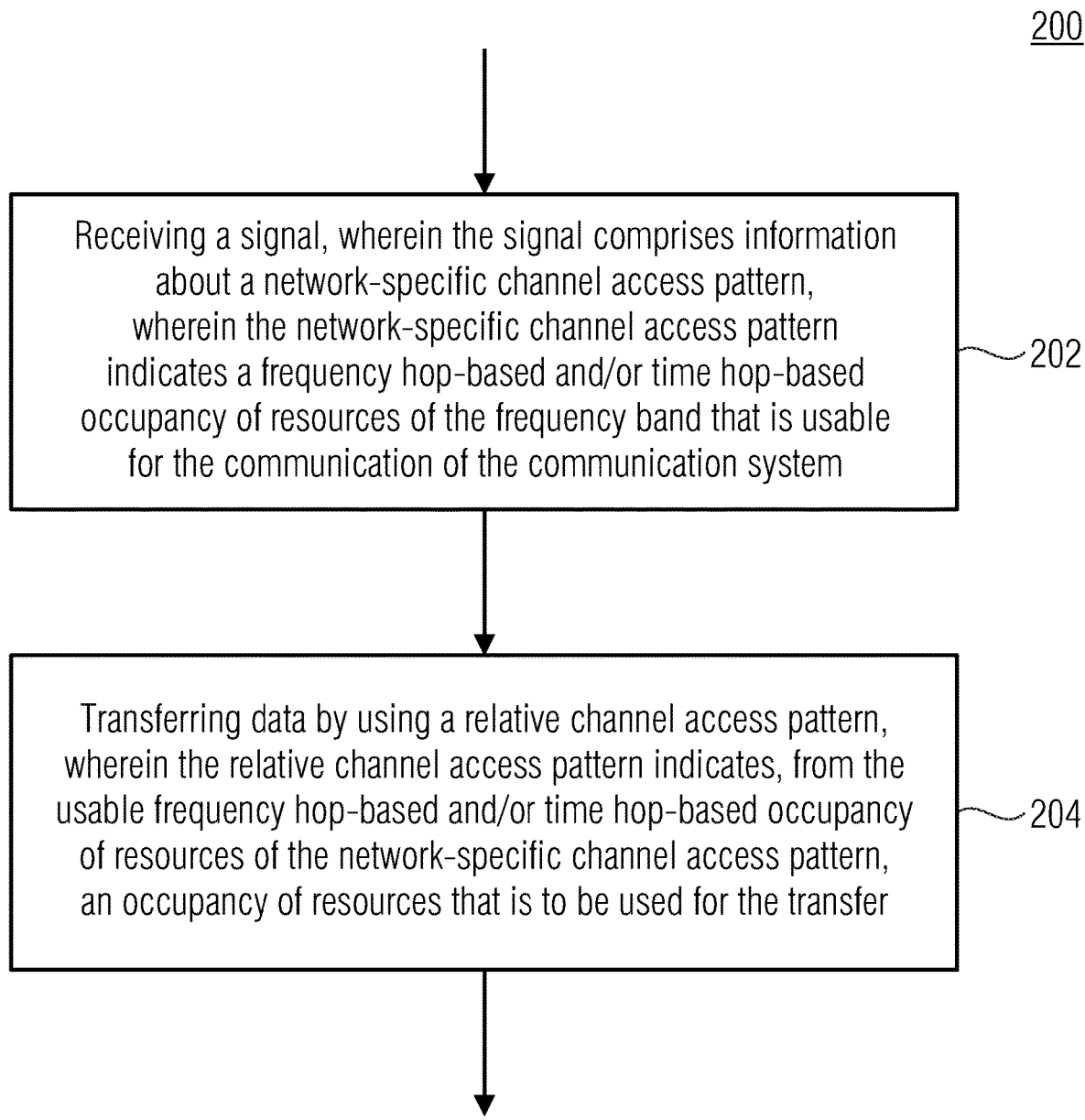
FIG. 28 shows a flow diagram of a method for operating a terminal point of a communication system, wherein the communication system wirelessly communicates in a frequency band used for communication by a plurality of communication systems, according to an embodiment.

FIG. 28 shows a flow diagram of a method 200 for operating a terminal point of a communication system, wherein the communication system wirelessly communicates in a frequency band used for communication by a plurality of communication systems. The method 200 includes a step 202 of receiving a signal, wherein the signal comprises information about a network-specific channel access pattern, wherein the network-specific channel access pattern indicates a frequency hop-based and/or time hop-based occupancy of resources of the frequency band that is usable for the communication of the communication system. In addition, the method 200 includes a step 204 of transferring data by using a relative channel access pattern, wherein the relative channel access pattern indicates, from the usable frequency hop-based and/or time hop-based occupancy of resources of the network-specific channel access pattern, an occupancy of resources that is to be used for the transfer.

FIG. 29 shows a flow diagram of a method 210 for operating a base station of a communication system, wherein the communication system wirelessly communicates in a frequency band used for communication by a plurality of communication systems. The method 210 includes a step 212 of transmitting a signal, wherein the signal comprises information about a network-specific channel access pattern, wherein the network-specific channel access pattern indicates a frequency hop-based and/or time hop-based occupancy of resources of the frequency band that is usable for the communication of the communication system. In addition, the method 210 includes a step 214 of transferring data by using a relative channel access pattern, wherein the relative channel access pattern indicates, from the usable frequency hop-based and/or time hop-based occupancy of resources of the network-specific channel access pattern, an occupancy of resources that is to be used for the transfer.

Figure 30:
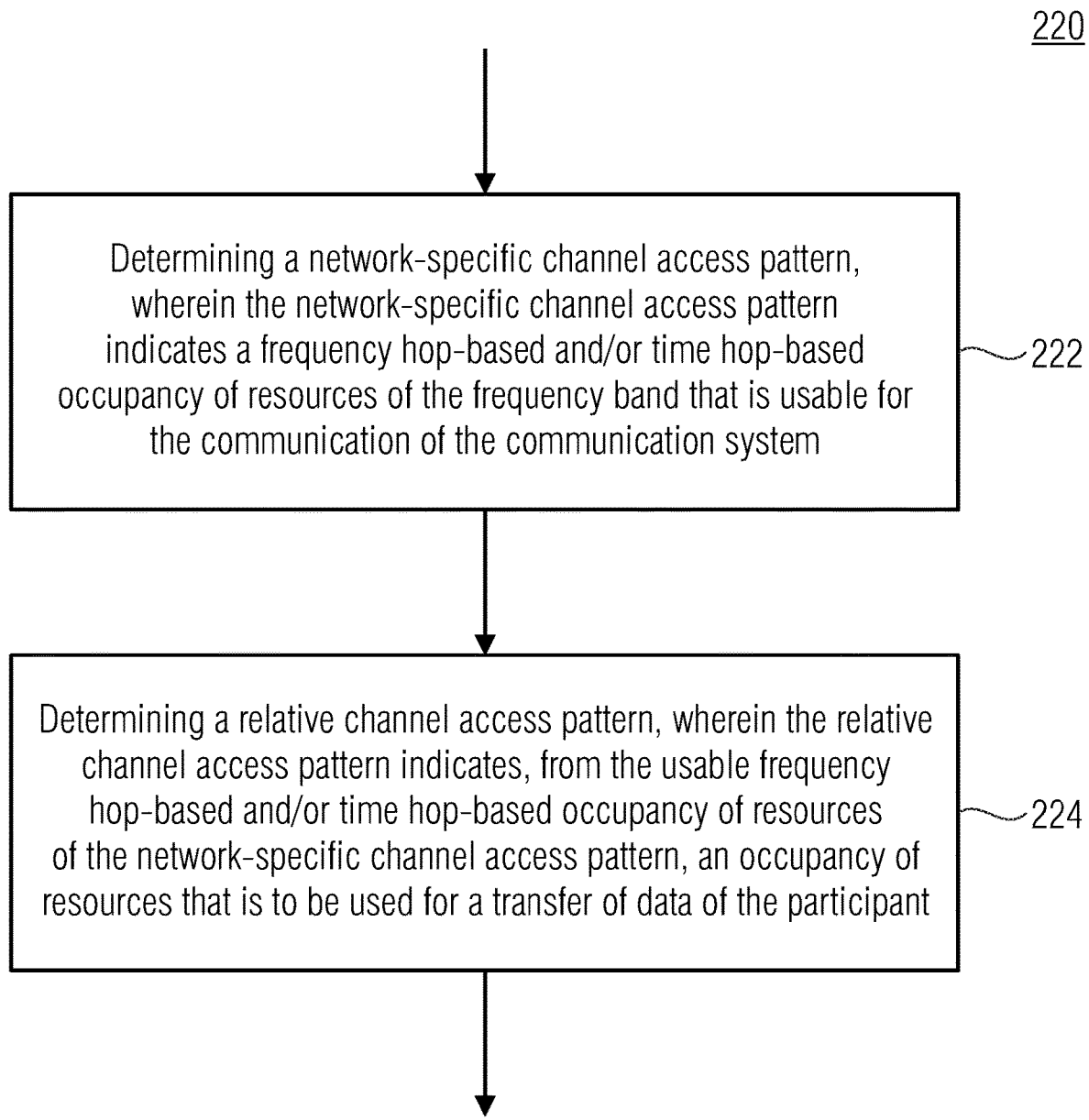
FIG. 30 shows a flow diagram of a method for operating a participant of a communication system, wherein the communication system wirelessly communicates in a frequency band used for communication by a plurality of communication systems, according to an embodiment.

FIG. 30 shows a flow diagram of a method 220 for operating a participant of a communication system, wherein the communication system wirelessly communicates in a frequency band used for communication by a plurality of communication systems. The method 220 includes a step 222 of identifying a network-specific channel access pattern, wherein the network-specific channel access pattern indicates a frequency hop-based and/or time hop-based occupancy of resources of the frequency band that is usable for the communication of the communication system. In addition, the method 220 includes a step 224 of identifying a relative channel access pattern, wherein the relative channel access pattern indicates, from the usable frequency hop-based and/or time hop-based occupancy of resources of the network-specific channel access pattern, an occupancy of resources that is to be used for a transfer of data of the participant.

Embodiments are used in systems for radio transfer of data from terminal devices to a base station and from one/several base stations to terminal devices. For example, the system may be a personal area network (PAN) or a low power wide area network (LPWAN), wherein the terminal devices may be battery-operated sensors (sensor nodes), for example.

Embodiments concern application cases in which a message (data packet) is transferred in a radio network in several partial data packets (so-called telegram splitting [1]), wherein several mutually uncoordinated radio networks access mutual radio resources (e.g. mutual frequency band).

As mentioned above, the embodiments described herein may be used to transfer data between the participants of the communication system on the basis of the telegram splitting method. In the telegram splitting method, data, e.g. a telegram or a data packet, is divided into a plurality of sub-data packets (or partial data packets or partial packets), and the sub-data packets are transferred by using a time hop pattern and/or a frequency hop pattern, distributed in time and/or frequency, from a participant to another participant (e.g. from the base station to the terminal point, or from the terminal point to the base station) of the communication system, wherein the participant that receives the sub-data packets rejoins (or combines) them so as to obtain the data packet. Each of the sub-data packets contains only a part of the data packet. Furthermore, the data packet may be channel-encoded so that not all of the sub-data packets are needed to decode the data packet faultlessly, but only a part of the sub-data packets.

In the transfer of data on the basis of the telegram splitting method, the sub-data packets may be transferred distributed in a subset (e.g. a selection) of the available resources of the network-specific channel access pattern. In detail, the sub-data packets may be transferred on the basis of the relative channel access pattern, i.e. in the resources of the relative channel access pattern. For example, one sub-data packet may be transferred per resource.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] DE 10 2011 082 098 B4
[2] IEEE Std. 802.15.4-2015—IEEE Standard for Low-Rate Wireless Networks, 2015

List of Abbreviations

CRC: Cyclic Redundancy Check
LPWAN: Low Power Wide Area Network
LSB: Least Significant Bit(s)
MSB: Most Significant Bit(s)
PAN: Personal Area Network
TLS: Transport Layer Security
TSMA: Telegram-Splitting-Multiple-Access

The invention claimed is:

1. Terminal point of a communication system,
wherein the communication system wirelessly communicates in a frequency band used for communication by a plurality of communication systems,
wherein the terminal point is configured to receive a signal, wherein the signal comprises information about a network-specific channel access pattern, wherein the network-specific channel access pattern indicates a frequency hop-based and time hop-based occupancy of resources of the frequency band that is usable for the communication of the communication system,
wherein the terminal point is configured to transfer data by using a relative channel access pattern, wherein the relative channel access pattern indicates, from the usable frequency hop-based and time hop-based occupancy of resources of the network-specific channel access pattern, an occupancy of resources that is to be used for the transfer,
wherein the information describes a state of a numerical sequence generator for generating a numerical sequence, and wherein the information describes a number of a numerical sequence, wherein the numerical sequence determines the network-specific channel access pattern,
wherein the occupancy of resources of the relative channel access pattern that is to be used for the transfer is a subset of the usable frequency hop-based and time hop-based occupancy of resources of the network-specific channel access pattern.

2. Terminal point according to claim 1,
wherein the relative channel access pattern differs from another relative channel access pattern based on which another participant of the communication system transfers data,
wherein the other relative channel access pattern indicates, from the usable frequency hop-based and time hop-based occupancy of resources of the network-specific channel access pattern, an occupancy of resources that is to be used for the transfer by the other participant.

3. Terminal point according to claim 1,
wherein the network-specific channel access pattern indicates the frequency hop-based and time hop-based occupancy of resources of the frequency band, usable for the communication of the communication system, in frequency channels and associated time slots or in frequency channel indices and associated time slot indices.

4. Terminal point according to claim 1,
wherein the network-specific channel access pattern indicates in a frequency direction a plurality of adjacent or spaced apart resources of the frequency band.

5. Terminal point according to claim 4,
wherein the relative channel access pattern indicates in the frequency direction at the most a subset of the plurality of adjacent or spaced apart resources of the network-specific channel access pattern.

6. Terminal point according to claim 4,
wherein the relative channel access pattern indicates for at least one time hop in the frequency direction a different resource of the plurality of adjacent or spaced apart resources of the network-specific channel access pattern than another relative channel access pattern based on which another participant of the communication system transfers data,
wherein the other relative channel access pattern indicates, from the usable frequency hop-based and time hop-based occupancy of resources of the network-specific channel access pattern, an occupancy of resources that is to be used for the transfer by the other participant.

7. Terminal point according to claim 4,
wherein different symbol rates and/or different numbers of symbols are allocated in the frequency direction to at least two resources of the plurality of adjacent or spaced apart resources.

8. Terminal point according to claim 4,
wherein the plurality of adjacent resources form in the frequency direction a block of connected resources,
wherein different symbol rates and/or different numbers of symbols are allocated to different parts of the block of connected resources.

9. Terminal point according to claim 1,
wherein the terminal point is configured to select the relative channel access pattern from a set of M relative channel access patterns,
wherein the M relative channel access patterns indicate, from the usable frequency hop-based and time hop-based occupancy of resources of the network-specific channel access pattern, the occupancy of resources that is to be used for the transfer,
wherein the M relative channel access patterns are different.

10. Terminal point according to claim 9,
wherein the terminal point is configured to randomly select the relative channel access pattern from the set of M relative channel access patterns.

11. Terminal point according to claim 9,
wherein the terminal point is configured to select the relative channel access pattern from the set of M relative channel access patterns on the basis of an intrinsic parameter.

12. Terminal point according to claim 11,
wherein the intrinsic parameter is a digital signature of the telegram or a code word for a detection of transfer errors.

13. Terminal point according to claim 1,
wherein the terminal point is configured to select, from a set of relative channel access patterns with different transfer characteristics, the relative channel access pattern as a function of requirements of the data to be transferred with respect to transmission characteristics.

14. Terminal point according to claim 1,
wherein the terminal point is configured to transfer, according to the relative channel access pattern, as data a data packet divided into a plurality of sub-data packets, wherein the plurality of sub-data packets each comprises only a part of the data packet.

15. Base station of a communication system,
wherein the communication system wirelessly communicates in a frequency band used for communication by a plurality of communication systems,
wherein the base station is configured to transmit a signal, wherein the signal comprises information about a network-specific channel access pattern, wherein the network-specific channel access pattern indicates a frequency hop-based and time hop-based occupancy of resources of the frequency band that is usable for the communication of the communication system,
wherein the base station is configured to transfer data by using a relative channel access pattern, wherein the relative channel access pattern indicates, from the usable frequency hop-based and time hop-based occupancy of resources of the network-specific channel access pattern, an occupancy of resources that is to be used for the transfer,
wherein the information describes a state of a numerical sequence generator for generating a numerical sequence, and wherein the information describes a number of a numerical sequence, wherein the numerical sequence determines the network-specific channel access pattern,
wherein the occupancy of resources of the relative channel access pattern that is to be used for the transfer is a subset of the usable frequency hop-based and time hop-based occupancy of resources of the network-specific channel access pattern.

16. Base station according to claim 15,
wherein the base station does not know in advance which relative hopping pattern is used by a terminal point.

17. Base station according to claim 16,
wherein the base station is configured to identify the relative hopping pattern used by means of a detection.

18. Base station according to claim 15,
wherein the relative channel access pattern differs from another relative channel access pattern based on which the base station transfers other data,
wherein the other relative channel access pattern indicates, from the usable frequency hop-based and time hop-based occupancy of resources of the network-specific channel access pattern, the occupancy of resources that is to be used for the transfer.

19. Base station according to claim 15,
wherein the network-specific channel access pattern indicates the frequency hop-based and time hop-based occupancy of resources of the frequency band, usable for the communication of the communication system, in frequency channels and associated time slots or in frequency channel indices and associated time slot indices.

20. Base station according to claim 15,
wherein the network-specific channel access pattern indicates in a frequency direction a plurality of adjacent or spaced apart resources of the frequency band.

21. Base station according to claim 20,
wherein the relative channel access pattern indicates in the frequency direction at the most a subset of the plurality of adjacent or spaced apart resources of the network-specific channel access pattern.

22. Base station according to claim 20,
wherein the relative channel access pattern indicates for at least one time hop in the frequency direction a different resource of the plurality of adjacent or spaced apart resources of the network-specific channel access pattern than another relative channel access pattern based on which the base station transfers other data, wherein the other relative channel access pattern indicates, from the usable frequency hop-based and time hop-based occupancy of resources of the network-specific channel access pattern, the occupancy of resources to be used for the transfer.

23. Base station according to claim 20, wherein different symbol rates and/or a different number of symbols are allocated in the frequency direction to at least two resources of the plurality of adjacent or spaced apart resources.

24. Base station according to claim 20, wherein the plurality of adjacent resources form in the frequency direction a block of connected resources, wherein different symbol rates and/or different numbers of symbols are allocated to different parts of the block of connected resources.

25. Base station according to claim 15, wherein the base station is configured to select the relative channel access pattern from a set of M relative channel access patterns, wherein the M relative channel access patterns indicate, from the usable frequency hop-based and time hop-based occupancy of resources of the network-specific channel access pattern, the occupancy of resources that is to be used for the transfer, wherein the M relative channel access patterns are different.

26. Base station according to claim 25, wherein the base station is configured to randomly select the relative channel access pattern from the set of M relative channel access patterns.

27. Base station according to claim 25, wherein the base station is configured to select the relative channel access pattern from the set of M relative channel access patterns on the basis of an intrinsic parameter.

28. Base station according to claim 27, wherein the intrinsic parameter is a digital signature of the telegram or a code word for a detection of transfer errors.

29. Base station according to claim 15, wherein the base station is configured to select, from a set of relative channel access patterns with different transfer characteristics, the relative channel access pattern as a function of requirements of the data to be transferred with respect to transmission characteristics.

30. Base station according to claim 15, wherein the base station is configured to generate the relative channel access pattern as a function of requirements of the data to be transferred with respect to transfer characteristics.

31. Base station according to claim 15, wherein the base station is configured to transfer, according to the relative channel access pattern, as data a data packet divided into a plurality of sub-data packets, wherein the plurality of sub-data packets each comprises only a part of the data packet.

32. Communication system, comprising:

at least one terminal point of a communication system, wherein the communication system wirelessly communicates in a frequency band used for communication by a plurality of communication systems, wherein the terminal point is configured to receive a signal, wherein the signal comprises information about a network-specific channel access pattern, wherein the network-specific channel access pattern indicates a frequency hop-based and time hop-based occupancy of resources of the frequency band that is usable for the communication of the communication system, wherein the terminal point is configured to transfer data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the network-specific channel access pattern; and a base station of a communication system, wherein the communication system wirelessly communicates in a frequency band used for communication by a plurality of communication systems, wherein the base station is configured to transmit a signal, wherein the signal comprises information about a network-specific channel access pattern, wherein the network-specific channel access pattern indicates a frequency hop-based and time hop-based occupancy of resources of the frequency band that is usable for the communication of the communication system, wherein the base station is configured to transfer data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the network-specific channel access pattern.

33. Method for operating a terminal point of a communication system, wherein the communication system wirelessly communicates in a frequency band used for communication by a plurality of communication systems, the method comprising:

receiving a signal, wherein the signal comprises information about a network-specific channel access pattern, wherein the network-specific channel access pattern indicates a frequency hop-based and time hop-based occupancy of resources of the frequency band that is usable for the communication of the communication system, and transferring data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the network-specific channel access pattern, wherein the occupancy of resources of the relative channel access pattern that is to be used for the transfer is a subset of the usable frequency hop-based and time hop-based occupancy of resources of the network-specific channel access pattern.

34. Method for operating a base station of a communication system, wherein the communication system wirelessly communicates in a frequency band used for communication by a plurality of communication systems, the method comprising:

transmitting a signal, wherein the signal comprises information about a network-specific channel access pattern, wherein the network-specific channel access pattern indicates a frequency hop-based and time hop-based occupancy of resources of the frequency band that is usable for the communication of the communication system, and transferring data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the network-specific channel access pattern, wherein the occupancy of resources of the relative channel access pattern that is to be used for the transfer is a subset of the usable frequency hop-based and time hop-based occupancy of resources of the network-specific channel access pattern.

35. A non-transitory digital storage medium having a computer program stored thereon to perform the method for operating a terminal point of a communication system, wherein the communication system wirelessly communicates in a frequency band used for communication by a plurality of communication systems, the method comprising:

receiving a signal, wherein the signal comprises information about a network-specific channel access pattern, wherein the network-specific channel access pattern indicates a frequency hop-based and time hop-based occupancy of resources of the frequency band that is usable for the communication of the communication system, and transferring data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the network-specific channel access pattern, wherein the occupancy of resources of the relative channel access pattern that is to be used for the transfer is a subset of the usable frequency hop-based and time hop-based occupancy of resources of the network-specific channel access pattern, when said computer program is run by a computer.

36. A non-transitory digital storage medium having a computer program stored thereon to perform the method for operating a base station of a communication system, wherein the communication system wirelessly communicates in a frequency band used for communication by a plurality of communication systems, the method comprising:

transmitting a signal, wherein the signal comprises information about a network-specific channel access pattern, wherein the network-specific channel access pattern indicates a frequency hop-based and time hop-based occupancy of resources of the frequency band that is usable for the communication of the communication system, and transferring data by using a relative channel access pattern, wherein the relative channel access pattern indicates, from the usable frequency hop-based and time hop-based occupancy of resources of the network-specific channel access pattern, an occupancy of resources that is to be used for the transfer, wherein the information describes a state of a numerical sequence generator for generating a numerical sequence, and wherein the information describes a number of a numerical sequence, wherein the numerical sequence determines the network-specific channel access pattern, wherein the occupancy of resources of the relative channel access pattern that is to be used for the transfer is a subset of the usable frequency hop-based and time hop-based occupancy of resources of the network-specific channel access pattern, when said computer program is run by a computer.

37. Controller for a participant of a communication system, wherein the communication system wirelessly communicates in a frequency band used for communication by a plurality of communication systems, wherein the controller is configured to identify a network-specific channel access pattern, wherein the network-specific channel access pattern indicates a frequency hop-based and time hop-based occupancy of resources of the frequency band that is usable for the communication of the communication system, wherein the controller is configured to identify a relative channel access pattern, wherein the relative channel access pattern indicates, from the usable frequency hop-based and time hop-based occupancy of resources of the network-specific channel access pattern, an occupancy of resources that is to be used for the transfer of data of the participant, wherein the controller is configured to pseudo-randomly identify the network-specific channel access pattern as a function of a state of a numerical sequence generator for generating a numerical sequence or a number of a numerical sequence, wherein the occupancy of resources of the relative channel access pattern that is to be used for the transfer is a subset of the usable frequency hop-based and time hop-based occupancy of resources of the network-specific channel access pattern.

38. Controller according to claim 37, wherein the relative channel access pattern differs from another relative channel access pattern based on which the participant transfers other data or based on which another participant of the communication system transfers data, wherein the other relative channel access pattern indicates, from the usable frequency hop-based and time hop-based occupancy of resources of the network-specific channel access pattern, the occupancy of resources that is to be used for the transfer.

39. Controller according to claim 37, wherein the network-specific channel access pattern indicates the frequency hop-based and time hop-based occupancy of resources of the frequency band, usable for the communication of the communication system, in frequency channels and associated time slots or in frequency channel indices and associated time slot indices.

40. Controller according to claim 37, wherein the network-specific channel access pattern indicates in a frequency direction a plurality of adjacent or spaced apart resources of the frequency band.

41. Controller according to claim 40, wherein the relative channel access pattern indicates in the frequency direction at the most a subset of the plurality of adjacent or spaced apart resources of the network-specific channel access pattern.

42. Controller according to claim 40, wherein the relative channel access pattern indicates in the frequency direction a different resource of the plurality of adjacent or spaced apart resources of the network-specific channel access pattern than another relative channel access pattern based on which the participant transfers other data or based on which another participant of the communication system transfers data, wherein the other relative channel access pattern indicates, from the usable frequency hop-based and time hop-based occupancy of resources of the network-specific channel access pattern, the occupancy of resources that is to be used for the transfer.

43. Controller according to claim 40, wherein different symbol rates and/or different numbers of symbols are allocated in the frequency direction to at least two resources of the plurality of adjacent or spaced apart resources.

44. Controller according to claim 40, wherein the plurality of adjacent resources form in the frequency direction a block of connected resources, wherein different symbol rates and/or different numbers of symbols are allocated to different parts of the block of connected resources.

45. Controller according to claim 37, wherein the controller is configured to select, from a set of relative channel access patterns with different transfer characteristics, the relative channel access pattern as a function of requirements of the data to be transferred with respect to transmission characteristics.

46. Controller according to claim 37, wherein the controller is configured to generate the relative channel access pattern as a function of requirements of the data to be transferred with respect to transfer characteristics.

47. Controller according to claim 37, wherein the controller is configured to pseudo-randomly identify the network-specific channel access pattern as a function of a state of a numerical sequence generator for generating a numerical sequence or a number of a numerical sequence.

48. Controller according to claim 37, wherein states of the numerical sequence generator following the state of the numerical sequence generator are identifiable on the basis of the state of the numerical sequence generator, wherein the controller is configured to identify the network-specific channel access pattern as a function of the following states of the numerical sequence generator or following numbers of the numerical sequence derived therefrom.

49. Controller according to claim 37, wherein the controller is configured to identify the network-specific channel access pattern as a function of individual information of the communication system.

50. Controller according to claim 37, wherein the controller is configured to map, by using a mapping function:

the state of the numerical sequence generator, or a number of the numerical sequence derived from the state of the numerical sequence generator, or the number of the numerical sequence, and the individual information of the communication system, onto a time information and a frequency information, wherein the time information and the frequency information describe a resource of the network-specific channel access pattern.

51. Controller according to claim 37, wherein the controller is configured to identify a pseudo random number R as a function of:

the state of the numerical sequence generator or a number of the numerical sequence derived from the state of the numerical sequence generator, or the number of the numerical sequence, and individual information of the communication system, wherein the pseudo random number R determines the network-specific channel access pattern.

52. Controller according to claim 51, wherein the controller is configured to identify a resource of the network-specific channel access pattern on the basis of the pseudo-random number R.

\* \* \* \* \*

UNITED STATES PATENT AND TRADEMARK OFFICE
CERTIFICATE OF CORRECTION

PATENT NO. : 12,035,224 B2
APPLICATION NO. : 17/130132
DATED : July 9, 2024
INVENTOR(S) : Frank Obernosterer et al.

It is certified that error appears in the above-identified patent and that said Letters Patent is hereby corrected as shown below:

In the Claims

In Claim 1, Column 44, Lines 38-40:
Delete "wherein the information describes a state of a numerical sequence generator for generating a numerical sequence, and"
And insert -- wherein the information describes a state of a numerical sequence generator for generating a numerical sequence, or --

In Claim 15, Column 46, Lines 22-24:
Delete "wherein the information describes a state of a numerical sequence generator for generating a numerical sequence, and"
And insert -- wherein the information describes a state of a numerical sequence generator for generating a numerical sequence, or --

In Claim 33, Column 48, Line 65-67:
Delete "wherein the information describes a state of a numerical sequence generator for generating a numerical sequence, and"
And insert -- wherein the information describes a state of a numerical sequence generator for generating a numerical sequence, or --

In Claim 34, Column 49, Line 28-30:
Delete "wherein the information describes a state of a numerical sequence generator for generating a numerical sequence, and"
And insert -- wherein the information describes a state of a numerical sequence generator for generating a numerical sequence, or --

Signed and Sealed this
Third Day of September, 2024

Katherine Kelly Vidal
*Director of the United States Patent and Trademark Office*